(12) United States Patent
Kobayashi et al.

(10) Patent No.: US 6,595,898 B2
(45) Date of Patent: Jul. 22, 2003

(54) WORKING VEHICLE AND VEHICLE SPEED CONTROL METHOD THEREOF, VARIABLE POWER ENGINE AND POWER SETTING METHOD THEREOF, AND VEHICLE WITH VARIABLE POWER ENGINE AND POWER CONTROL METHOD THEREOF

(75) Inventors: Tetsuo Kobayashi, Kashiwazaki (JP); Hitoshi Takahashi, Kashiwazaki (JP); Kazuhito Nishimaki, Kashiwazaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/941,667

(22) Filed: Aug. 30, 2001

(65) Prior Publication Data

US 2002/0028729 A1 Mar. 7, 2002

Related U.S. Application Data

(62) Division of application No. 09/540,951, filed on Mar. 31, 2000.

(30) Foreign Application Priority Data

| Apr. 1, 1999 | (JP) | 11-95473 |
| May 14, 1999 | (JP) | 11-134060 |
| May 27, 1999 | (JP) | 11-148744 |
| May 27, 1999 | (JP) | 11-148745 |

(51) Int. Cl.$^7$ ............................................. B60K 41/04
(52) U.S. Cl. ........................ 477/174; 477/33; 477/110
(58) Field of Search .......................... 477/33, 107, 110, 477/174, 902; 180/247

(56) References Cited

U.S. PATENT DOCUMENTS

| 4,594,668 A | 6/1986 | Fujawa et al. | 364/431.02 |
| 4,785,778 A | 11/1988 | Gibson et al. | 123/373 |
| 6,092,016 A | 7/2000 | Sarangapani et al. | 701/102 |

FOREIGN PATENT DOCUMENTS

JP          10-246318          9/1998

*Primary Examiner*—Sherry Estremsky
*Assistant Examiner*—Tisha D. Lewis
(74) *Attorney, Agent, or Firm*—Armstrong, Westerman & Hattori, LLP.

(57) ABSTRACT

In a working vehicle, an electronic control regulating valve 121 controls a connection force in clutch mechanisms 35 and 36 in a transmission 30, and a input side revolution signal of the transmission, an output side revolution signal, a speed stage position signal and a pedal angle signal of an inching pedal 114 are inputted to control a slip in the transmission 30. Further, a pedal angle signal of an accelerator pedal 107 is inputted to cope with a hyper-slow mode. Furthermore, in an engine, a charged pressure is controlled in stages to carry out an appropriate power control suitable for a number of stages of the transmission 30.

5 Claims, 30 Drawing Sheets

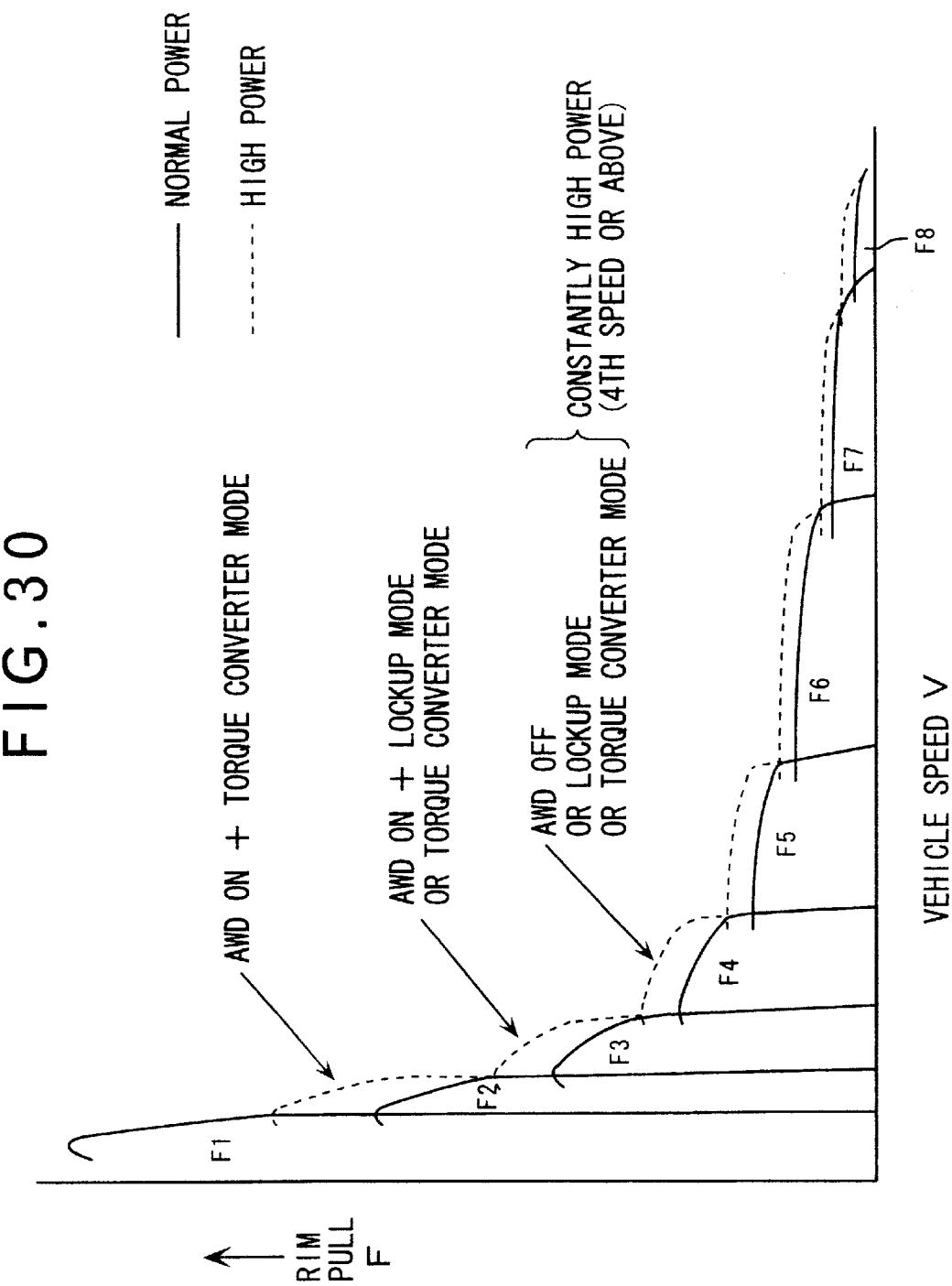

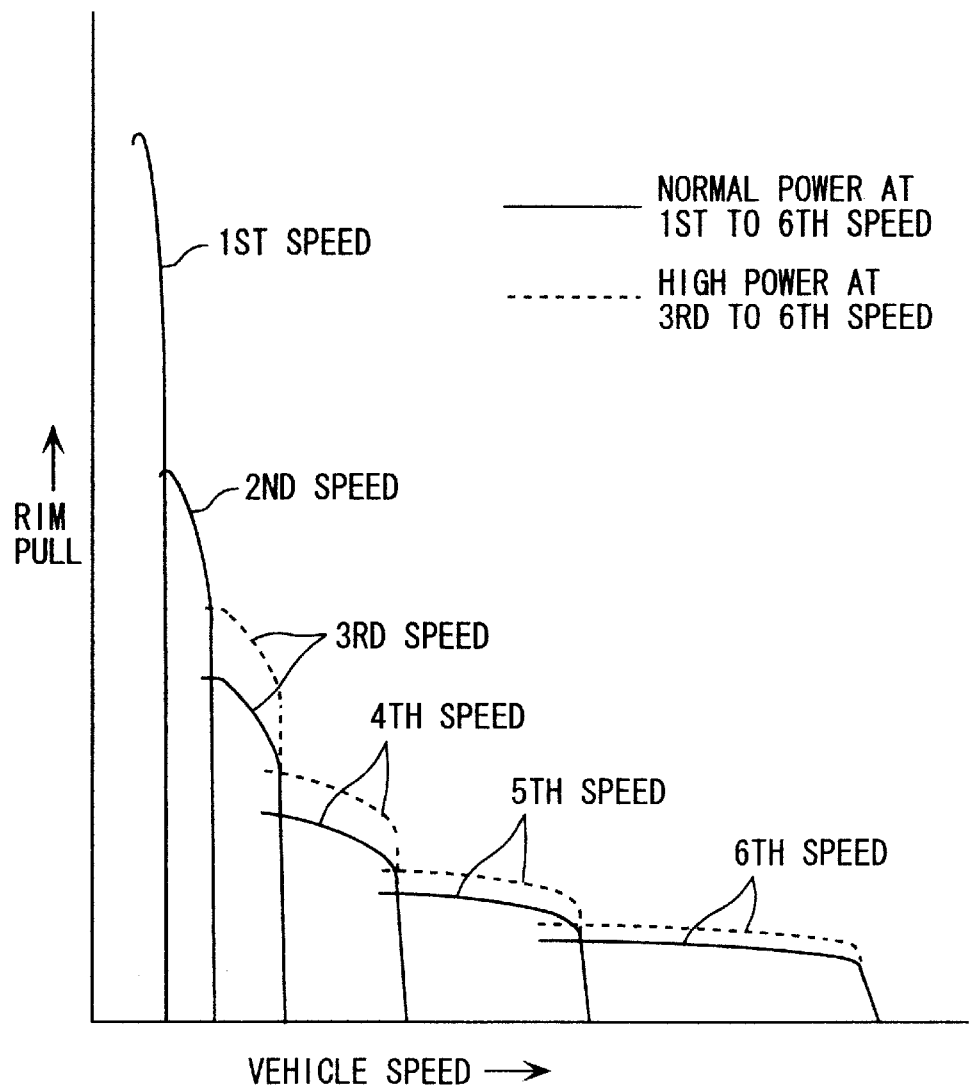

WORKING VEHICLE AND VEHICLE SPEED CONTROL METHOD THEREOF, VARIABLE POWER ENGINE AND POWER SETTING METHOD THEREOF, AND VEHICLE WITH VARIABLE POWER ENGINE AND POWER CONTROL METHOD THEREOF

This application is a divisional application of prior application Ser. No. 09/540,951 filed Mar. 31. 2000.

BACKGROUND OF THE INVENTION

1. Field of the Invention

The present invention relates to a construction machine such as a motor grader, a rough terrain crane, a power shovel, a wheel loader, a bulldozer and others, or a working vehicle such as a dump truck, a forklift and others, and a speed control method thereof. Further, the present invention relates to a variable power engine capable of changing its power and a power setting method thereof, the engine being used in the above vehicles. Furthermore, the present invention relates to a vehicle with a variable power engine such as described above and a power control method thereof.

2. Description of the Related Art

Recently, in a working vehicle, e.g., a machine such as a motor grader, a gear-contained transmission with an electronically controlled clutch having a gear train and a plurality of hydraulic (fluid pressure) clutches, combination of which can be changed in various ways, is used, and the gear-contained transmission with the clutch controlled by a solenoid operated valve to carry out various operations is increasing.

Inching Pedal

In a motor grader, a special work such as leveling the ground by using a blade while turning a corner may be performed. In such a case, a number of revolutions of the engine must be increased in some measure and, in this high velocity revolution, the vehicle speed is also increased from the nature of the case, which makes it difficult to turn a corner while carrying out the necessary work. Therefore, there is a request for reducing the vehicle speed while maintaining the high velocity revolution.

In order to satisfy such a request, a foot-operated inching pedal (clutch pedal) is provided, and stepping on this inching pedal can slide a predetermined clutch of the transmission to decrease the speed, thereby filling the needs of a necessary work and turning a corner and the like.

In case of the working vehicle, when starting the machine from standstill, since starting is possible from a relatively high speed stage as different from a general vehicle, the machine is started at a plurality of speed stage positions. When starting at different speed stage positions in this manner, since an input shaft is different from an output shaft in speed reducing (speed increasing) ratio for each speed stage position, the connection state of the clutch differs even though the inching pedal is stepped on at a similar angle. In other words, when the inching pedal stepping angle is unchanged, the machine can be started and travel at a desired speed at a low speed stage position, whilst the machine can not be started or travel at a lower speed than expected at a higher speed stage position. Therefore, there is a problem that a desired speed can not be obtained unless the inching pedal stepping angle is reduced (unless the pedal is released) at the higher speed stage position.

As a technique for equaling the feel of stepping on the inching pedal which differs in accordance with each speed stage position, there is an invention disclosed in Japanese patent laid-open publication No. Hei 10-246318.

In the invention disclosed in this publication, a solenoid working pressure regulating valve is provided to each clutch constituting each speed stage of the transmission; one solenoid operation manual regulating valve (proportional valve) is provided to some regulating valves out of the above pressure regulating valves on the upstream side; and each valve is controlled by a controller in accordance with an inching pedal stepping angle and a speed stage position, thereby controlling the connecting force of the clutch to be controlled in accordance with a change in the speed stage (selected gear ratio).

According to the invention disclosed in this publication, since the connecting force of the clutch is changed in accordance with the speed stage position, the inching pedal stepping position can be roughly associated with the speed of the machine irrespective of the speed stage position of the transmission, but an input number of revolutions and an output number of revolutions of the transmission are not monitored at all, and the sufficient (detailed) control of the output shaft, i.e., the vehicle speed can not be necessarily performed.

Further, since the pressure regulating valve of each clutch is controlled by one proportional valve provided on the upstream side thereof, there is also such a problem as that the detailed control of each clutch is not necessarily adequate.

Hyper-slow Mode

In the motor grader, a work for finishing the road surface or the bank with the extremely high accuracy may be carried out. In such a case, there is a request for realizing the very low speed of, e.g., approximately 1.0 km/h from the necessity of the work.

On the other hand, as to a number of revolutions of the engine, the high speed revolutions in some measures is required from the necessity of the work and, in such a high speed revolution, the vehicle speed is necessarily increased, which makes it difficult to realize the very low speed running while carrying out the necessary work. Therefore, there is a need for decreasing the vehicle speed while maintaining the high speed revolution.

In order to satisfy the above needs, there have been proposed many variable displacement torque converters, i.e., torque converters capable of automatically converting attitudes or shapes of three vanes, namely, an impeller, a turbine vane and a stator of the torque converter in accordance with a range of the high and low speeds.

With the working vehicle having the above-described variable displacement torque converter, running at a very low speed and a predetermined finishing operation can be efficiently carried out.

However, since the variable displacement torque converter has the complicated structure, it is very expensive, resulting in an increase in the price of the vehicle itself.

Further, the rising interest in the recent environmental concerns leads to an issue of noise reduction of the working vehicle.

That is, a number of steady-state revolutions of a conventional engine is determined to be approximately 2,500 RPM and a number of revolutions in the low idling is determined to be approximately 800 RPM.

On the other hand, in view of the noise reduction, a number of steady-state revolutions of approximately 2,000 RPM and a number of revolutions in the low idling of 800

RPM are required. This brings up the following new problem when realizing the very low running such as described above.

That is, if a forward first speed in the first in forward in a conventional number of steady-state revolutions is set to, for example, 3.45 km/h, the vehicle speed in the low idling becomes 1.1 (=3.45×800/2,500) km/h, which is the hyperslow running with which the finishing work is possible.

Meanwhile, if a number of steady-state revolutions is set to 2,000 RPM without changing the structure of the transmission, the vehicle speed in the low idling becomes 1.38 (=3.45×800/2,000) km/h.

However, the vehicle speed of 1.38 km/h is too high for the finishing work using the motor grader.

Thus, a working vehicle having a simplified structure by which a number of steady-state revolutions of the engine can be reduced and the very low speed running is also enabled is desired.

Variable Power Engine

The following can be true to the above-described engine of a working vehicle.

An engine power is usually set so as to obtain a given fixed maximum power. However, there is a request for changing a set value of a maximum power in accordance with circumstances depending on vehicles and machines.

For example, in case of the construction machine, a large power directly relates to the high work efficiency. However, in a low speed range, since the speed decreasing ratio of the transmission is large, a large power may cause the drive force to exceed a road surface adhesive coefficient of a wheel or a crawler and, in such a case, the wheel or the crawler go into a slide. Slippage of the wheel and the like leads to difficulty in the work and the deteriorated drive controllability, and wear-out of the wheel and the like is caused to shorten the life, thereby degrading the work efficiency.

In order to prevent this, an appropriate power is determined in accordance with the speed stages of the transmission in a regular work area, for example. Thus, the engine can afford to output, but the engine power is suppressed in order to prevent slippage during the work in the low speed stage even though the highly efficient work is possible with more power when working in the higher speed stage.

In the above-described case, if the power is variable, an appropriate power can be selected in the work, thereby improving the work efficiency.

Therefore, there has been developed an engine (variable power engine) with which an engine power is variable by controlling fuel oil consumption. FIG. 31 indicates an example of running and rim pull performances of a general vehicle with a variable power engine. FIG. 31 indicates the relationship between a vehicle speed (horizontal axis) and a rim pull (vertical axis) of a vehicle having a six-speed change gear. The characteristic indicated by a solid line represents the character of all speeds from the first speed to the sixth speed in the state of the usual power (normal power), and the characteristic indicated by a broken line represents the characteristic of the high speed range from the third speed to the six speed in the high power state.

In such a vehicle, the land clearing work is conducted at the second speed; the work for scattering a material such as ballast, the work for leveling the gravel path and the light load work such as snow removal are carried out at the third to fifth speeds; and the running or lighter load work is performed at the sixth speed.

In this case, since slippage of the wheel and the like does not occur with the high power in the light load work or running at the third or higher speed, the engine power is set to the high power characteristic indicated by the broken line to conduct the highly efficient work.

There are currently known several methods for obtaining a variable power. For example, there are the following methods.

1) An electronically controlling method adopting electron governor control.
2) A method disclosed in U.S. Pat. No. 4,785,778. An apparatus used in this method has such a structure as that one end of a main governor spring is brought into contact with a movable rack controlling a fuel oil consumption of a fuel injection system while the other end of the main governor spring is associated with a control lever and a position of the control lever is changed by a hydraulic cylinder. When the position of the control lever is displaced by using the hydraulic cylinder in a direction for thrusting the main governor spring or in the opposed direction, a spring pressure is changed to control the fuel oil consumption.
3) A controlling method using a boost compensator. In this method, a supercharged pressure of a turbo charger to be applied to a boost compensator is subjected to on/off control by using an electromagnetic valve in an engine provided with a fuel injector having the boost compensator, and a high power state in which the supercharged pressure is supplied and a normal power state in which no supercharged pressure is supplied are set to obtain the two-stage engine power.

Regarding to each method described above, in the electronic governor of 1), a flexibility of the power setting is high but the price is high. Further, attachment on the spot (outdoor and field) and general repair by a serviceman in case of a failure are difficult.

As to the method 2) disclosed in the U.S. patent, the system has a relatively simple structure, and repair is easy, but on-the-spot retrofitting is difficult after distributed to a customer.

In the control 3) using the boost compensator, the system is inexpensive and simple, repair is easy and retrofitting is possible. However, the flexibility of the power setting is low, and since the supercharged pressure is subjected to only the on/off control, the intermediate power setting is impossible even if such setting is necessary. In addition, when turning off supply of the supercharged pressure to the boost compensator, since a duct connecting the turbocharger to the boost compensator is simply opened in the atmosphere, the air supercharged by the turbocharger is partially wastefully discharged in the atmosphere.

In a vehicle having a recent variable power engine, a torque converter provided between the engine and the transmission is often seen. However, in the vehicle having the torque converter, although the driving operation is facilitated, slippage in the torque converter occurs to decrease the mechanical efficiency of power transmission, and reduction is the efficiency during driving at the high speed stage becomes a problem in particular.

Accordingly, a torque converter having a lockup mechanism for directly coupling (locking up) the torque converter at the high speed stage was developed, and a motor grader provided with the torque converter having such a lockup mechanism is on sale from CATERPILLAR in U.S.1 (see the catalog "24H, Motor Grader", p. 192, 1996, CATERPILLAR).

However, the motor grader of CATERPILLAR does not take the relationship between the variable power engine and the lockup mechanism into account at all, and the satisfactory driving control is not realized.

Further, in order to make the running performance of the vehicle having the variable power engine further complete, an all wheel drive (AWD) type vehicle in which a driving wheel can be switched to all the wheels is on sale. This type of all wheel drive type motor grader is on market from JOHN DEERE in U.S. (see the catalog "Motor graders 770C, 770CH, 772CH", 1997, JOHN DEERE).

Although the motor grader of JOHN DEERE takes the relationship between the variable power engine and the all wheel drive into consideration, it does not include the torque converter or that having the lockup mechanism for improving facilitation of the running operation. This motor grader does not sufficiently enhance the operability and the controllability of the vehicle having the variable power engine.

SUMMARY OF THE INVENTION

An object of the present invention is to provide a working vehicle with which an operator can work without changing his/her feeling irrespective of a speed stage position in a transmission.

Another object of the present invention is to provide a working vehicle capable of performing detailed control in each speed stage position in a transmission.

Still another object of the present invention is to provide a working vehicle capable of selecting a degree of connection of a clutch mechanism by operating an inching pedal according to an operator's preference.

In order to achieve the above aim, according to the present invention, a degree of connection (slip state) of a clutch mechanism by operating an inching pedal is controlled by monitoring an angle of an inching pedal, a speed stage position (shift position) of a transmission, and numbers of revolutions of the transmission on input and output sides.

Further, another objection of the present invention described above is attained by connecting an electronic control regulating valve (ECMV) to each clutch of the transmission.

Furthermore, still another object of the present invention described above is attained by adding a mechanism capable of selecting a degree of connection of the clutch mechanism by operating the inching pedal according to an operator's preference.

Specifically, the present invention defined in the first embodiment, provides a working vehicle comprising: an engine; a gear-contained transmission with a clutch having a plurality of clutch mechanisms for converting revolutions of said engine into speed ratios of multiple stages and a gear train; a connection force control mechanism for controlling connection force in said clutch mechanism in said transmission; an inching pedal operated in order to generate a slip in a predetermined clutch mechanism of said transmission; an input side revolution detection mechanism for detecting a number of revolutions on an input side of said transmission to output an input side revolution signal; an output side revolution detection mechanism for detecting a number of revolutions on an output side of said transmission to output an output side revolution signal; a speed stage position detection mechanism for detecting a speed stage position of said transmission to output a speed stage position signal; a pedal angle detection mechanism for detecting a stepping angle of said inching pedal to output a pedal angle signal; and a transmission controller to which said input side revolution signal of said input side revolution detection mechanism, said output side revolution signal of said output side revolution detection mechanism, said speed stage position signal of said speed stage position detection mechanism and said pedal angle signal of said pedal angle detection mechanism are inputted and which outputs a connection force control signal to said connection force control mechanism based on said input side revolution signal, said output side revolution signal, said pedal angle signal and said speed stage position signal in such a manner that a number of revolutions on said output side in said transmission becomes a predetermined value.

According to the present invention, since a degree of connection (slip state) of the clutch mechanism is controlled by operating the inching pedal while monitoring an angle of the inching pedal and a speed stage position (shift position) of the transmission as well as numbers of revolutions of the transmission on the input and output sides, the clutch mechanism can be appropriately connected irrespective of the speed stage position.

In the present invention, the term "speed stage position" is used as a concept including forward and reverse directions. Further, the input side and the output side of the transmission do not necessarily indicate an input and an output of the transmission itself but means the sides which the clutch mechanism generating slippage is engaged to or released from. That is, if the transmission has a plurality of shafts and the clutch mechanism is provided to each shaft, when slippage is generated in one or more clutch mechanisms associated with a first shaft and a second shaft for example, the first shaft is on the input side and the second and the subsequent shafts are on the output side. Therefore, a number of revolutions on the output side can be detected by using the second and the subsequent shafts. This idea can be applied to detection of a number of revolutions on the input side when the shaft associated with slippage is the second or the subsequent shafts. That is, the upstream side of the clutch mechanism associated with slippage corresponds to the input side and the downstream side of the same to the output side.

In the working vehicle according to the first embodiment, the present invention provides a working vehicle, wherein said controller is provided with: an actual speed ratio calculating function for calculating an actual speed ratio in said transmission from a ratio of said input side revolution signal and said output side revolution signal; a target speed ratio calculating function for calculating a target speed ratio in said transmission from said pedal angle signal; and a control signal transmitting function for outputting said connection force control signal to said connection force control mechanism from a difference between said target speed ratio and said actual speed ratio and said speed stage position signal in such a manner that said actual speed ratio becomes a predetermined value.

According to the present invention, the simple calculation in the controller can control slippage of the clutch mechanism.

In general, although the speed ratio means a ratio of a number of revolutions on the input side to a number of revolutions on the output side, in the present invention, basically, the speed ratio may be detected as a slip ratio since detection of the anteroposterior slip state of the clutch mechanism generating slippage is sufficient.

In the working vehicle according to the first embodiment, the present invention provides a working vehicle, wherein said controller is provided with: an actual speed ratio calculating function for calculating an actual speed ratio in said transmission from a ratio of said input side revolution signal and said output side revolution signal; a target speed ratio calculating function for calculating a target speed ratio in said transmission from said pedal angle signal and said speed stage position signal; and a control signal transmitting function for outputting said connection force control signal to said connection force control mechanism from said target speed ratio and said actual speed ratio in such a manner that said actual speed ratio becomes a predetermined value.

According to the present invention, the advantages similar to those of the first embodiment can be obtained.

A difference between the target speed ratio and the actual speed ratio is previously calculated to perform correction based on the speed stage position signal and an obtained correction signal is outputted from the controller to the connection force control mechanism as the connection force control signal in the invention defined in the first embodiment, whilst correction is carried out based on the speed stage position signal in advance when calculating the target speed ratio and the target speed ratio incorporating the content of the speed ratio position signal is compared with the actual revolution signal to output the connection force control signal to the connection force control mechanism in the present invention.

In the working vehicle according to the first embodiment, the present invention provides a working vehicle, wherein said connection force control mechanism is an electronic control regulating valve (ECMV) which is coupled to a predetermined clutch mechanism to be controlled among a plurality of said clutch mechanisms in said transmission and controls an amount of working fluid to said clutch mechanism in response to said connection force control signal from said controller.

According to the present invention, a working fluid quantity to the clutch mechanism can be controlled by the electronic control regulating valve (ECMV) capable of accurate control.

In the working vehicle according to the first embodiment, the present invention provides a working vehicle, wherein said electronic control regulating valve includes: a pressure control valve to which said connection force control signal from said controller is applied and which converts a pressure into a fluid pressure responsive to said signal; and a flow rate detection valve operated by a hydraulic pressure signal from said pressure control valve.

According to this invention, the further accurate control is possible.

In the working vehicle according to the first embodiment, the present invention provides a working vehicle, wherein said gear-contained transmission with said clutch includes a plurality of direction switching clutch mechanisms and a plurality of speed switching clutch mechanisms and a clutch mechanism for generating a slip in accordance with an operation amount of said inching pedal is said direction switching clutch mechanism.

In general, although the clutch mechanism for generating a slip requires satisfactory cooling means because of a large calorific value, the cooling means having the large cooling power may be provided only to the direction switching clutch mechanisms whose number is relatively small according to the present invention, thereby reducing the manufacturing cost.

In the working vehicle according to the first embodiment, the present invention provides a working vehicle, wherein said controller is designed to have a control function such that a number of revolutions on said output side becomes within a predetermined deviation.

According to the present invention, since control is carried out with a given allowance, hunching does not occur during the control.

In the working vehicle according to the first embodiment, the present invention provides a working vehicle, wherein to said controller is connected to a characteristic change mechanism by which a content of said connection force control signal to be outputted to said connection force control mechanism can be changed in accordance with a working condition, an operator's preference and others.

According to the present invention, the slip state of the clutch mechanism can be appropriately changed in accordance with differences in the work condition or an operator's preference.

Yet another object of the present invention is to provide a working vehicle and a speed control method thereof capable of inexpensively obtaining appropriate working power and hyper-slow running with a simple structure.

The present invention intends to attain the above aim by making a judgement upon whether the hyper-slow running is carried out by using the controller and controlling the connection force of the clutch mechanism in the transmission.

Specifically, the present invention defined in the first embodiment, provides a working vehicle comprising: an engine; a gear-contained transmission with a clutch having a plurality of clutch mechanisms for converting revolutions of said engine into speed ratios of a plurality of stages and a gear train; a connection force control mechanism for controlling connection force in said clutch mechanism in said transmission; an output side revolution detection mechanism for detecting a number of revolutions on an output side of said transmission to output an output side revolution signal; a speed stage position detection mechanism for detecting a speed stage position of said transmission to output a speed stage position signal; an accelerator pedal operated in order to increase a number of revolutions of said engine; an accelerator pedal angle detection mechanism for detecting a stepping angle of said accelerator pedal to output an accelerator pedal angle signal; and a transmission controller to which said output side revolution signal of said output side revolution detection mechanism, said speed stage position signal of said speed stage position detection mechanism and said accelerator pedal angle signal of said accelerator pedal angle detection mechanism are inputted, which makes a judgment upon whether a current mode is a hyper-slow running mode based on said output side revolution signal, said speed stage position signal and said accelerator pedal angle signal, and which outputs a connection force control signal to said connection force control mechanism in such a manner that a number of revolutions on said output side in said transmission becomes a predetermined hyper-slow value in case of said hyper-slow running mode.

According to the present invention, since the connection force of the clutch mechanism of the transmission is controlled by using the control signal from the controller through the connection force control mechanism, the hyper-slow running can be acquired with a simple structure.

In the present invention, the term "speed stage position" is used as a concept including the both forward and reverse directions.

In the working vehicle according to the first embodiment, the present invention provides a working vehicle, wherein said controller is provided with: a hyper-slow running mode judging function which determines said hyper-slow running mode when a vehicle speed calculated from said output side revolution signal is smaller than a predetermined speed, e.g., 2.0 km/h or 1.8 km/h larger than a hyper-slow target speed, e.g., 10 km/h, said accelerator pedal angle signal is in a standby mode and said speed stage position signal indicates a predetermined low speed stage position; and a control signal transmitting function for outputting said connection force control signal to said connection force control mechanism in such a manner that a vehicle speed set in said hyper-slow running mode is obtained when said hyper-slow running mode is determined by said hyper-slow running mode judging function.

According to the present invention, the slippage of the clutch mechanism can be controlled by simple calculation in the controller, thereby obtaining the necessary hyper-slow running.

In the working vehicle according to the first embodiment, the present invention provides a working vehicle, wherein said connection force control mechanism is an electronic control regulating valve (ECMV) which is coupled to a predetermined clutch mechanism to be controlled among a plurality of said clutch mechanisms of said transmission and which controls an amount of working fluid to said clutch mechanism in response to said connection force control signal from said controller.

According to the present invention, the working fluid quantity to the clutch mechanism can be controlled by the electronic control regulating valve (ECMV) capable of accurate control.

In the working vehicle according to the first embodiment, the present invention provides a working vehicle, wherein said electronic control regulating valve includes: a pressure control valve to which said connection force control signal from said controller is applied and which converts a pressure into a fluid pressure responsive to said signal; and a flow rate detection valve operated by a hydraulic pressure signal from said pressure control valve.

According to the present invention, the further accurate control is possible.

In the working vehicle according to the first embodiment, the present invention provides a working vehicle, wherein said gear-contained transmission with said clutch includes a plurality of direction switching clutch mechanisms and a plurality of speed switching clutch mechanisms and a clutch mechanism whose clutch connection force is controlled for generating a hyper-slow speed in response to said connection control signal from said connection force control mechanism is said direction switching clutch mechanism.

In general, although the clutch mechanism generating a slip requires satisfactory cooling means because of a large calorific power, provision of the cooling means having a large cooling power to only the direction switching clutch mechanisms whose number is relatively small can suffice the invention, thereby reducing the manufacturing cost.

In the working vehicle according to the first embodiment, the present invention provides a working vehicle, wherein said controller is designed to have a control function such that a number of revolutions on said output side becomes within a predetermined deviation.

According to the present invention, since control is performed with a predetermined allowance, hunching does not occur during the control.

The present invention defined in the second embodiment provides a working vehicle comprising: an engine; a gear-contained transmission with a clutch having a plurality of clutch mechanisms for converting revolutions of said engine into speed ratios of a plurality of stages and a gear train; a connection force control mechanism for controlling connection force in said clutch mechanism of said transmission; a speed mode setting mechanism which can switch a vehicle speed to a normal running mode and a hyper-slow running mode and outputs a running mode signal; and a transmission to which said running mode signal is inputted from said speed mode setting mechanism and which outputs a connection force control signal to said connection force control mechanism in such a manner that a number of revolutions on an output side in said transmission becomes a predetermined hyper-slow value when said running mode signal indicates said hyper-slow running mode.

According to the present invention, the speed mode can be appropriately changed by the speed mode setting mechanism.

The present invention defined in the second embodiment provides a vehicle speed control method for a working vehicle comprising: an engine; a gear-contained transmission with a clutch having a plurality of clutch mechanisms for converting revolutions of said engine into speed ratios of a plurality of stages and a gear train; a connection force control mechanism for controlling connection force in said clutch mechanism of said transmission; an accelerator pedal operated in order to increase revolutions of said engine; an output side revolution detection mechanism for detecting a number of revolutions of said transmission to output an output side revolution signal; a speed stage position detection mechanism for detecting a speed stage position of said transmission to output a speed stage position signal; an accelerator pedal angle detection mechanism for detecting a stepping angle of said accelerator pedal to output an accelerator pedal angle signal; and a transmission controller to which said output side revolution signal of said output side revolution detection mechanism, said speed stage position signal of said speed stage position detection mechanism and said accelerator pedal angle signal of said accelerator pedal angle detection mechanism are inputted, which make a judgment upon whether a current mode is a hyper-slow running mode from said output side revolution signal, said speed stage position signal and said accelerator pedal angle signal and which outputs a connection force control signal to said connection force control mechanism in such a manner that a number of revolutions on said output side of said transmission becomes a predetermined hyper-slow value in case of said hyper-slow running mode, wherein said clutch mechanism and said gear train of said transmission are constituted as a plurality of direction switching clutch mechanisms and a plurality of speed switching clutch mechanisms, and said direction switching clutch mechanism is constituted as a forward low speed clutch mechanism and a reverse clutch mechanism, and wherein the control by said controller in said hyper-slow running mode is effected by supplying a predetermined working fluid pressure to either or both of any clutch mechanism on a driving side of said forward low speed clutch mechanism and said reverse clutch mechanism and a clutch mechanism on an opposite side among said direction switching clutch mechanisms.

According to the present invention, since a predetermined working fluid pressure is supplied to both the driving side clutch mechanism and the opposite side clutch mechanism of either the forward low speed clutch mechanism or the reverse clutch mechanism in the direction switching clutch mechanism to be controlled, the both clutch mechanism are balanced to carry out the speed control, thereby easily realizing the hyper-slow running.

In the vehicle speed control method of a working vehicle according to the second embodiment, the present invention provides a vehicle speed control method for a working vehicle, wherein said control by said controller in said hyper-slow running mode comprises the steps of: (1) supplying a low working fluid pressure of a first stage to said both clutch mechanisms when a vehicle speed is a control target value or within a deviation obtained by adding a predetermined difference to said control target value; (2) maintaining, on one hand, supply of said low working fluid pressure of said first stage to said clutch mechanism on said driving side, and, on the other hand, increasing said working fluid pressure to said clutch mechanism on an opposite side of said driving side to serve as a braking force when said vehicle speed is higher than said control target value or said deviation obtained by adding said predetermined difference to said control target value; and (3) maintaining, on one hand, supply of said low working fluid pressure of said first stage to said clutch mechanism on an opposite side of said driving side and, on the other hand, increasing said working fluid pressure to said clutch mechanism on said driving side to serve as a speed increasing force when a vehicle speed is lower than said control target value or said deviation obtained by adding said predetermined difference to said control target value.

According to this invention, the hyper-slow running can be produced more accurately.

In the vehicle speed control method of a working vehicle according to the second embodiment, the present invention provides a vehicle speed control method of a working vehicle, wherein said control by said controller in said hyper-slow running mode comprises the steps of: (1) supplying a low working fluid pressure for generating a slip in said clutch mechanism on said driving side when a vehicle speed becomes not more than a predetermined value larger than a control target value; and (2) causing a braking force to act as an appropriate value by increasing or decreasing said working fluid pressure having a predetermined difference in accordance with a fixed cycle to said clutch mechanism on an opposite side of said driving side when a vehicle speed is higher or lower than said control target value beyond a predetermined difference, and shifting from said hyper-slow running mode to said normal running mode when a vehicle speed becomes not less than a predetermined value larger than said predetermined value greater than said control target value for entering said hyper-slow running mode.

According to the present invention, the hyper-slow running can be further accurately realized.

In the vehicle speed control method of a working vehicle according to the second embodiment, the present invention provides a vehicle speed control method for a working vehicle, wherein said control by said controller in said hyper-slow running mode comprises the steps of: (1) supplying a low working fluid pressure for generating a slip in said clutch mechanism on said driving side when a vehicle speed becomes not more than a predetermined value larger than a control target value; and (2) causing a braking force to act as an appropriate value by increasing or decreasing a working fluid pressure suitable for a deviation between said actual vehicle speed and said target vehicle speed to said clutch mechanism on an opposite side of said driving side when a vehicle speed is higher or lower than said control target value beyond a predetermined difference, and shifting from said hyper-slow running mode to said normal running mode when a vehicle speed becomes not less than a predetermined value larger than said predetermined value greater than said control target value for entering said hyper-slow running mode.

According to the present invention, the hyper-slow running can be further accurately realized.

A further object of the present invention is to provide an inexpensive variable power engine which has a simple structure and facilitates repair and retrofitting and which has a relatively high flexibility of power setting, and a power setting method thereof.

In order to attain the above object, the present invention provides a variable power engine, wherein a pressure state switching mechanism which can switch between and supply a reference pressure to be supplied to a boost compensator and at least a first-stage predetermined pressure decreased to be lower than the reference voltage is provided in a manifold for supplying a charged pressure (output side pressure) of a turbocharger to a fuel injector having a boost compensator, and the pressure state switching mechanism is switched in accordance with a speed stage position signal of a transmission.

In order to attain the above object, the present invention provides a power setting method of a variable power engine, wherein the charged pressure of the turbocharger is supplied to the boost compensator as at least a two-or-more-stage predetermined pressure which is equal to or lower than the charged pressure and higher than an atmospheric pressure in accordance with the speed stage of the transmission.

Specifically, the present invention according to the modification of the sixth embodiment provides a variable power engine comprising: a turbocharger for supplying a charged pressure to an engine; a fuel injector with a boost compensator for adjusting a fuel oil consumption in accordance with said charged pressure of said turbocharger; a transmission for changing output revolutions of said engine to a plurality of speed stages; a manifold for supplying said charged pressure of said turbocharger to said boost compensator; a pressure state switching mechanism which is provided to said manifold and capable of switching a pressure to be supplied to said boost compensator to predetermined pressures of at least two stages equal to or lower than said charged pressure of said turbocharger and higher than an atmospheric pressure; and a speed stage position detection mechanism for detecting a speed stage position of said transmission to supply a speed stage position signal to said pressure state switching mechanism, said pressure state switching mechanism being caused to perform pressure state switching operation by said speed stage position signal supplied from said speed stage position detection mechanism.

According to the present invention, since the supply pressure to the boost compensator can be changed to a predetermined set pressure to be supplied by the pressure state switching mechanism, an engine power matched with the operation content can be obtained, thereby improving the work efficiency.

In the variable power engine according to the modification of the sixth embodiment, the present invention provides a variable power engine, wherein said pressure state switching mechanism comprises; a hydraulic circuit device which is provided to said manifold and demonstrates a resistance action or a pressure decreasing action with respect to said manifold; an auxiliary manifold branched off between said hydraulic circuit device and said boost compensator in said manifold; and switching means which is provided to said auxiliary manifold and capable of switching between a state in which said auxiliary manifold is blocked and a state in which a pressure of said auxiliary manifold is released and a pressure to be applied from said turbocharger to said manifold is decreased to be a predetermined pressure of at least one stage lower than said pressure and higher than an atmospheric pressure.

According to the present invention, since the auxiliary manifold is provided to the manifold for supplying the charged pressure of the turbocharger to the boost compensator and the switching means for switching between the state in which the auxiliary manifold is blocked and the state in which the pressure is decreased to a predetermined pressure lower than the charged pressure, the predetermined pressure can be set with a simple structure.

In the variable power engine according to the modification of the sixth embodiment, the present invention provides a variable power engine, wherein said hydraulic circuit device provided to said manifold is constituted by a throttle.

According to the present invention, the hydraulic circuit device can have a very simple structure and provided inexpensively.

In the variable power engine according to the modification of the sixth embodiment, the present invention provides a variable power engine, wherein said switching means provided to said auxiliary manifold is constituted by a two-position selector valve capable of switching between a duct blocking state and a communicating state and a throttle provided to a duct on a slip stream side of said two-position selector valve in said communicating state of said two-position selector valve.

According to the present invention, the switching means can be constituted by a simple mechanism and inexpensively provided.

In the variable power engine according to the modification of the sixth embodiment, the present invention provides a variable power engine, wherein said slip stream side of said auxiliary manifold is connected to a duct on an upstream side of said turbocharger.

According to the present invention, when supplying a pressure decreased to be not more than the reference pressure to the boost compensator, the pressure flowing from the auxiliary branch circuit can be assuredly flowed back to the turbocharger side, eliminating the wasteful outflow of the pressure.

In the variable power engine according to the modification of the sixth embodiment, the present invention provides a variable power engine, wherein said pressure state switching mechanism is caused to switch to said state for blocking said auxiliary manifold when said speed stage position signal supplied from said speed stage position detection mechanism is a high speed stage position signal.

According to the present invention, a light work operation at a high speed can be assuredly automatically performed with a high power in accordance with the speed stage position.

The present invention as disclosed in the modification to the seventh embodiment provides a variable power engine comprising: a turbocharger for supplying a charged pressure to an engine; a fuel injector with a boost compensator for adjusting a fuel oil consumption in accordance with said charged pressure of said turbocharger; a transmission for changing output revolutions of said engine to a plurality of speed stages; a manifold for supplying said charged pressure of said turbocharger to said boost compensator; a pressure state switching mechanism which is provided to said manifold and capable of switching a pressure to be supplied to said boost compensator to a pressure equal to said charged pressure of said turbocharger and a predetermined pressure of at least one stage lower than said charged pressure and higher than an atmospheric pressure; and a speed stage position detection mechanism for detecting a speed stage position of said transmission to supply a speed stage position signal to said pressure state switching mechanism, said pressure state switching mechanism being caused to perform pressure state switching operation by said speed stage position signal supplied from said speed stage position detection mechanism.

According to the present invention, it is possible to obtain an engine power matched with a content of work as similar to the invention defined in the sixth embodiment modifications, thereby improving the work efficiency.

In the variable power engine according to the modification of the seventh embodiment, the present invention provides a variable power engine, wherein said pressure state switching mechanism provided to said manifold is constituted by a two-position selector valve capable of switching said communicating state of said manifold to two positions and a pressure reducing valve provided to at least one duct on a slip stream side of said two-position selector valve.

According to the present invention, the object of the present invention can be attained by providing a simple hydraulic circuit device to the branch circuit.

The present invention according to the modification of the sixth embodiment provides a power setting method for a variable power engine, said variable power engine comprising: a turbocharger for supplying a charged pressure to an engine; a fuel injector with a boost compensator for adjusting a fuel oil consumption in accordance with said charged pressure of said turbocharger; and a transmission for changing output revolutions of said engine to a plurality of speed stages, wherein said charged pressure of said turbo charger is supplied to said boost compensator as predetermined pressures of at least two stages equal to or lower than said charged pressure of said turbocharger and higher than an atmospheric pressure to set an engine power in accordance with a speed stage position of said transmission.

According to the present invention, a pressure supplied to the boost compensator can be readily set to two or more stages between the charged pressure and the atmospheric pressure, thereby easily obtaining a desired engine power.

In the power setting method of the variable power engine according to the modification of the sixth embodiment, the present invention provides a power setting method, wherein a pressure equal to said charged pressure of said turbocharger is supplied to said boost compensator to set an engine power when a speed stage position of said transmission is a high speed stage position.

According to the present invention, a light work operation at a high speed can be assuredly carried out automatically with a high power.

In a vehicle with a variable power engine, a still further object of the present invention is to provide a vehicle with a variable power engine which can satisfactorily demonstrate performances of the variable power engine and has the excellent operability and a power controlling method thereof.

In order to attain the above object, the present invention provides to a variable power engine a transmission with a lockup mechanism and an engine power controller for controlling power of the variable power engine by a speed stage position signal of the transmission and a lockup enabled/disabled signal of the lockup mechanism.

In addition to the above structure, the present invention further provides a wheel driving state switching mechanism for changing over a wheel to be driven among wheels of a vehicle, and a wheel driving state detection mechanism for detecting the switching state of the wheel driving stage switching mechanism to output a wheel driving state detection signal to an engine power controller, thereby further achieving the above object.

Specifically, the present invention as disclosed in the eighth embodiment provides a vehicle with a variable power engine comprising: an engine; an engine power switching device for changing a power of said engine to a plurality of stages; a torque converter with a lockup mechanism coupled with an output side of said engine; a multi-stage speed change transmission couple to an output side of said torque converter; a lockup detection mechanism for detecting on/off of an operation of said lockup mechanism to output a lockup enabled/disabled signal; a speed stage position detection mechanism for detecting a speed stage position of said transmission to output a speed stage position signal; and an engine power controller to which said speed stage position signal from said speed stage position detection mechanism and said lockup enabled/disabled signal from said lockup detection mechanism are inputted and which outputs an engine power switching signal to said engine power switching device.

According to the present invention, the torque converter enables the further smooth driving; the lockup mechanism can further improve the driving efficiency at a high speed; and an appropriate engine power can be obtained in accordance with a speed stage position of the transmission and the on/off of the lockup of the torque converter.

In the vehicle with the variable power engine according to the modification of the eighth embodiment, the present invention provides a vehicle with a variable power engine, wherein a turbocharger for supplying a charged pressure to said engine is connected to said engine, and said engine power switching device includes: a fuel injector having a boost compensator for adjusting a fuel oil consumption to said engine in accordance with said charged pressure of said turbocharger; and a pressure state switching mechanism for switching a pressure to be supplied to said boost compensator to predetermined pressures of at least two stages.

According to the present invention, a power of the variable power engine can be readily switched by utilizing the charged pressure of the turbocharger.

In the vehicle with the variable power engine according to the modification of the eighth embodiment, the present invention provides a vehicle with a variable power engine, wherein a wheel driving state switching mechanism for switching which wheel among wheels of said vehicle is driven is coupled to said transmission, and said wheel driving state switching mechanism is provided with a wheel driving state detection mechanism for detecting a switching state of said wheel driving state switching mechanism to output a wheel driving state detection signal to said engine power controller.

According to the present invention, when the wheel driving state can be switched, the engine power can be optimally controlled in accordance to this wheel driving state.

The present invention the modification of the eighth embodiment provides a power control method of a vehicle with a variable power engine, said vehicle comprising: an engine; an engine power switching device for changing power of said engine to a plurality of stages; a torque converter with a lockup mechanism coupled to an output side of said engine; a multi-stage speed change transmission coupled to an output side of said torque converter; a lockup detection mechanism for detecting on/off of an operation of said lockup mechanism to output a lockup enabled/disabled signal; a speed stage position detection mechanism for detecting a speed stage position of said transmission to output a speed stage position signal; and engine power controller to which said speed stage position signal from said speed stage position detection mechanism and a lockup enabled/disabled signal from said lockup detection mechanism are inputted and which outputs an engine power switching signal to said engine power switching device, wherein said engine power controller controls said engine power switching device in such a manner that engine power is obtained on a high power side (high power state) when said speed stage position signal from said speed stage position detection mechanism indicates a higher speed stage position than a predetermined speed stage and controls said engine output switching device in such a manner that said engine power is obtained on said high power side at a higher speed stage position than said speed stage position switched to said high power side when said lockup enabled/disabled signal from said lockup detection mechanism is a lockup enabled signal.

According to the present invention, the power of the variable power engine can be optimally controlled by using the speed stage position of the transmission and on/off of the lockup of the torque converter.

The present invention the modification of the eighth embodiment provides a power control method of a vehicle with a variable power engine, said vehicle comprising: an engine; an engine power switching device for changing power of said engine to a plurality of stages; a torque converter with a lockup mechanism coupled to an output side of said engine; a multi-stage speed change transmission coupled to said output side of said torque converter; a lockup detection mechanism for detecting on/off of an operation of said lockup mechanism to output a lockup enabled/disabled signal; a speed stage position detection mechanism for detecting a speed stage position of said transmission to output a speed stage position signal; a wheel driving state switching mechanism which is coupled to an output side of said transmission and switches which wheel among wheels of said vehicle is driven; a wheel driving state detection mechanism for detecting a switching state of said wheel driving state switching mechanism to output a wheel driving state detection signal; and engine power controller to which said wheel driving state detection signal from said wheel driving state detection mechanism, said speed stage position signal from said speed stage position detection mechanism and said lockup enabled/disabled signal from said lockup detection mechanism are inputted and which outputs an engine power switching signal to said engine power switching device, wherein said engine power controller controls said engine power switching device in such a manner that engine power is obtained on a high power side when said speed stage position signal from said speed stage position detection mechanism indicates a higher speed stage position than a predetermined speed stage, controls said engine power switching device in such a manner that said engine power is obtained on said high power side at a higher speed stage position than said speed stage position switched to said high power side when said lockup enabled/disabled signal from said lockup detection mechanism is a lockup enabled signal, and controls said engine power switching device so as to switch to said high power state at a lower speed stage position than a speed stage position switched to said high power side before a number of driven wheels is increased when said wheel driving state switching mechanism performs switching in a direction for increasing a number of driven wheels.

According to the present invention, the power of the variable power engine can be optimally controlled by using a speed stage position of the transmission, on/off of the lockup of the torque converter and a number of driven wheels among wheels.

BRIEF DESCRIPTION OF THE DRAWING

FIG. 30 is a graph showing the relationship between a vehicle speed (V: horizontal axis) and a rim pull (F: horizontal axis) in a vehicle with a variable power engine such as this embodiment; and FIG. 31 is a graph showing an example of a vehicle performance in a general vehicle with a variable power engine.

DETAILED DESCRIPTION OF THE PREFERRED EMBODIMENT(S)

First Embodiment

A first embodiment according to the present invention will now be described with reference to the accompanying drawings.

Figure 1:
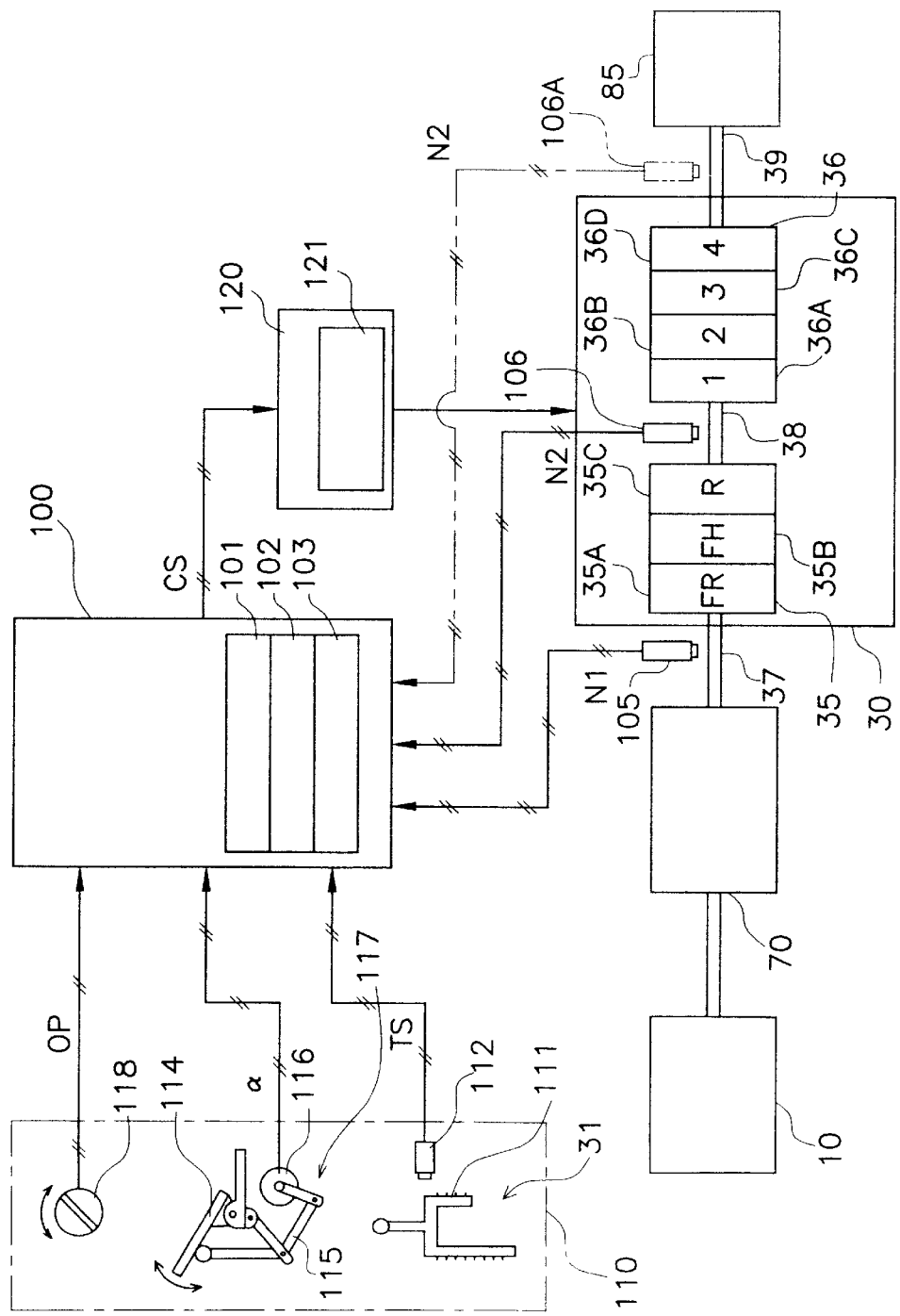
FIG. 1 is a block diagram showing a schematic structure of a first embodiment according to the present invention.

FIG. 1 shows a schematic structure of a primary part of a working vehicle according to this embodiment.

As similar to a general engine, to an engine 10 are coupled a non-illustrated induction pipe, an exhaust pipe, a fuel injector and others, and a torque converter with a lockup mechanism 70 is connected to an output shaft of the engine 10.

The torque converter with the lockup mechanism 70 has the same structure as a general commercial product, and to an output side of the torque converter 70 is connected an electronically controlled multi-stage speed change transmission 30 which contains a gear with a clutch for converting revolutions of the engine 10 to a multi-stage velocity ratio to be transmitted rearwards. This enables the power of the engine 10 to be transmitted to the transmission 30 through the torque converter 70.

The transmission 30 changes output revolutions of the engine 10 to multiple speed stages, for example, eight stages from a forward first speed to an eighth speed, four stages from a reverse first speed to a fourth speed, namely, a total of 12 speeds to be transmitted to running means 85 such as wheels. The transmission 30 includes a plurality of direction switching clutch mechanisms 35 (35A, 35B and 35C) of three stages, i.e., a forward low speed (FL), a forward high speed (FH) and reverse (R) in this embodiment; a plurality of speed switching clutch mechanisms 36 (36A, 36B, 36C and 36D) of four stages, i.e., a first speed to a fourth speed in this embodiment; and a gear train appropriately provided between these clutch mechanisms 35 and 36. The structure of the transmission 30 is equal to that of a general commercial product.

With this configuration, connecting any of the respective direction switching clutch mechanisms 35 to any of the speed switching clutch mechanisms 36 can obtain the speed stage position of the forward eight stages and the rear four stages described above.

Specifically, when the forward low speed clutch mechanism FL (35A) of the direction switching clutch mechanisms 35 is coupled with any of the first to fourth stages (36A, 36B, 36C and 36D) of the speed switching clutch mechanisms 36, the speed stage positions of the forward first, third, fifth and seventh speeds can be obtained. Further, when the forward high speed clutch mechanism FH (35B) is coupled with any of the first to fourth stages of the speed switching clutch mechanisms 36, the speed stage positions of the forward second, fourth, sixth and eighth speeds can be obtained. Furthermore, coupling the rear clutch mechanism R (35C) with any of the first to fourth stages of the speed switching clutch mechanisms 36 can obtain the speed stage positions of the rear first, second, third and fourth speeds.

The transmission 30 includes first to third shafts 37, 38 and 39. An input side revolution detection mechanism 105 for detecting a number of revolutions of the first shaft 37 to output as an input side revolution signal N1 to a transmission controller 10 is provided in close vicinity to the first shaft 37 on the uppermost stream side, i.e., on the engine 10 side in these shafts. Additionally, an output side revolution detection mechanism 106 for detecting a number of revolutions of the second shaft 38 to output as an output side revolution signal N2 to the controller 100 is provided in close vicinity to the second shaft 38 disposed between the direction switching clutch mechanism 35 and the speed switching clutch mechanism 36. For example, magnetic, optical, or any other type of revolution sensors are used for the revolution detection mechanisms 105 and 106.

It is to be noted that an output side revolution detection mechanism 106A for detecting a number of revolutions of the third shaft 39 on a lowermost stream side, i.e., on the side of running means 35 such as wheels or a tracklayer may substitute for the output side revolution detection mechanism 106.

The speed stage position of the transmission 30 can be detected by a speed stage position detection mechanism (speed stage position signal generation mechanism) 31. The speed stage position detection mechanism 31 is a mechanism for detecting which speed stage the transmission 30 is selected to, for example, detecting a position of a shift lever 111 provided to a driver seat 110 and the like of a working vehicle by using a detector 112 and outputting a speed stage position signal (TS) to the controller 100.

To the driver seat 110 is provided a predetermined clutch mechanism 30, i.e., an inching pedal (clutch pedal) 114 operated for generating a slip in the direction switching clutch mechanism 35 in this embodiment. An angle sensor 116 constituted by a potentiometer and the like is coupled with the inching pedal 114 through a link mechanism 115. The link mechanism 115 and the angle sensor 116 are used to detect a stepping angle of the inching pedal 114, and a pedal angle detection mechanism 117 is constituted for outputting a pedal angle signal á to the controller 100.

Further, to the driver seat 110 is provided a characteristic change mechanism 118 by which a flexibility of connection (slip condition) of the clutch mechanisms 35 by the operation of the inching pedal 114 can be selected in accordance with an operator's preference. This characteristic change mechanism 118 is constituted by a dial, a changeover switch and others and outputs a characteristic change signal OP to the controller 100.

To the controller 100 are applied a speed stage position signal TS from the speed stage position detection mechanism 31, an input side revolution signal N1 from the input side revolution detection mechanism 105, an output side revolution signal N2 from the output side revolution detection mechanism 106, a pedal angle signal á from the pedal angle detection mechanism 117 and a characteristic change signal OP from the characteristic change mechanism 118, as described above. The controller 100 has: an actual speed ratio calculating function 101 for calculating an actual speed ratio (an actual speed ratio or an actual slip ratio) SA in the transmission 30 based on a ratio of the input side revolution signal N1 and the output side revolution signal N2 among the above signals; a target speed ratio calculating function 102 for calculating a target speed ratio SO in the transmission 30 based on the pedal angle signal á; and a control signal transmitting function 103 for outputting a connection force control signal CS to a later-described connection force control mechanism 120 based on a difference between the target speed ratio SO and the actual speed ratio SA (SO−SA) and the speed stage position signal TS in such a manner that the actual speed ratio SA becomes a predetermined value.

The controller 100 includes a CPU, a ROM, a RAM and others, and functions as a kind of computer so that it can demonstrate the above-described respective functions and any other function.

The connection force control mechanism 120 is constituted by a plurality of electronic control regulating valves (ECMV=Electronic control regulating valve) 121, and each electronic control regulating valve 121 is connected to a predetermined clutch mechanism 35 or 36 of the multi-stage speed change transmission 30.

Figure 2:
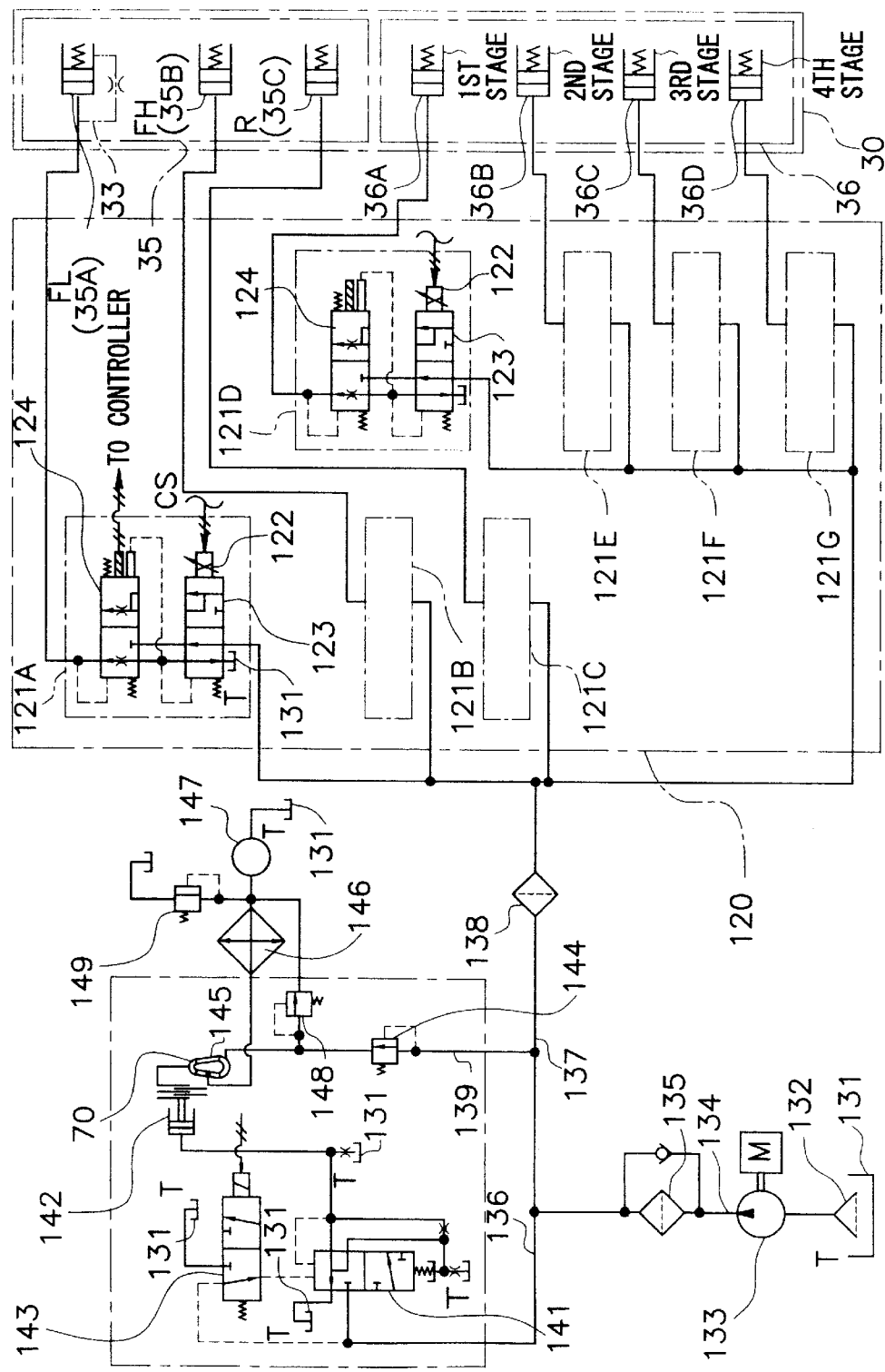
FIG. 2 is a fluid pressure circuit diagram used in the embodiment of FIG. 1.

FIG. 2 shows a hydraulic (fluid pressure) circuit including the torque converter 70, the transmission 30 and the connection force control mechanism 120. In this drawing, a plurality of electronic control regulating valves 121 having the same structure are partially specifically shown, and the remaining part of the same is schematically illustrated.

In FIG. 2, a number of the electronic control regulating valves 121 of the connection force control mechanism 120 corresponds to a number of clutch mechanisms of the transmission 30, and the number of the valves is seven in this embodiment. Here, when the seven electronic control regulating valves 121 are differentiated from each other, reference characters A to G are added to reference numeral 121 of the electronic control valves.

Further, when the direction switching clutch mechanisms 35 and the speed switching clutch mechanisms of the transmission 30 are differentiated from each other, reference characters A to C are added to reference numeral of the direction switching clutch mechanisms 35 and reference symbols A to D are added to reference numeral 36 of the speed switching clutch mechanisms 36.

In FIG. 2, a strainer 132 is inserted in a tank 131 in which oil as a fluid is filled; and a pump 133 is connected to the strainer 132; and a pressure oil having a predetermined pressure and a flow rate is supplied to a main pipe line 134 by the pump 133. An oil filter 135 is provided to the main pipe line 134, and its end is branched off in two.

A hydraulic equipment for the lockup mechanism of the torque converter 70 is connected to one branched-off pipe line 136, and the connection force control mechanism 120 for controlling the transmission 30 is connected to the other pipe line 137 through the oil filter 138.

The hydraulic equipment for the lockup mechanism connected to the pipe line 136 includes: a lockup valve 141 consisting of a pilot type 4-port 2-position selector valve; a lockup clutch mechanism 142 connected to the downstream side of the lockup valve 141; and a lockup solenoid valve 143 consisting of a three-port two-position selector valve which supplies a pilot pressure to the lockup valve 141 and is solenoid-operated.

Here, when no electrical signal is inputted to the solenoid of the lockup solenoid valve 143, the lockup solenoid valve 143 is at an illustrated position by a spring force, and the pilot pressure is applied to the lockup valve 141 through the lockup solenoid valve 143 so that the lockup valve 141 is situated at the illustrated position against the spring force, namely it blocks the pipe line 136. Therefore, the hydraulic pressure of the pipe line 136 is not transmitted to the lockup clutch mechanism 142, and the hydraulic pressure in the lockup clutch mechanism 142 flows out to the tank 131 through the lockup valve 141, leading to no lockup state of the torque converter 70.

On the other hand, when the electrical signal is inputted to the solenoid of the lockup solenoid valve 143, the lockup solenoid valve 143 is moved to the left side in the drawing against the spring force. This causes the pilot pressure acting on the lockup valve 141 to flow out to the tank 131 through the lockup solenoid valve 143, and the lockup valve 141 is hence moved to the upper side in the drawing by the spring force. Consequently, the hydraulic pressure of the pipe line 136 is supplied to the lockup clutch mechanism 142 through the lockup valve 141, enabling lockup of the torque converter 70.

An equipment lubricating pipe line 139 is branched off from the middle of the pipe line 137 connected to the connection force control mechanism 120 side, and this pipe line 139 is connected to a torque converter lubricating line 145 through a main relief valve 144. The pipe line 139 is further connected to a transmission lubricating line 147 through the oil cooler 146 and opened in the tank 131. Moreover, a torque converter relief valve 148 is provided between the main relief valve 144 of the pipe line 139 and the toque converter lubricating line 145, and a transmission lubricating relief valve 149 is provided between the oil cooler 146 of the pipe line 139 and the transmission lubricating line 147.

The torque converter lubricating line 145 is a flow path which is provided in a body of the torque converter 70 and lubricates the torque converter 70 with oil led in the torque converter 70. In addition, the transmission lubricating line 147 is a flow path which is provided in a body of the transmission 30 and lubricates the transmission 30 with oil led in the transmission 30.

The electronic control regulating valve 121 includes: a pressure control valve (proportional control valve) 123 consisting of a four-port two-position selector valve having a proportional solenoid 122; and a flow rate detection valve 124 consisting of a pilot type three-port two-position selector valve. The pressure control valve 123 converts an oil pressure into another oil pressure responsive to an intensity of a current valve of the connection force control signal CS which is transmitted from the controller 100 and received by the proportional solenoid 122.

The flow rate detection valve 124 operates by a hydraulic pressure signal (trigger) based on a pilot hydraulic pressure from the pressure control valve 123 and has the following three functions.

1) The valve is opened until the oil is filled in the direction switching clutch mechanism 35 and the speed switching clutch mechanism 36 of the transmission 30 so that oil filling time of the direction switching clutch mechanisms 35 and the speed switching clutch mechanisms 36 is shortened.

2) The valve is closed at the same time when the oil is filled in the direction switching clutch mechanism 35 and the speed switching clutch mechanism 36, and a signal (fill signal) is outputted to the controller 100 to inform of completion of filling.

3) When the hydraulic pressure is being applied to the direction switching clutch mechanism 35 and the speed switching clutch mechanism 36, the fill signal is outputted to the controller 100 to inform of presence/absence of the hydraulic pressure.

In FIG. 2, the respective electronic control regulating valves 121 constituting the connection force control mechanism 120 are connected to the respective clutch mechanisms 35 and 36 of the transmission 30.

Specifically, the electronic control regulating valve 121A is connected to the forward low speed clutch mechanism FL (35A) of the direction switching clutch mechanism 35; the electronic control regulating valve 121B, to the forward high speed clutch mechanism FH (35B) of the direction switching clutch mechanism 35; the electronic control regulating valve 121C, to a rear clutch mechanism R (35C) of the direction switching clutch mechanism 35; the electronic control regulating valve 121D, to the first stage clutch mechanism 36A of the speed switching clutch mechanism 36; the electronic control regulating valve 121E, to the second stage clutch mechanism 36B of the speed switching clutch mechanism 36; the electronic control regulating valve 121F, to the third stage clutch mechanism 36C of the speed switching clutch mechanism 36; and the electronic control regulating valve 121G, to the fourth clutch mechanism 36D of the speed switching clutch mechanism 36.

Although the structure of the respective direction switching clutch mechanism 35 and speed switching clutch mechanisms 36 in which a spring is used as a drive source for separating a clutch is illustrated, the present invention is not necessarily restricted thereto, and it may be a rotating clutch type structure which operates by a pilot pressure as indicated by a virtual line (alternate long and two short dashes line) 33 at a position of the forward low speed clutch mechanism FL (35A) in FIG. 2.

Results of First Embodiment

Results of this embodiment configured as described above will now be described with reference to graphs of FIGS. 3 and 5 and a flow chart of FIG. 4.

Referring to FIG. 2, at the start of the operation using the working vehicle, when the engine 10 is driven and the forward first speed is selected by the shift lever 111, the speed stage position detection signal TS is sent from the speed stage position detection mechanism 31 to the controller 100, and the connection force control signal CS is supplied from the controller 100 to the connection force control mechanism 120. The connection force control signal CS causes the electronic control regulating valve 121 of the connection force control mechanism 120 to be operated in such a manner that the forward low speed clutch mechanism FL (35A) of the direction switching clutch mechanisms 35 is connected to the first stage clutch mechanism 36A of the speed switching clutch mechanism 36 in the transmission, thereby starting the working vehicle.

At this time, since the lockup signal is not inputted to the lockup solenoid valve 143, the torque converter 70 is not locked up and thereby functions as a normal torque converter.

Incidentally, the lockup operation of the torque converter 70 is not concerned in the present invention, the explanation thereof is omitted, but the lockup operation is carried out during the high speed running and the like as similar to the general cases.

A signal of the electronic control regulating valve 121 to which the connection force control signal CS has been transmitted from the controller 100 is inputted to the proportional solenoid 122 shown in FIG. 2, and the pressure control valve 123 moves to the left side in response to a current amount of the signal against the spring force. As a result, the hydraulic pressure supplied from the pump 133 through the main pipe line 134 and the pipe line 137 flows into the flow rate detection valve 124 through the pressure control valve 123 and is supplied to the forward low speed clutch mechanism FL (35A) and the first stage clutch mechanism 36A of the speed switching clutch mechanism 36.

Thereafter, the sequential shift up is performed by the shift lever 111 so that the shift lever 111 is set to the speed stage position matched with a required work. For example, when working at the forward third speed, the forward low speed clutch mechanism FL (35A) of the direction switching clutch mechanisms 35 is connected to the second stage clutch mechanism 36B of the speed switching clutch mechanisms 36.

In this state, when reduction in the vehicle speed is desired while maintaining the power for the work, the inching pedal 114 is stepped. This can cause the pedal angle signal a from the angle sensor 116 of the pedal angle detection mechanism 117 to be outputted to the controller 100, and the connection force control signal CS from the controller 100 lowers the current value outputted to the electronic control regulating valve 121 of the connection force control mechanism 120. Reduction in the current value involves decrease in the connection force of the direction switching clutch mechanism 35A to cause a slip in the direction switching clutch mechanism 35A, thus lowering the vehicle speed.

Figure 3:
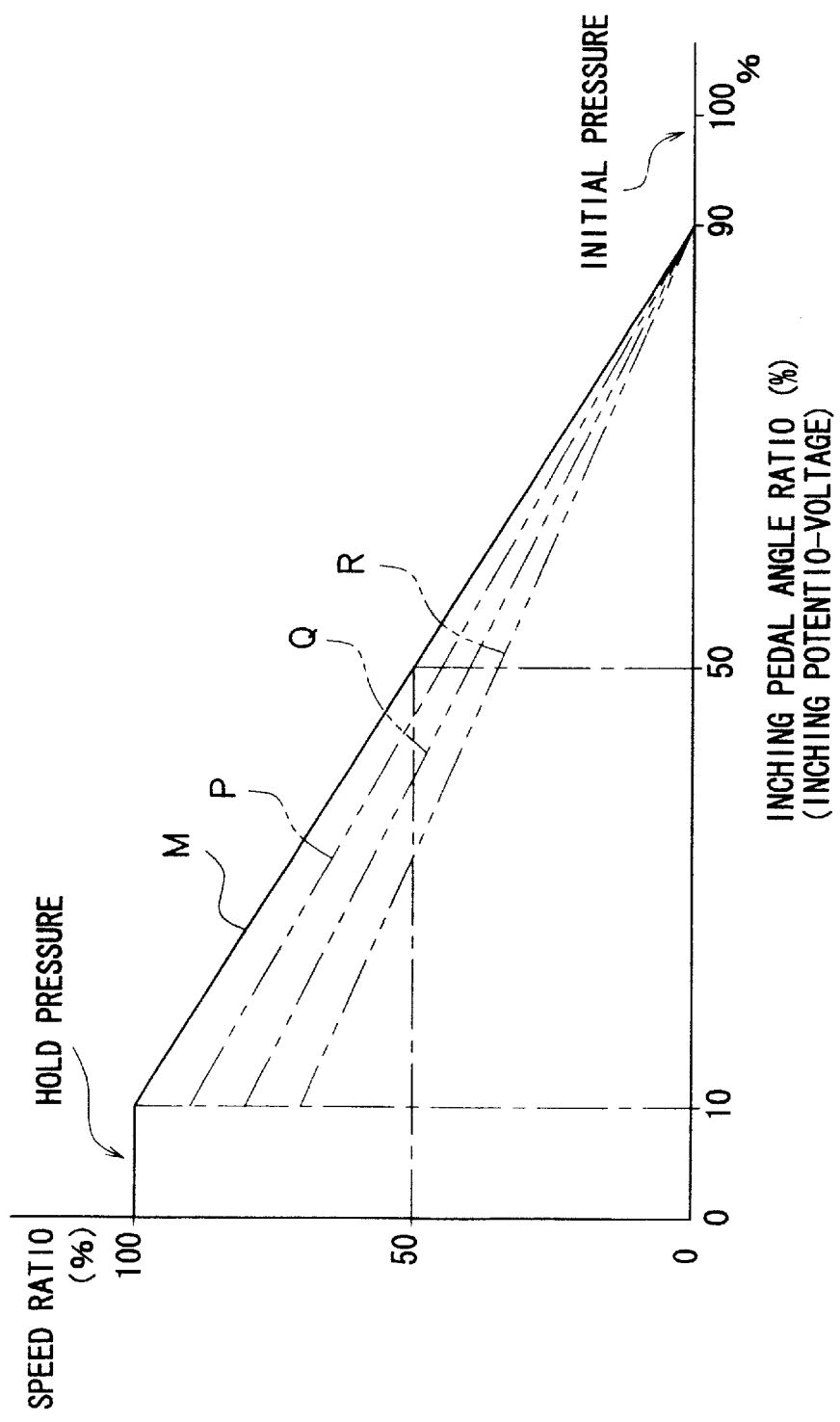
FIG. 3 is a graph showing the relationship between an inching pedal angle ratio and a transmission speed ratio in the embodiment of FIG. 1.

FIG. 3 shows the relationship between an angle of the inching pedal 114 described above and a speed ratio S of the input side and the output side in the transmission 30.

In FIG. 3, a horizontal axis represents an angle ratio (%) of the inching pedal 114 and a vertical axis represents a speed ratio (%) of the input side and the output side of the transmission 30.

Here, 0% of the inching pedal angle ratio corresponds to the state where the inching pedal is not stepped at all; 100% of the same, the state where the inching pedal is stepped completely; 10% of the same, the state where a foot is lightly put on the inching pedal 114 and there is no will of stepping on it; and 90% of the same, the state where the inching pedal is completely stepped while taking into account machine irregularities and the like.

Further, 0% of the speed ratio S corresponds to the complete slippage, i.e., no connection is established; and 100%, the complete connection is established with no slip.

In FIG. 3, when stepping of the inching pedal 114 is less than 10%, a large current is supplied to the proportional solenoid 122 of the electronic control regulating valve 121 so that the speed ratio S becomes 100%, and when stepping is not less than 90%, no current is supplied so that the speed ratio S becomes 0%. In the intermediate position, as indicated by a solid line M, the relationship between an angle of the inching pedal 114 and the speed ratio S is designed to linearly vary and, for example, 50% of the speed ratio (slip ratio) S can be obtained with the 50% stepping of the inching pedal 114.

Here, the control target causing slip is determined to be the direction switching clutch mechanism 35 as described above.

Further, although an angle of the inching pedal 114 is detected by the angle sensor 116, if the angle sensor 116 is constituted by a potentiometer, the detected angle is outputted as a voltage corresponding thereto to the controller 100. The characteristic obtained by the potentiometer is represented by a notation in parentheses of the horizontal direction in FIG. 3.

When operating the inching pedal 114, the stepping angle and the sense relative to the slip ratio are different depending on the operators. Therefore, in the present embodiment, the characteristics indicated by alternate long and two short dashes lines P, Q and R are presented in addition to the characteristic indicated by the solid line M. Here, when the large slip with a small stepping quantity is desired, the characteristic of the long and two short dashes line R may be selected. Also, when increase in slip is desired with a stepping angle which is large in some measure, and when the intermediate characteristic is desired, P or Q may be selected.

Switching of these characteristics can be attained by manipulating a dial and the like of a characteristic change mechanism 118 by an operator, and the controller 100 performs control responsive to the manipulation state of the characteristic change mechanism 118.

Although the above has described the cases where slippage is caused in the direction switching clutch mechanism 35 by stepping on the inching pedal 114 in running of the working vehicle, i.e., during the working state, the similar operation is carried out when the machine is stopped and the inching pedal 114 is gradually released from the completely stepped state (not less than 90%) of the inching pedal 114 to start the machine.

In such a case, although the matching of the feeling (sense) with start of the machine enabled by a given level of pedal releasing may differ depending on the operators, this can be dealt by operating the above-described characteristic change mechanism 118.

Further, the slip rate relative to the stepping angle varies in accordance with the speed stage position.

That is, in general, it is determined that the speed ratio (speed decreasing ratio) of the input side and the output side in the forward first speed is, for example, approximately 10, whereas it is approximately two in case of the forward fifth speed. Also, it is approximately 0.8 in the forward eighth speed (speed increasing ratio).

In terms of the driving force (torque) in the working vehicle, the larger torque can be demonstrated as the speed stage position becomes lower. On the other hand, in order to drive the working vehicle, the driving force above a give value is required, and the necessary driving force for moving the working vehicle is substantially fixed irrespective of the speed stage position.

Therefore, in the low speed stage position such as the forward first speed by which the large torque can be demonstrated, starting is enabled even if the considerably large slippage is generated in the direction switching clutch mechanism 35, i.e., even if the inching pedal 114 is slightly released from the maximum stepped state (the state in which the inching pedal angle ratio is close to 90%). Whilst, when trying to start from the medium speed stage position such as the forward third or fourth speed, since the original torque (driving force) on the output side of the transmission 30 is small, starting is not possible unless the inching pedal 114 is largely released from the maximum stepping state.

In such a case, it is also preferable for the operator to enable the similar operation, i.e., starting or deceleration with the similar stepping angle of the inching pedal 114.

As to the control for enabling starting or acquirement of the running speed with the same sense of the pedal operation in various working situations described above, it is preferable for the operator to enable starting the vehicle on a grade or acquirement of the running speed during the operation with the same sense of the pedal operation as well as the above described cases. That is, in starting of the vehicle, when gradually releasing the fully pressed down inching pedal 114, starting is not enabled unless a releasing amount is large on the up grade. Meanwhile, on the down grade, a small amount of releasing enables starting the vehicle, and the sense relative to the operation differs between the up grade and the down grade. There is a request for enabling these operations with the same sense of the operation of the inching pedal 114.

Therefore, in the present embodiment, monitoring by the controller 100 the input side revolution signal N1 and the output side revolution signal N2 of the transmission 30 as well as the speed stage position signal TS from the shift lever 111 of the speed stage position detection mechanism 31 or the pedal angle detection signal á from the pedal angle detection mechanism 117 of the inching pedal 114 causes the controller 100 to control so that the same output revolution number can be obtained with respect to the same angle of the inching pedal 114 irrespective of the speed stage position.

Figure 4:
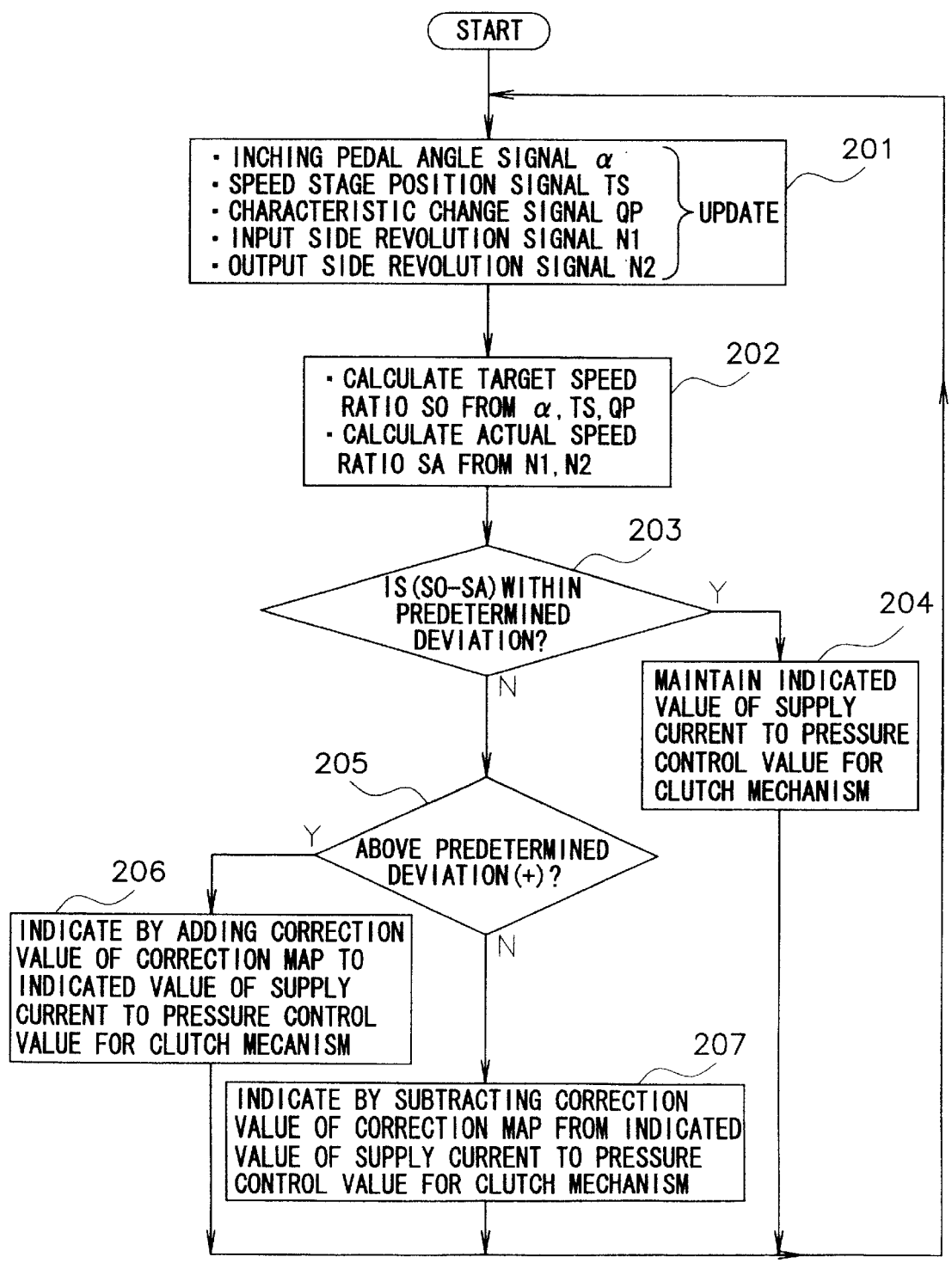
FIG. 4 is a flow diagram showing an action of the embodiment of FIG. 1.

A flowchart of FIG. 4 shows the procedure of this control.

In FIG. 4, when the control starts, the inching pedal angle signal á, the speed stage position signal TS, the characteristic change signal OP, and the input side revolution signal N1 and the output side revolution signal N2 of the transmission 30 are read at fixed time intervals to be updated in the controller 100 in the step 201.

In the step 202, a target speed ratio of the input side and the output side, i.e., a target speed ratio SO is calculated based on the inching pedal angle signal á, the speed stage position signal TS and the characteristic change signal OP, and an actual speed ratio SA is obtained based on the input side revolution signal N1 and the output side revolution signal N2.

Subsequently, in the step 203, a deviation (SO−SA) between the target speed ratio SO and the actual speed ratio SA is calculated and a judgment is made upon whether this deviation (SO−SA) is within a predetermined deviation (dead zone).

If it is within the predetermined deviation, the supply current to the proportional solenoid 122 in the pressure control valve 123 for controlling the direction switching clutch mechanism 35 which is under control is maintained without changing the current indicated value in the step 204, and the control returns to the step 201 to repeat the step 202 and the following steps.

On the other hand, if the deviation (SO−SA) is out of the predetermined deviation, a judgement is made upon whether this value is above the predetermined deviation (+) in the step 205.

If (+), in the step 206, the supply current to the proportional solenoid 122 in the pressure control valve 123 for controlling the direction switching clutch mechanism 35 which is under control is specified to the current indicated value by adding a correction value of a predetermined correction map, and the control returns to the step 201 to repeat the step 202 and the following steps.

If it is not (+), i.e., (−), in the step 207, the supply current to the proportional solenoid 122 in the pressure control valve 123 for controlling the direction switching clutch mechanism 35 which is under control is specified to the current indicated value by subtracting a correction value of the predetermined correction map, and the control returns to the step 201 to repeat the step 202 and the following steps.

Figure 5:
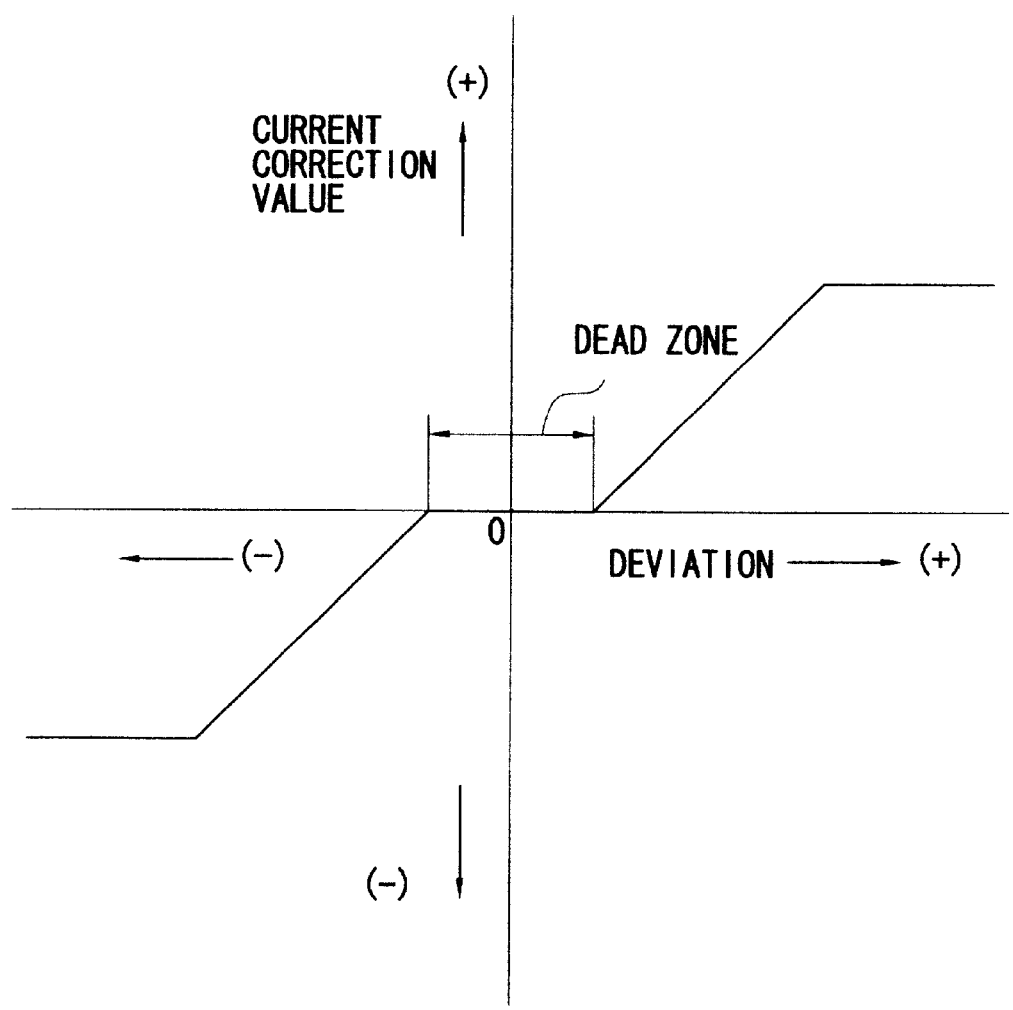
FIG. 5 is a graph showing the relationship of an electric current correction value relative to a deviation between a target speed ratio and an actual speed ratio in the embodiment of FIG. 1.

FIG. 5 shows the relationship between the above-described deviation and the current correction value.

In FIG. 5, the horizontal axis presents the deviation and the vertical axis shows the current correction value. If the deviation (SO−SA) is not very large and is within a predetermined range, the current correction is not performed. That is because control for correcting a small deviation causes hunching to occur and the control may become unstable. Namely, a predetermined deviation functions as a so-called dead zone.

When the deviation increases beyond the dead zone, the current correction value is linearly increased. Meanwhile, when the deviation decreases beyond the dead zone, the current correction value is linearly reduced. That is, since increase in the deviation means that a difference in number of revolutions between a target value and an actual measured value and the slip is large, the value of the current supplied to the proportional solenoid 122 of the pressure control valve 123 is increase to give rise to an oil amount supplied to the direction switching clutch mechanism 35. Further, the connection force of the clutch mechanisms 35 is enhanced to reduce the slip. If the deviation is decreased, the reverse operation is applied.

Although the speed stage position signal TS is taken into consideration in advance to be set when calculating the target speed ratio SO in the flowchart of FIG. 4, the setting of the target speed ratio SO is not restricted thereto. For example, the target speed ratio SO may be set based on only the pedal angle signal á and the target speed ratio SO may be compared with the actual speed ratio SA. Thereafter, correction may be carried out in accordance with the speed stage position signal TS so as to control the current value to the electronic control regulating valve 121 and the connection force of the clutch mechanism 35.

Further, when starting the vehicle on a down grade and the slop is steep, it can be considered that the running speed of the working vehicle may exceeds a desired speed due to the slope of the grade even if supply of the oil to the direction switching clutch mechanism 35 is all interrupted.

In such a case, since the running speed can not be decreased to that extent even if the inching pedal 114 is fully stepped, there is effected the control that the oil is supplied to the reverse direction switching mechanism 36 to be operated as a brake for the working vehicle in a direction opposed to the used (driven) direction switching clutch mechanism 35 when driving this forward direction switching clutch mechanism 35.

Further, there is carried out the different control that the forward and reverse clutch mechanisms 35 and 36 are simultaneously activated to cope with starting the vehicle on a grade. In such a case, the clutch mechanism on the opposed side always acts as a brake in some small measure, thereby smoothing the control.

Advantages of the First Embodiment

According to the above embodiment, the following advantages can be obtained.

Advantages 1-1

In this embodiment, when controlling the connection force of the direction switching clutch mechanism 35 by the inching pedal 114, since the controller 100 monitors and controls the inching pedal angle signal á, the speed stage position signal TS, as well as the input side revolution signal N1 and the output side revolution signal N2 of the transmission 30, it is possible to effect the appropriate control according to the actual slip in the transmission 30.

In particular, the fixed running state can be always obtained with respect to the stepping state of the inching pedal 114 irrespective of the load state in the work or the slope state such as an up grade or a down grade.

Advantage 1-2

Since control of the clutch force in the transmission is carried out by the electron control modulation valve 121 connected to each direction switching clutch mechanism 35, the optimum control is possible in accordance with each direction switching clutch mechanism 35.

Here, since the electron control modulation valve 121 having the similar structure is connected to each speed switching clutch mechanism 36, each speed switching clutch mechanism 36 can be precisely controlled if necessary.

Advantage 1-3

The connection force control mechanism 120 includes: the pressure control valve 123 which receives the connection force control signal CS from the controller 110 and converts the hydraulic pressure to the counterpart responsive to the received signal CS; and the flow rate detection valve 124 which operates in accordance with the hydraulic pressure signal from the pressure control valve 123, thus enabling the appropriate control according to the direction signal (connection force control signal CS) with a relatively simple structure.

Advantage 1-4

Since the clutch mechanism which is controlled by the controller 100 and generates a slip in accordance with an amount of operation by the inching pedal 114 is restricted to the direction switching clutch mechanisms 35 as a part of the clutch mechanism of the transmission 30, cooling means for cooling down the heat generated by the slip can cope with only the direction switching clutch mechanisms 35 whose number is relatively small, thereby reducing the cost of the apparatus.

As a specific example, provision of a pipe arrangement and a control valve for increasing a supply amount of oil for cooling (lubricating) the direction switching clutch mechanism 35 which generates a slip can suffice the cooling means.

Advantage 1-5

Since a full-speed stage in the transmission 30 is achieved by the combined use of the direction switching clutch mechanism 35 and the speed switching clutch mechanism 36, the inching pedal 114 can perform the slip control over the all the speed stages if the direction switching clutch mechanism 35 can generate a slip, thus enabling the necessary and sufficient control with a small number of control targets.

Advantage 1-6

Since the controller 100 controls the deviation (SO−SA) in such a manner that the output side revolution N2 of the transmission 30 can be a number of revolutions within a predetermined deviation, generating no hunching which leads to the unstable control.

Advantage 1-7

Since the characteristic change dial is provided as the characteristic change mechanism 118 to the driver seat 110 and the characteristic change signal OP from the characteristic change mechanism 118 is inputted to the controller 100, the content of the connection force control signal CS outputted from the controller 100 to the connection force control mechanism 120 can be changed in accordance with the work conditions or the operator's preference.

Figure 6:
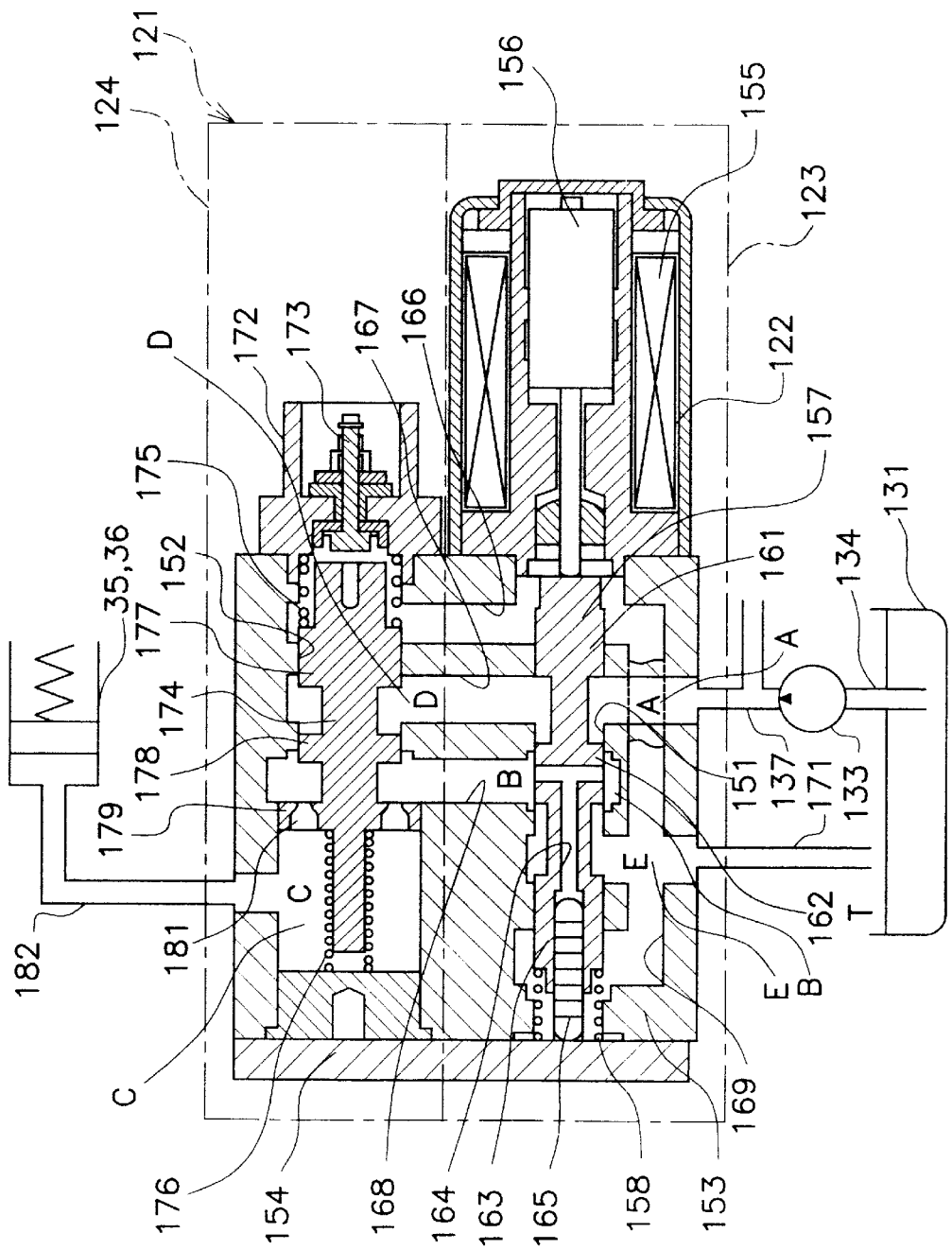
FIG. 6 is a cross-sectional view showing a specific structural example of an electronic control regulating valve used in the present invention.

Specific Example of the Electronic Control Regulating Valve of the First Embodiment FIG. 6 shows a specific structural example of the electronic control regulating valve 121 used in this embodiment.

In FIG. 6, the electronic control regulating valve 121 includes a valve body 153 having two valve holes 151 and 152 and a cover body 154 for blocking one end of the valve body 153. A lower half portion of the body 153 forms the pressure control valve 123 and an upper half portion of the same forms the flow rate detection valve 124.

The proportional solenoid 122 is provided so as to be opposed to the valve hole 151 on the opposite side of the cover body 154 of the valve body 153. The proportional solenoid 122 includes an electromagnet 155 and a core 156 which can move along the axial direction in the electromagnet 155. An end of the core 156, which is the left end in the drawing, is brought into contact with one end of a pressure control valve spool 157 which is housed in the valve hole 151 so as to be capable of sliding. A pressure control valve spring 158 consisting of a helical compression spring is provided between the other end of the pressure control valve spool 157 and the cover body 154, and the spring 158 always gives an impetus to the pressure control valve spool 157 in the right-hand side direction in the drawing.

The pressure control valve spool 157 has first to third land portions 161, 162 and 163 in the middle part thereof and further includes an internal communication hole 164 which pierces through the central second land portion 162 and extends to the left end of the same along the axial direction. A load piston 165 is accommodated in the internal communication hole 164 along the axial direction so as to be capable of sliding, and the left end of the load piston 165 projects from the internal communication hole 164 to be brought into contact with the inner surface of the cover body 154.

Three communication holes 166, 167 and 168 for communicating the valve hole 151 of the pressure control valve 123 to the valve hole 152 of the flow rate detection valve 124 are provided in the valve body 153. The central communication hole 167 serves as pump ports A and D for the pressure control valve 123 and the flow rate detection valve 124 and is connected to the pump 133 through the pipe line 137, the pump 133 being designed to suck in the oil from the tank 131 through the main pipe line 134.

In the valve hole 151, the intermediate position between the central second land portion 162 and the left third land portion 163 and the left position of the left third land portion 163 communicate with the right end communication hole 166 through a drain communication hole 169, and the drain communication hole 169 functioning as a drain port E so as to be capable of discharging the oil to the tank 131 through the pipe line 171.

Further, the left communication hole 168 can communicate with or can be shut off from the intermediate position between the central second land portion 162 and the left third land portion 163 or the central communication hole 167 by the operation of the second land portion. A position of the communication hole 168 where it crosses the valve hole 151 functions as a pressure control valve output port B.

A fill switch 172 is provided so as to be opposed to the valve hole 152 at an opposite position of the cover body 154 of the valve body 153. The fill switch 172 has an actuator 173 which can move along the axial direction. An end of the actuator 173, which is the left end in the drawing, is opposed to one end of the flow rate detection valve spool 174 which is housed in the valve hole 152 so as to be capable of sliding, and a fill switch spring 175 consisting of a helical compression spring is provided between one end of the flow rate detection valve spool 174 and a casing for the fill switch 172. On the other hand, a flow rate detection valve return spring 176 consisting of a compression spring is provided between the other end of the flow rate detection valve spool 174 and the cover body 154, and the operation of these springs 175 and 176 give an impetus to the flow rate detection spool 174 so as to be balanced at a predetermined position.

The flow rate detection valve spool 174 has three first to third land portions 177, 178 and 179 in the middle part thereof and further includes a plurality of orifices 181 piercing through the left third land portion 179 in the axial direction.

Here, the valve hole 152 communicates with the communication hole 166 at a right position of the first land portion 177, with the communication hole 167 at an intermediate position between the first land portion 177 and the second land portion 178 and with the communication hole 168 at an intermediate position between the second land portion 178 and the third land portion 179, respectively. Further, the left side of the third land portion 179 serves as a clutch port C and communicates with any clutch mechanism of the direction switching clutch mechanism 35 and the speed switching clutch mechanism 36 through the pipe line 182.

It is to be noted that the communication hole 167 and the communication hole 168 can communicate with or can be blocked off from each other by the second land portion 178.

The operation of the electronic control regulating valve 121 according to this embodiment will now be described with reference to FIGS. 8 to FIG. 13.

The electronic control regulating valve 121 is controlled by a direction current from the controller 100 to the proportional solenoid 122 of the pressure control valve 123 and an output signal of the fill switch 172.

Figure 7:
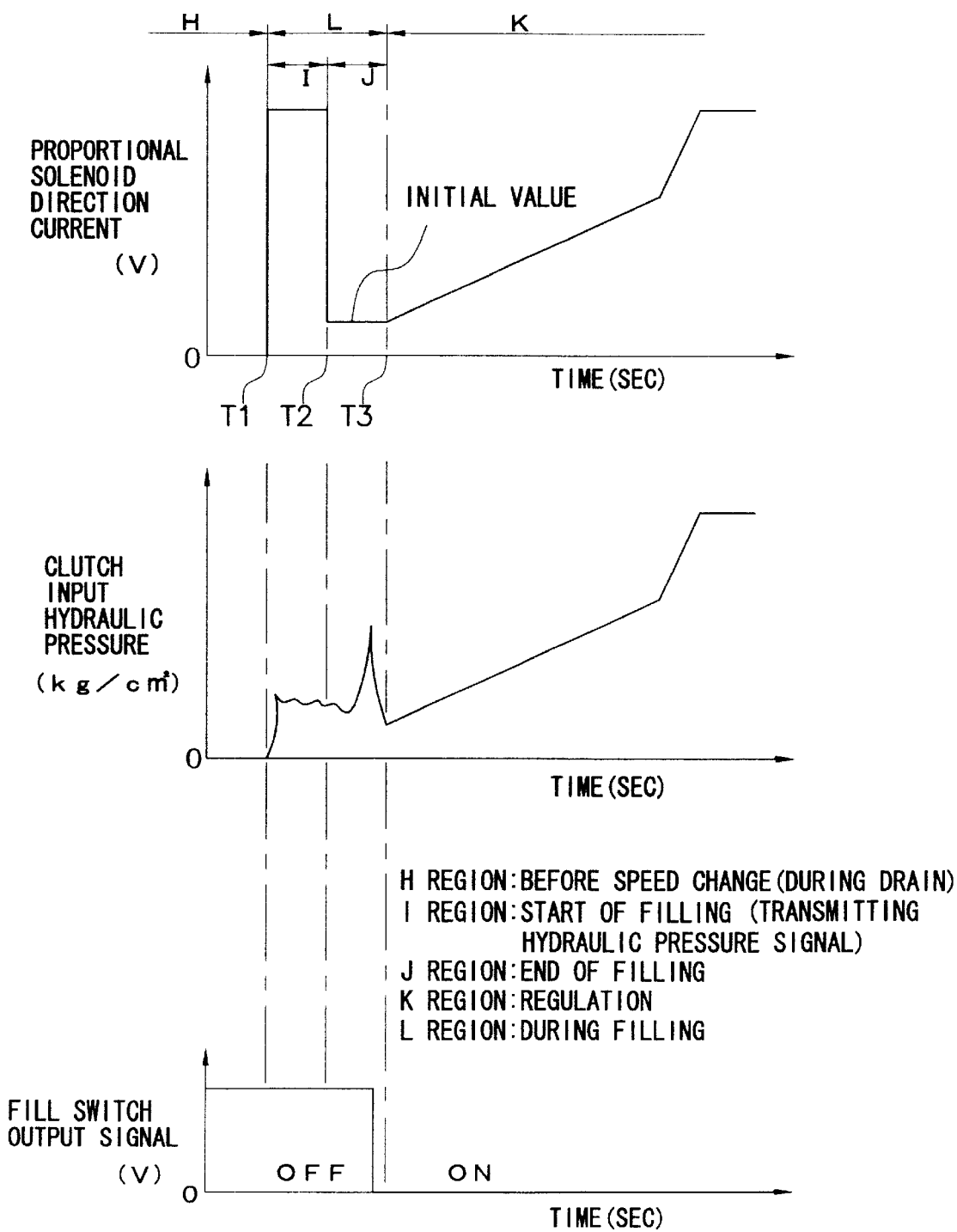
FIG. 7 is a time chart showing the operation of the electronic control regulating valve of FIG. 6.

FIG. 7 shows the relationship between the direction current of the electronic control regulating valve 121 to the proportional solenoid 122, an input pressure of the clutch mechanisms 35 and 36 and an output signal of the fill switch 172.

That is, as shown in FIG. 7, a region H before a point in time T1 represents before the pressure control valve 123 is selected for speed change, and the oil of the clutch mechanisms 35 and 36 is drained.

Subsequently, in a region I between points in time T1 and T2, a large current instruction value is supplied as a hydraulic pressure signal to the proportional solenoid 122 to start filling. At the point in time T2 after lapse of a fixed time from the point in time T1 at which filling is started, the instruction current to the proportional solenoid 122 is once lowered to a predetermined initial value. Here, the instruction current is caused to be maximum at the start of filling in order to rapidly fill the oil to the clutch mechanisms 35 and 36.

Filling with the initial value is continued until a point in time T3 (region J), during which temporal filling of oil to the clutch mechanisms 35 and 36 is completed, and hence the hydraulic pressure of the clutch mechanisms 35 and 36 is increased, thereby turning on the fill switch 172.

A region K after the point in time T3 is a pressure regulation region K in which the instruction current to the proportional solenoid 122 is regulated in such a manner that the connection force of the clutch mechanisms 35 and 36 becomes a predetermined value.

A region L obtained by combining the regions I and J represents filling.

Among the electronic control regulating valves 121 constituting the connection force control mechanism 120, the controller 100 also controls the electronic control regulating valve 121 for the speed switching clutch mechanism 36 which does not relate to a slip based on the operation of the inching pedal 114, but the explanation of the speed switching clutch mechanism 36 is omitted.

The specific operation of the electronic control regulating valve 121 will now be described with reference to FIGS. 8 to 13.

Figure 8:
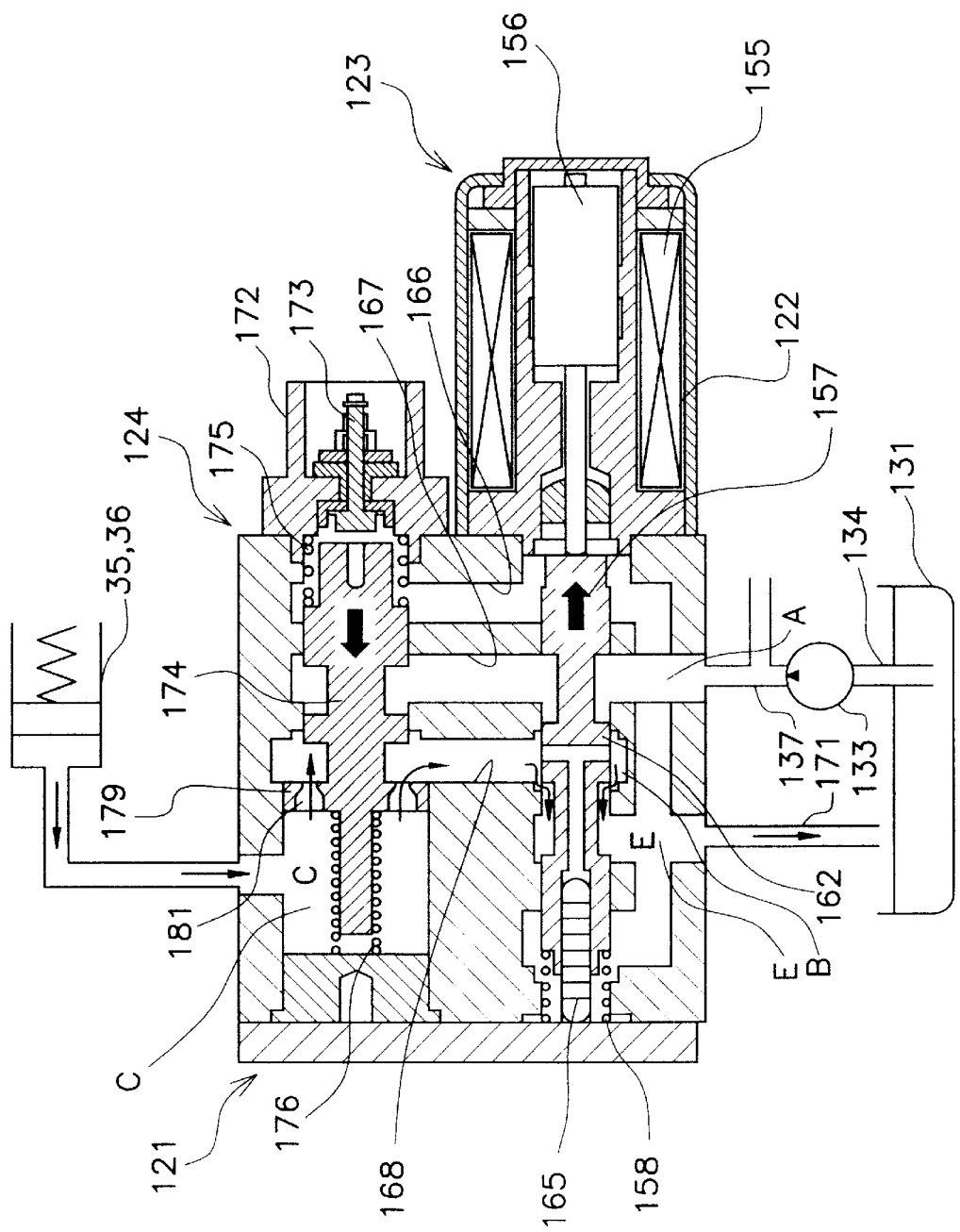
FIG. 8 is a drawing for explaining the operation of the electronic control regulating valve of FIG. 6.

FIG. 8 shows the state before the speed change where the oil is drained from the direction switching clutch mechanism 35, the state corresponding to the region H in FIG. 7.

In this state where no current is passed through the electromagnet 155 of the proportional solenoid 122, the core 156 of the proportional solenoid 122 is returned by the repulsion force of the pressure control valve spring 158 through the pressure control valve spool 157. Therefore, the second land portion 162 of the pressure control valve spool 157 moves in the right direction and the communication hole 168 communicates with the drain communication hole 169 so that the oil of the clutch port C is drained to the tank 131 through the orifice 181 provided to the third land portion 179 of the flow rate detection valve spool 174, the communication hole 168, the output port B and the drain port E.

Here, since the hydraulic pressure does not act on the flow rate detection valve spool 174 of the flow rate detection valve 124, the flow rate detection valve spool 174 is removed from the actuator 173 of the fill switch 172 by the repulsion force of the fill switch spring 175 and stopped at a position balanced with the spool return spring 176.

Figure 9:
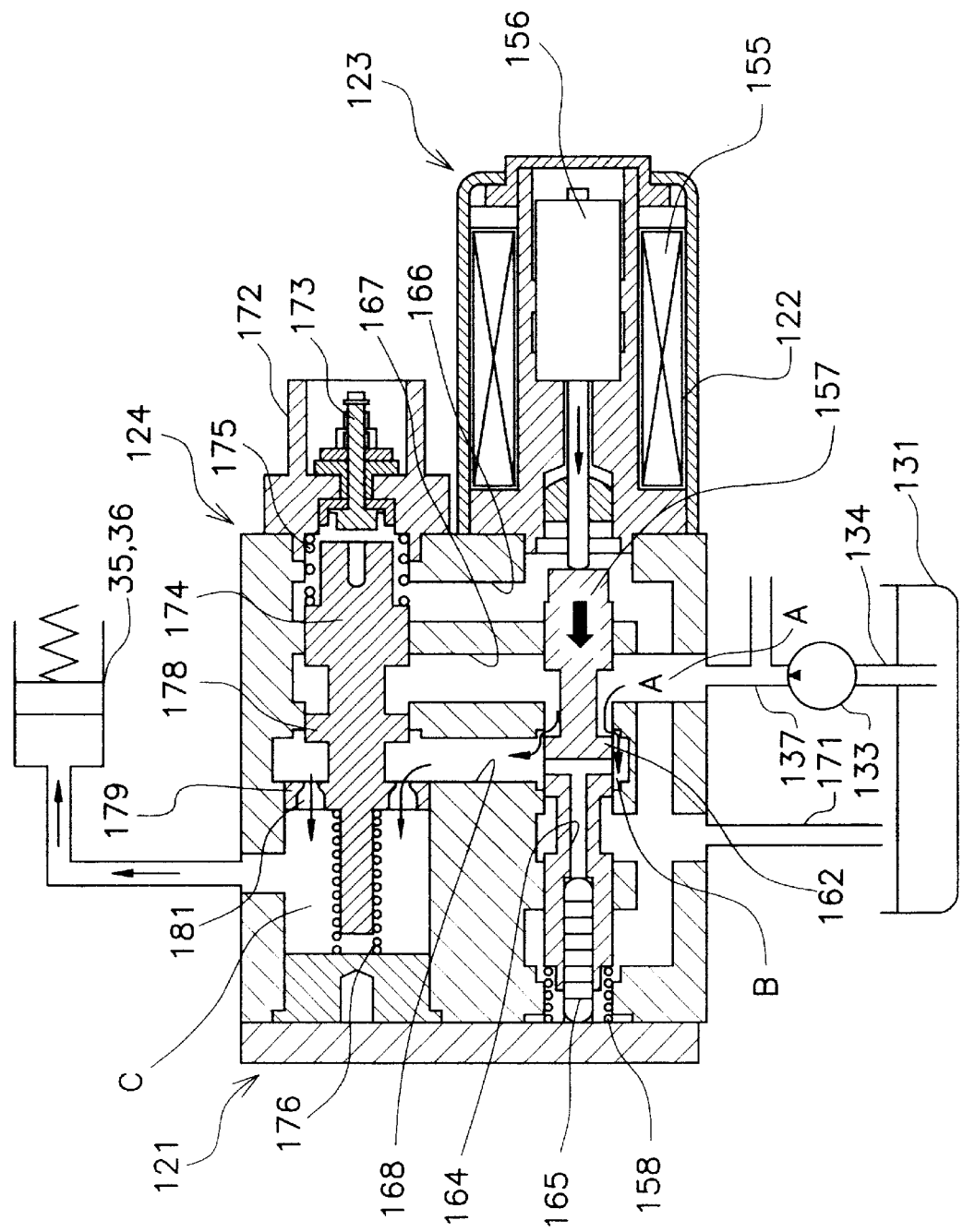
FIG. 9 is a drawing for explaining the operation of the electronic control regulating valve of FIG. 6.

FIG. 9 shows the state of starting filling where the instruction current based on the hydraulic pressure signal is inputted to the electromagnet 155 of the proportional solenoid 122, the state corresponding to the region I of FIG. 7.

When the maximum current is supplied to the proportional solenoid 122 as a current based on the hydraulic pressure signal with no oil being filled in the direction switching clutch mechanism 35, the core 156 of the proportional solenoid 122 demonstrates full stroke and the pressure control valve spool 157 moves to the left-hand direction. This causes the second land portion 162 to move to the left-hand side, and the pump port A and the pressure control valve power port B are opened while the output port B and the drain port E are blocked. Accordingly, the oil flows to the clutch port C through the pump port A, the output port B and the orifice 181 of the flow rate detection valve spool 174 so that the oil is filled in the direction switching clutch mechanism 35.

Figure 10:
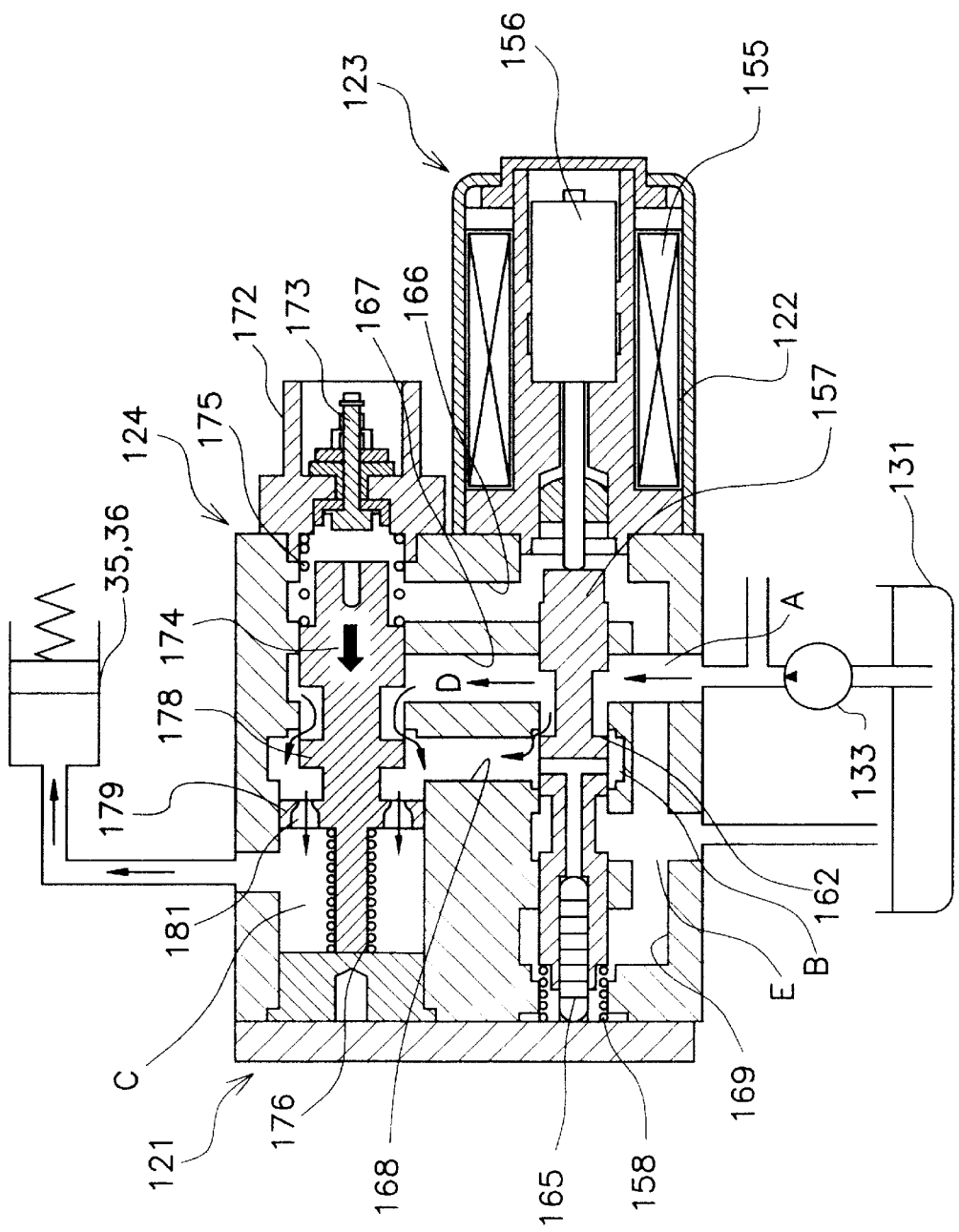
FIG. 10 is a drawing for explaining the operation of the electronic control regulating valve of FIG. 6.

At this time, the throttling effect of the orifice 181 generates a differential pressure between the upstream and the downstream of the orifice 181 of the flow rate detection valve spool 174. This differential pressure causes the flow rate detection valve spool 174 to move in the left direction while compressing the flow rate detection valve spool return spring 176 as shown in FIG. 10. This state still corresponds to the region I in FIG. 7.

The leftward movement of the flow rate detection valve spool 174 causes the pump port D of the flow rate detection valve 124 to open, and the oil flows from this port toward the communication hole 168. Then, the differential pressure between the upstream and the downstream of the orifice 181 of the flow rate detection valve spool 174 becomes large, which further moves the flow rate detection valve spool 174 in the left direction.

Figure 11:
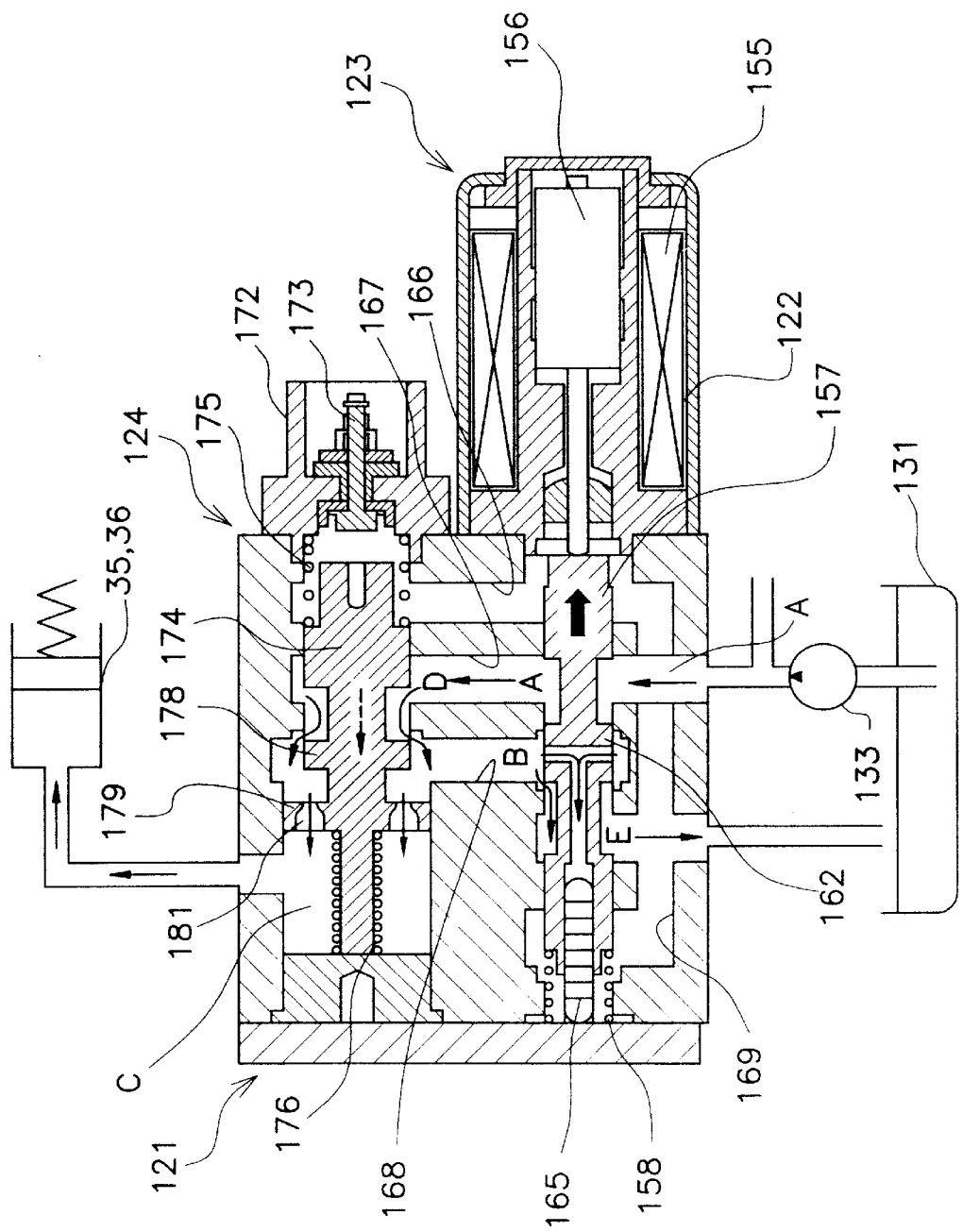
FIG. 11 is a drawing for explaining the operation of the electronic control regulating valve of FIG. 6.

In this state, when the current value of the proportional solenoid 122 is instantaneously lowered to the initial pressure level, filling is terminated and the pressure control valve 123 is reset to the initial pressure as shown in FIG. 11, the state of which corresponds to the region J in FIG. 7.

That is, in this state, the leftward driving force of the core 156 is lowered to return to the right direction on one hand, and the pressure of the pressure control valve output port B of the communication hole 168 is led in the internal communication hole 164 on the other hand.

Since this can substantially apply the pump pressure to the load piston 165, the pressure control valve spool 157 is again pushed toward the right side, and a small amount of oil leaks from the pressure control valve power port B to the drain port E.

However, this amount of leak is small, a large amount of the oil flows from the pump 133 to the direction switching clutch mechanism 35, and the flow rate detection valve spool 174 is continuously pushed toward the left side.

In this manner, when the oil is filled in the direction switching clutch mechanism 35, the oil does not flow from the pump port D to the clutch port C.

Figure 12:
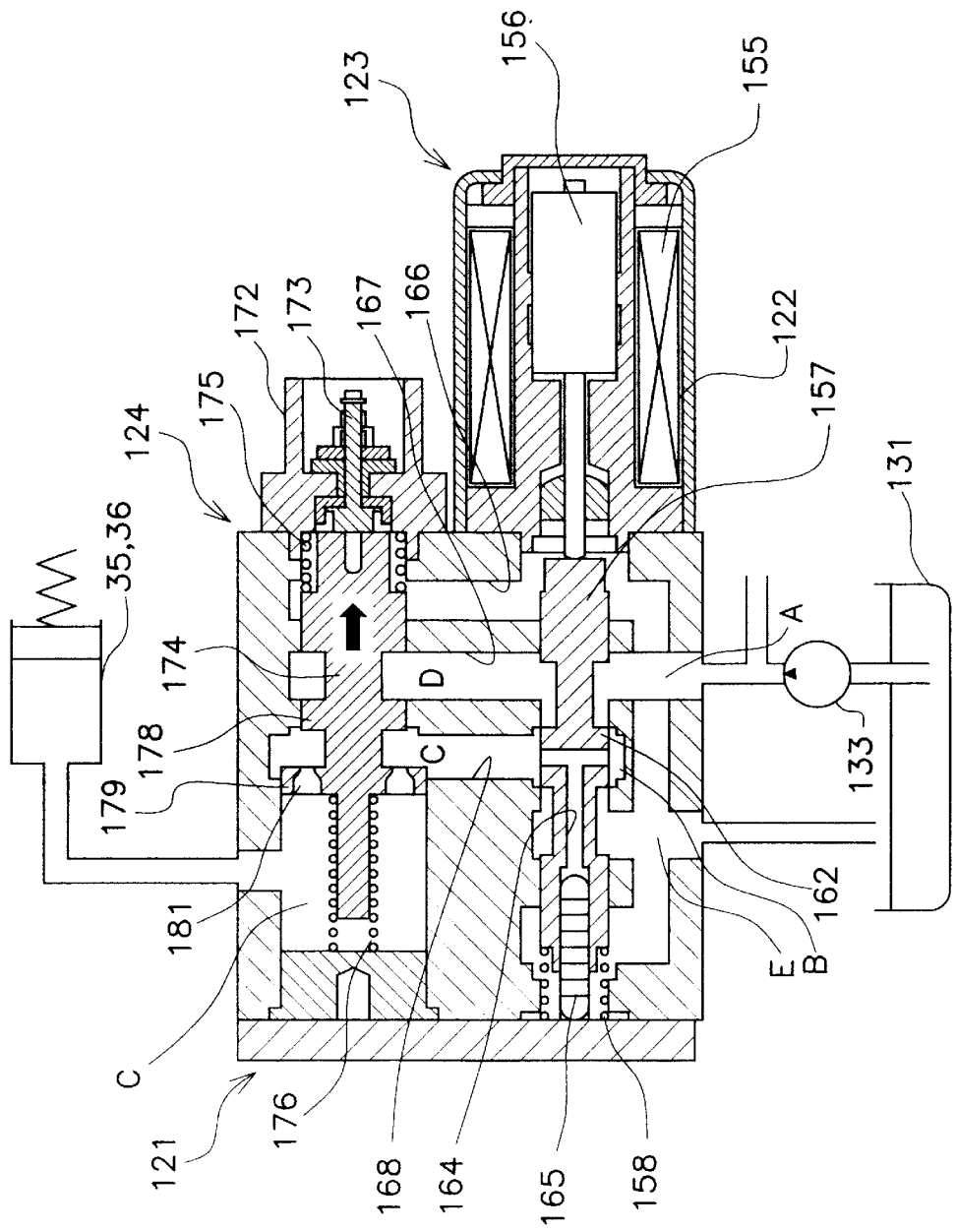
FIG. 12 is a drawing for explaining the operation of the electronic control regulating valve of FIG. 6.

Subsequently, the state shown in FIG. 12 is obtained, which still corresponds to the region J in FIG. 7.

When a flow of the oil to the clutch port is eliminated and the hydraulic pressures on the both sides of the third land portion become equal, the flow rate detection valve spool 174 moves to the right side by the hydraulic pressure since the pressure applied areas on the both sides of the third land portion 179 in the flow rate detection valve spool 174 differ from each other and the pressure applied area on the left side is larger. As a result, the pump port D and the clutch port C are closed.

Here, the flow rate detection valve spool 174 is pushed toward the right side by a difference in area between the right and left sides of the third land portion 179 and the force of the flow rate detection valve spool return spring 176 while compressing the fill switch spring 175 and brought into contact with the actuator 173 of the fill switch 172 in order to inform the controller 100 of completion of filling to the direction switching clutch mechanism 35. At this time, since the current value at the initial pressure level is given to the proportional solenoid 122, the hydraulic pressure by the pressure control valve spool 157 is set to the initial pressure.

Figure 13:
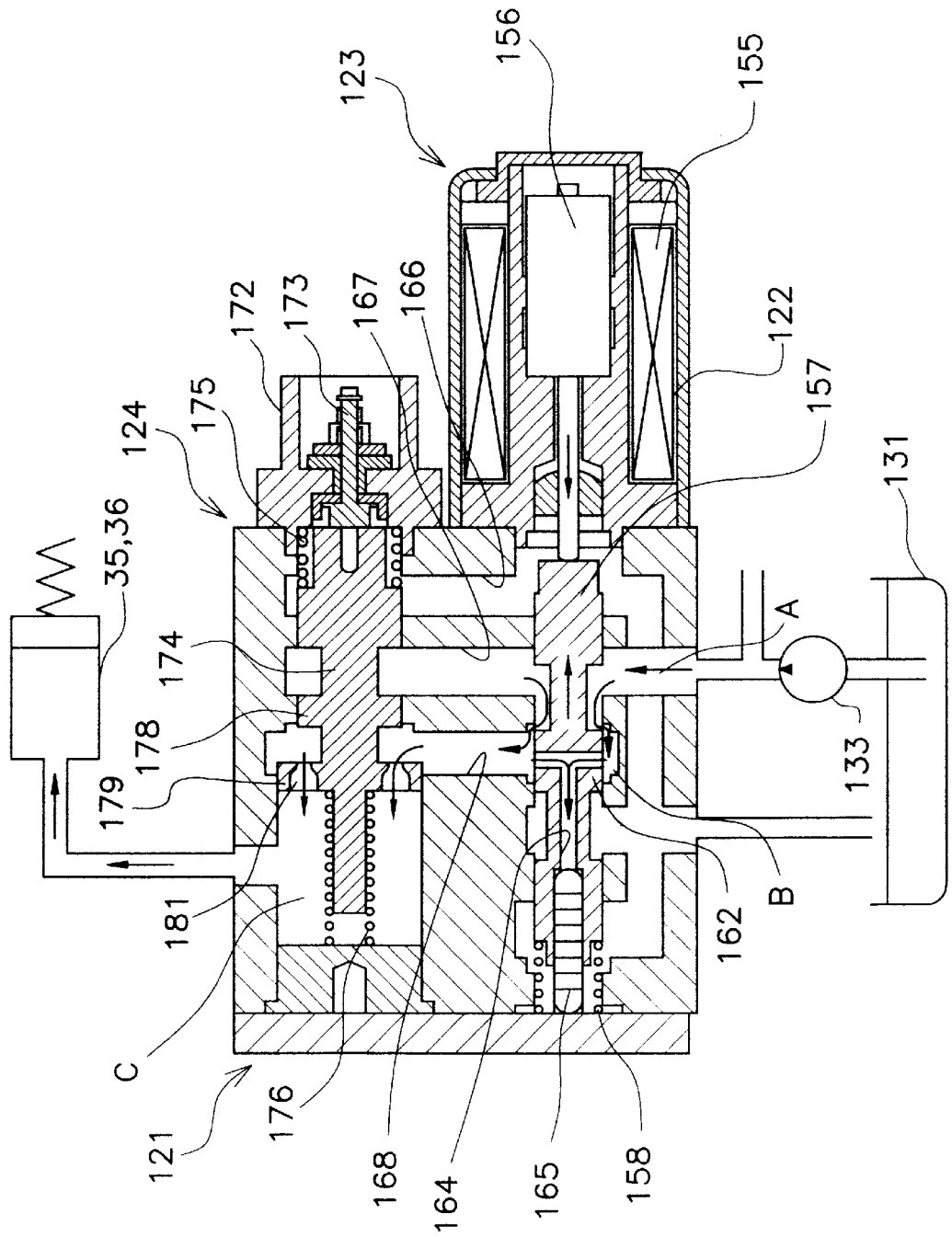
FIG. 13 is a drawing for explaining the operation of the electronic control regulating valve of FIG. 6.

FIG. 13 shows the state where the pressure is regulated, which corresponds to the region K in FIG. 7.

After the initial pressure setting, when a predetermined current is caused to flow to the proportional solenoid 122, the electromagnet 155 of the proportional solenoid 122 generates a force in proportion to the current. A sum of the thrust of the proportional solenoid 122, the thrust obtained by the hydraulic pressure of the clutch port C applied to the load piston 165 and the repulsion force of the pressure control valve spring 158 is balanced to achieve pressure regulation.

On the other hand, since the flow rate detection valve spool 174 is continuously pushed toward the right side by a difference in hydraulic pressure applied to the both sides of the third land portion 179, the fill switch 172 continues to output a fill signal to the controller 100.

Thereafter, when the speed stage position is changed by the operation of the shift lever 111 to disable the direction switching clutch mechanism 35, the current supplied to the proportional solenoid 122 is stopped. Therefore, the pressure control valve spool 157 is moved to the right side by the spring force of the pressure control valve spring 158 and reset to the state shown in FIG. 8, thereby entering the standby mode for next use.

According to the electron control modulation valve 121 described above, the following advantages can be obtained.

Advantage 1-8

The pressure control valve 123 and the flow rate detection valve 124 can be incorporated in the integral valve body 153, thereby providing the small and inexpensive apparatus.

Advantage 1-7

The pressure control valve spool 157 and the flow rate detection valve spool 174 are provided in parallel to each other, and openings of the valve hole 151 and the valve hole 152 on one side are blocked by the cover body 154 while those on the other side are blocked by the proportional solenoid 122 and the fill switch 172. Therefore, assembling can be facilitated by one direction that is the horizontal direction in the drawing, which leads to the inexpensive production of the apparatus.

Modification of the First Embodiment

It is to be noted that the present invention is not restricted to the embodiment shown in FIGS. 1 to 5 or FIG. 6, and any modification or improvement in the scope of the invention can be included in the present invention.

For example, the connection force control mechanism 120 is not necessarily the electronic control regulating valve 121 and a different type of control valve may be used. However, use of the electronic control regulating valve 121 has such an advantage as that the connection force responsive to the stepping angle of the inching pedal 114 can be readily obtained with a simple structure.

Here, although the electronic control regulating valve 121 having the structure shown in FIG. 6 does not have to be used, use of such a valve can inexpensively provide a small apparatus.

Further, the clutch mechanism whose connection force is controlled in accordance with the stepping angle of the inching pedal 114 is not restricted to the direction switching clutch mechanism 35, only the speed switching clutch mechanism 36 or the both mechanisms may be used. However, the direction switching clutch mechanism 35 has such an advantage as that all the speed stage positions can be controlled with a small number of control targets.

Moreover, although a number of revolutions on the output side of the transmission 30 does not have to be controlled so as to be within a predetermined deviation range, such a control can prevent hunching.

In addition, provision of the characteristic change dial 118 as the characteristic change mechanism is not necessary, but it is advantageous in that control is enabled in accordance with the operator's preference.

Second Embodiment

A second embodiment according to the present invention will now be described with reference to FIG. 14 and FIG. 2 described above.

The basic structure of this embodiment is similar to that of the first embodiment, and like reference numerals denote like or corresponding parts to omit the explanation. The following will describe different parts.

The transmission 30 has three shafts, i.e., first to third shafts 37, 38 and 39. The output side revolution detection mechanism 106A, which detects a number of revolutions of the third shaft 39 to be outputted as the output side revolution signal N2 to the transmission controller 100, is provided in close vicinity to the shaft on the lowermost stream side among the above-described three shafts, i.e., the third shaft 39 on the side of the running means 85 such as wheels or a tracklayer. For example, a magnetic, optical or any other type of revolution sensor is used for the revolution detection mechanism 36A.

Incidentally, in this embodiment, the output side revolution detection mechanism 106A may be provided in close vicinity to the second shaft 38 disposed between the direction switching clutch mechanism 35 and the speed switching clutch mechanism 36 in order to detect a number of revolutions of the second shaft 38 to be outputted as the output side revolution signal N2 to the controller 100.

The speed stage position of the transmission 30 is detected by the speed stage position detection mechanism (speed stage position signal generation mechanism) 31. The speed stage position detection mechanism 31 detects which speed stage the transmission 30 is selected to by detecting, for example, a position of the shift lever 111 provided to the driver seat 110 of the working vehicle by using the detector 112 and outputs the speed stage position signal (TS) to the controller 100.

The accelerator pedal 107 operated for increasing revolutions of the engine 10 is provided to the driver seat 110. To the accelerator pedal 107 is coupled the angle sensor 109 constituted by a potentiometer and the like through the link mechanism 108, and the link mechanism 108 and the angle sensor 109 form the accelerator pedal angle detection mechanism 113. The accelerator pedal angle detection mechanism 113 detects a stepping angle of the accelerator pedal 107 to output an accelerator pedal angle signal â to the controller 100.

The speed mode setting mechanism 119 is provided to the driver seat 110 if necessary. The speed mode setting mechanism 119 can switch the vehicle speed between the normal running mode and the hyper-slow running mode and includes a dial, a changeover switch and others. It outputs a running mode signal OM to the controller 100.

As described above, the controller 100 receives the speed stage position signal TS from the speed stage position detection mechanism 31, the output side revolution signal N2 from the output side revolution detection mechanism 106A and the accelerator pedal angle signal â from the accelerator pedal angle detection mechanism 113 and, when the speed mode setting mechanism 119 is provided, the controller 100 further receives the running mode signal OM from the speed mode setting mechanism 119.

The controller 100 for receiving these signals includes: a hyper-slow running mode judging function 104 for judging whether it is the hyper-slow running mode based on a vehicle speed V calculated from the output side revolution signal N2, the accelerator pedal angle signal â and the speed stage position signal TS or the running mode signal OM; and a control signal transmitting function 103 for outputting a connection force control signal CS to the later-described connection force control mechanism 120 so that a number of revolutions on the output side of the transmission 30 becomes a predetermined hyper-slow value when the hyper-slow running mode is determined by the hyper-slow running mode judging function 104.

The controller 100 has a CPU, a ROM, a RAM and the like and functions as a kind of computer so as to demonstrate the above-described respective functions and any other function.

The connection force control mechanism 120 is constituted by a plurality of electronic control regulating valves (ECMV=Electronic control regulating valve) 121, and each electronic control regulating valve 121 is connected to a predetermined mechanism in the respective clutch mechanisms and 36 of the multi-stage speed change transmission 30.

Since the connection force control mechanism 120 is the same as that described in the first embodiment, thereby omitting its explanation.

Results of the Second Embodiment

The Results of the embodiment having the above structure will be described with reference to graphs of FIGS. 15 and 17 and a flowchart of FIG. 16.

Figure 14:
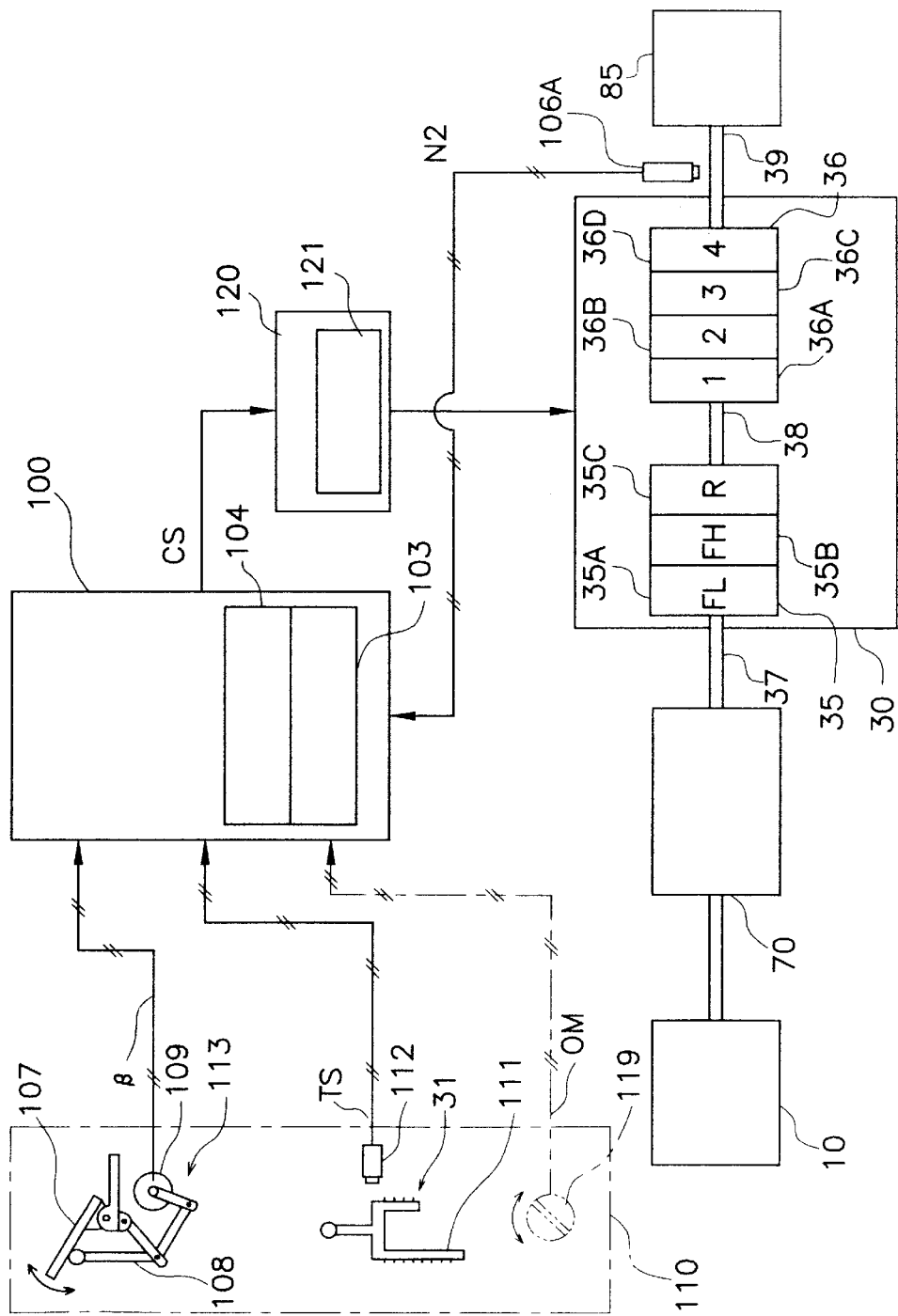
FIG. 14 is a block diagram showing a schematic structure of one embodiment according to the present invention.

In FIGS. 14 and 2, at the start of the operation of the working vehicle, when the engine 10 is driven and the forward first speed is selected by the shift lever 111, the speed stage position signal TS is supplied from the speed stage position detection mechanism 31 to the controller 100, and the connection force control signal CS is sent from the controller 100 to the connection force control mechanism 120. The electronic control regulating valve 121 of the connection force control mechanism 120 is activated by the connection force control signal CS in such a manner that the forward low speed clutch mechanism FL (35A) of the direction switching clutch mechanism 35 is connected to the first stage clutch mechanism 36A of the speed switching clutch mechanism 36 in the transmission 30, thus starting the working vehicle.

At this time, since the lockup signal is not inputted to the lockup solenoid valve 143, the torque converter 70 is not locked up and thereby functions as a normal torque converter. The lockup operation of the torque converter 70 does not relate to the present invention, and its explanation is omitted, but the lockup operation is carried out during the high speed running and the like as similar to the general case.

The electronic control regulating valve 121, which has received the connection force control signal CS from the controller 100, inputs its signal to the proportional solenoid 122 shown in FIG. 2, and the pressure control valve 123 moves to the left side against the spring force in accordance with a current amount of that signal. Consequently, the hydraulic pressure supplied from the pump 133 through the main pipe line 134 and the pipe line 137 flows in the flow rate detection valve 124 via the pressure control valve 123 to be further supplied to the forward low speed clutch mechanism FL (35A) and the first stage clutch mechanism 36A of the speed switching clutch mechanism 36.

Thereafter, the shift up is sequentially conducted by the shift lever 111, and the shift lever 111 is set to a speed stage position suitable for a required operation. For example, in case of operating at the forward third speed, the forward low speed clutch mechanism FL (35A) of the direction switching clutch mechanism 35 is connected to the second stage clutch mechanism 36B of the speed switching clutch mechanism 36.

The shift up is then appropriately carried out to perform a predetermined operation.

At this time, the connection force control signal CS is outputted from the controller 100 to the electronic control regulating valves 121A to G associated with the speed stage position by the speed stage position signal TS involved by the shift up, and the transmission 30 is set to that speed stage position.

Subsequently, reducing the vehicle speed to shift to the hyper-slow running mode is desired while maintaining the power for the operation, the shift lever 111 is set to a predetermined low speed stage or a lower speed stage, in this embodiment, the forward first speed or second speed or the rear first speed.

Additionally, the accelerator pedal 107 is released and a non-illustrated brake is appropriately applied in order to obtain a vehicle speed V which is higher than a target speed (vehicle speed) VL set in the hyper-slow running mode, for example, 1.0 km/h and lower than a relatively low predetermined speed VS, for example, 2.0 km/h.

When the accelerator pedal 107 is released, the accelerator pedal angle signal â is outputted from the angle sensor 109 of the accelerator pedal angle detection mechanism 113, or more specifically, stepping is released and a signal indicative of the accelerator pedal standby mode is outputted to the controller 100.

Here, the accelerator pedal standby mode includes the state where a foot is taken off from the accelerator pedal 107 so that the accelerator pedal 107 is not stepped completely as well as the state where the foot is just put on the accelerator pedal 107 but does not step on it.

Further, the speed stage position signal TS, i.e., the signal representing that the shift lever 111 is set to a speed not more than a predetermined low speed stage, which is the forward first speed (F1) or second speed (F2) or the rear first speed (R1) in this embodiment, is outputted from the speed stage position detection mechanism to the controller 100.

Moreover, the actual vehicle speed VA is calculated by the controller 100 based on the output side revolution signal N2, and the controller 100 makes a judgement upon whether the actual vehicle speed VA is lower than a predetermined speed VS.

Here, with the speed stage position being set to the forward first speed (F1) or second speed (F2) or the rear first speed (R1), when the actual vehicle speed VA is lower than the predetermined speed VS (2.0 km/h) and a signal representing that the accelerator pedal 107 is in the standby mode is inputted to the controller 100, the hyper-slow running mode judging function 104 determines the hyper-slow running mode, and the control signal generating function 103 outputs the connection force control signal CS indicative of the hyper-slow running mode to the connection force control mechanism 120.

The connection force control signal CS from the controller 100 is used to lower the current value outputted to the electronic control regulating valve 121 of the connection force control mechanism 120. Reduction in the current value involves a drop in the hydraulic oil pressure (working fluid pressure) to decrease the clutch connection force, and a slip is generated in the direction switching clutch mechanism 35A, thereby lowering the vehicle speed.

Figure 15:
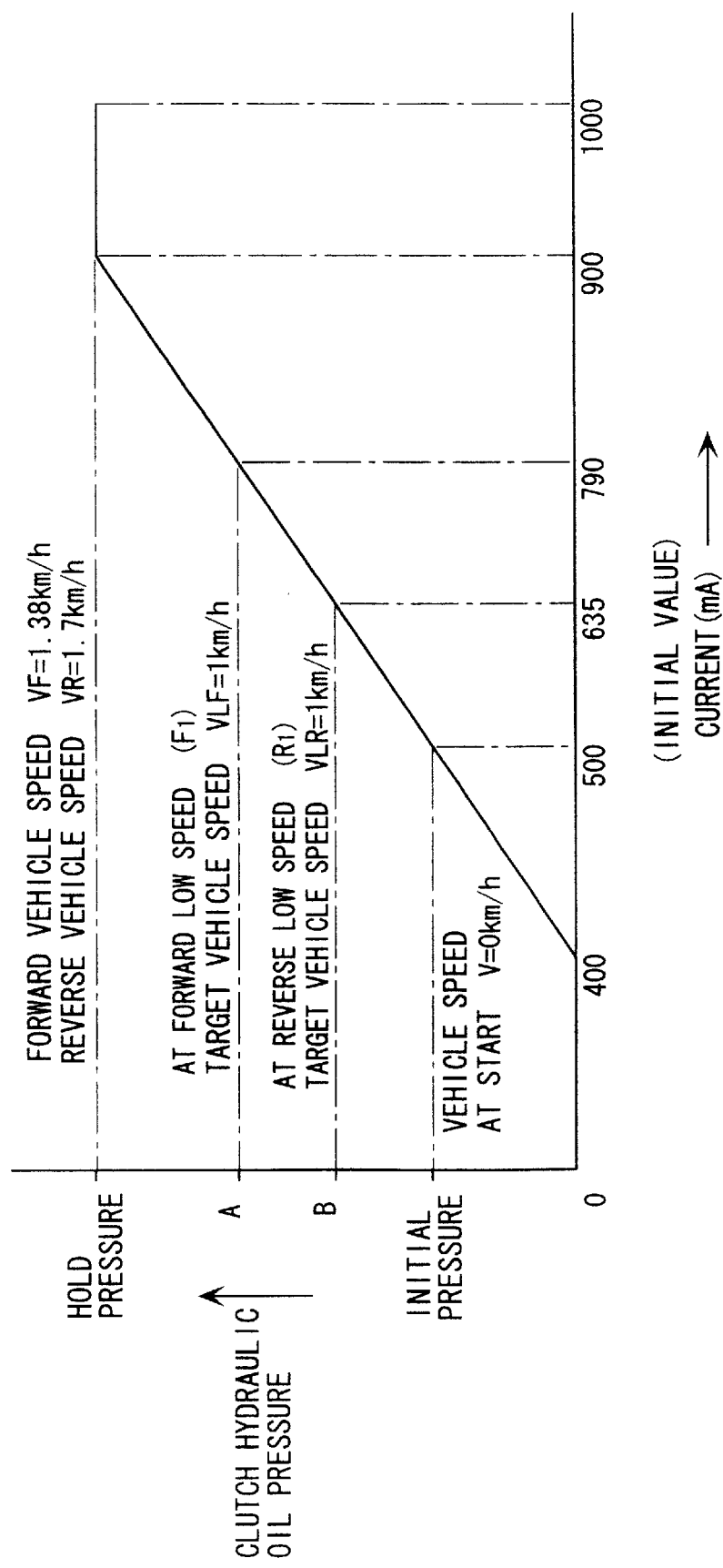
FIG. 15 is a graph showing the relationship between a supply current to the electronic control regulating valve for controlling a clutch mechanism and a clutch mechanism hydraulic oil pressure in the embodiment of FIG. 14.

FIG. 15 shows the relationship between the hydraulic oil pressure of the direction switching clutch mechanism 35A and the supply current value to the proportional solenoid 121 of the electronic control regulating valve 121.

In FIG. 15, the horizontal axis represents the supply current value to the proportional solenoid 122 whilst the vertical axis represents the hydraulic oil pressure of the direction switching clutch mechanism 35A. Specific values in FIG. 15 are values given for better understanding, and they differ in accordance with each working vehicle and are thus obtained by experiments using a predetermined working vehicle.

Although the working vehicle does not start unless the hydraulic oil pressure of the direction switching clutch mechanism 35A becomes a given measure or above, the hydraulic oil pressure of the direction switching clutch mechanism 35A associated with the vehicle speed V (=0 km/h) when trying to start is an initial pressure shown in FIG. 15, and the current value 500 mA of the proportional solenoid at this time is an initial value.

On the other hand, in FIG. 15, with the direction switching clutch mechanism 35A being completely connected, the hydraulic oil pressure is a hold pressure, and at this time, the current value is 900 mA or above. Further, it is determined that the vehicle speed V is 1.38 km/h at the forward first speed and 1.7 km/h at the rear first speed.

At this moment, the vehicle speed varies depending on the forward and backward movements because the speed decreasing ratio of the transmission differs between the forward and backward movements.

Therefore, in the hydraulic oil pressure of the direction switching clutch mechanism 35A, the above-described initial pressure represents the state that the direction switching clutch mechanism 35A is yet to be connected with the force before moving the vehicle, and the hold pressure represents the complete connection. Thus, with the intermediate pressure, the direction switching clutch mechanism 35A is connected while partially generating a slip and the vehicle travels at a speed lower than the vehicle speed obtained by the hold pressure.

Accordingly, it can be seen that a desired vehicle speed V suitable for the hyper-slow running can be obtained by setting the value of the current supplied to the proportional solenoid 122 so that the hydraulic oil pressure of the direction switching clutch mechanism 35A becomes the intermediate low pressure.

In FIG. 15, a hydraulic oil pressure A in the vertical axis represents a hydraulic oil pressure for obtaining a target vehicle speed VLF (=1 km/h) when shifted to the forward first speed (F1) which is the forward low speed; a hydraulic oil pressure B, a hydraulic oil pressure for obtaining a target vehicle speed VLR (=1 km/h) when shifted to the reverse first speed (R1) which is the reverse low speed; and current values 790 mA and 635 mA in this case, values of the current to be supplied to the proportional solenoid 122 during the hyper-slow running.

Figure 16:
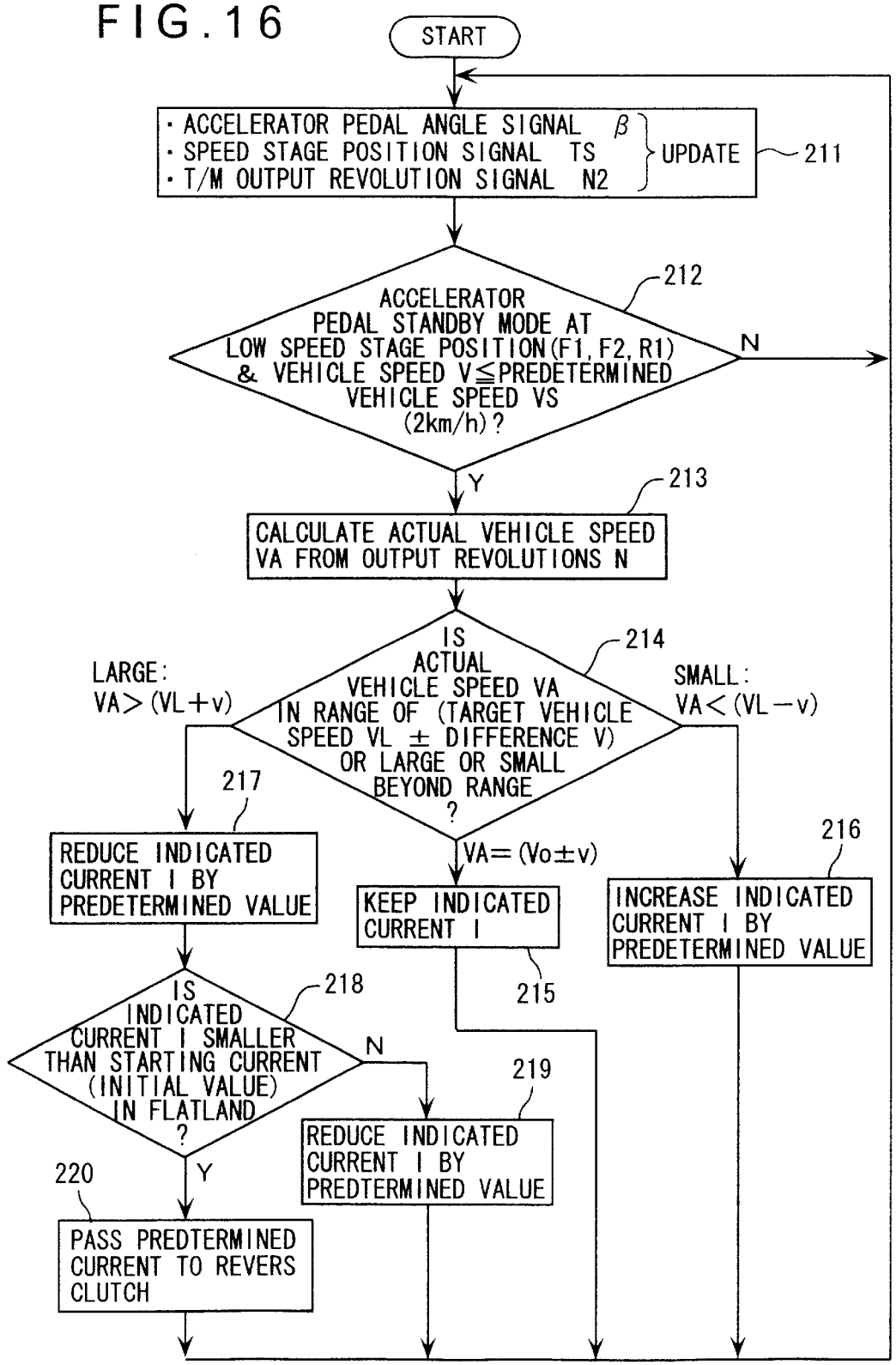
FIG. 16 is a flow diagram showing an action in the embodiment of FIG. 14.

A flowchart of FIG. 16 shows the control procedure of the controller 100 to which the above-described accelerator pedal angle signal â, the speed stage position signal TS and the output side revolution signal N2 are applied.

In FIG. 16, when the control starts, in the controller 100, the accelerator pedal angle signal â, the speed stage position signal TS and the output side revolution signal N2 of the transmission 30 are read and updated at predetermined intervals in the step 211.

Subsequently, in the step 212, a judgment is made upon whether the speed stage position is a low speed stage position, i.e., the forward first speed F1 or second speed F2 or the reverse fist speed R1 based on the accelerator pedal angle signal â, the speed stage position signal TS and the output side revolution signal N2, whether the mode is the standby mode in which the accelerator pedal 107 is not operated and whether the vehicle speed V calculated from the output side revolution signal N2 is not more than a predetermined speed VS (speed larger than the target vehicle speed VLF or VLR and preset to a relatively low speed), e.g., not more than 2 km/h.

After an actual vehicle speed VA is calculated from the output side revolution signal N2 in the step 213, a judgement is then made upon whether the actual vehicle speed VA is within a range of a value (VL±v) obtained by adding a predetermined speed allowance v to or from the target vehicle speed VLF or VLR (which will be typically referred to as VL).

Here, in this embodiment, it is determined that VL is 1 km/h and v is 0.1 km/h, and the above-described value (VL±v)=(1±0.1 km/h) is determined to be a preset deviation (dead zone).

If the actual vehicle speed VA is in a predetermined deviation, the supply current to the proportional solenoid 122 in the pressure control valve 123 for controlling the direction switching clutch mechanism 35 which is under control is continued without changing the current indicated value in the step 215, and the control returns to the step 211 to repeat the step 212 and the following steps.

On the other hand, if the actual vehicle speed VA is out of the preset deviation and lower than (VL−v), the supply current to the proportional solenoid 122 in the pressure control valve 123 for the direction switching clutch mechanism 35 which is under control is specified to a value obtained by adding a correction value of a preset correction map to the current indicated value, and the control returns to the step 211 to repeat the step 212 and the following steps.

On the other hand, when the actual vehicle speed VA is out of the predetermined deviation and is larger than (VL+v), the supply current to the proportional solenoid 122 in the pressure control valve 123 for controlling the clutch mechanism 35 which is under control is to designated to a value obtained by subtracting the correction value of the preset correction map from the current indicated value in the step 217.

In the step 218, a judgment is then made upon whether an indicated current value I is smaller than a starting current value (initial value) IS in a flatland.

If the indicated current value I is not smaller than the initial value IS, the supply current to the proportional solenoid 122 is again designated to the value obtained by subtracting the correction value of the preset correction map from the current indicated value in the step 219 and the control then returns to the step 211 to repeat the step 212 and the subsequent steps.

If the indicated current value I is smaller than the initial value IS, the current is passed through the proportional solenoid 122 of the clutch mechanism 35 on the opposite side of the driven direction switching clutch mechanism 35, i.e., the clutch mechanism 35 on the reverse side when that on the forward side is driven or the clutch mechanism 35 on the forward side when that on the reverse side is driven in the step 220 so as to drive in the direction opposed to that of the driving state.

Supplying the current to the proportional solenoid 122 of the clutch mechanism 35 in the opposite direction means that the vehicle speed VA is larger than (VL+v) even though the hydraulic oil pressure of the clutch mechanism 35 on the driving side is set to the initial pressure in case of, e.g., a steep down grade. Since the vehicle speed VA can not be further increased even if the current value on the driving side is lowered to decrease the hydraulic oil pressure of the clutch mechanism 35, the hydraulic oil pressure is generated in the clutch mechanism 35 on the opposite side of the driving side to produce the braking force.

In the step 220, after instruction of supply of a predetermined current toward the clutch mechanism 35 on the opposite side, the control returns to the step 211 to repeat the step 212 and the following steps.

Figure 17:
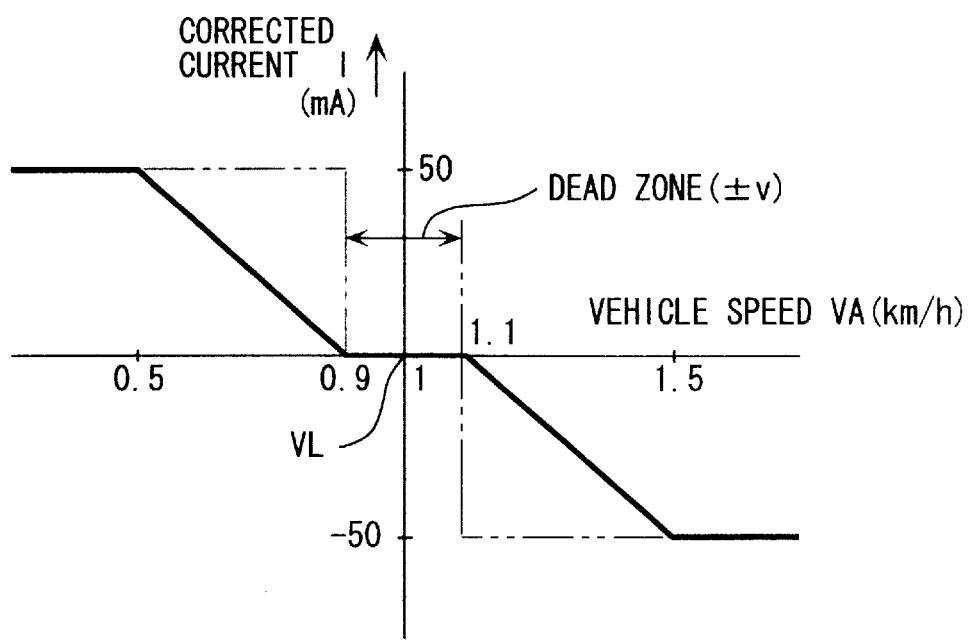
FIG. 17 is a graph showing the relationship between a vehicle speed and a corrected current value in the embodiment of FIG. 14.

FIG. 17 shows the relationship between the corrected current value relative to the proportional solenoid 122 of the clutch mechanism 35 on the driving side and the vehicle speed in the above-described steps 215, 216 and 217.

In FIG. 17, the horizontal axis represents the actual vehicle speed VA (km/h) and the vertical axis represents the current correction value I (mA), respectively. If the actual vehicle speed VA is within (VL±v)=(1±0.1)=(0.9 to 1.1 km/h), the current is not corrected. That is because, when the control is performed so as to correct only a small difference from the target vehicle speed VL, hunching may occur, which can lead to the unstable control. In other words, the predetermined deviation set in advance functions as a so-called dead zone.

When the actual vehicle speed VA increases beyond the dead zone, i.e., it exceeds 1.1 km/h, the correction value of the current supplied to the proportional solenoid 122 of the pressure control valve 123 in the driven clutch mechanism 35 is linearly decreased within a predetermined range; it is then constantly maintained in the decreasing state; an amount of the oil supplied to the direction switching clutch mechanism 35 is reduced; and the hydraulic oil pressure of the clutch mechanism 35 is decreased to increase the slip, thereby lowering the vehicle speed.

On the other hand, when the actual vehicle speed VA becomes far below the dead zone, i.e., it becomes lower than 0.9 km/h, the current correction value of the driven clutch mechanism 35 is linearly increased in a predetermined range; it is then constantly maintained in the increasing state; and the hydraulic oil pressure of the clutch mechanism 35 is increased to decrease the slip, thereby increasing the vehicle speed.

It is to be noted that FIG. 17 does not illustrate the operations of the steps 218, 219 and 220 in the flowchart of FIG. 16.

Further, although the correction current is once linearly increased/decreased and thereafter maintained constant in FIG. 17, a predetermined correction current may be increased/decreased in the step-like manner when the vehicle speed exceeds the dead zone as indicated by a chain double-dashed line in FIG. 17.

As indicated by the chain double-dashed line in FIG. 14, description will now be given as to the results of the embodiment in which a mode change dial and the like is provided as the speed mode setting mechanism 119 to the driver seat 110.

When the speed mode setting mechanism 119 switches from the normal running mode to the hyper-slow running mode, a running mode signal OM inputted from the speed mode setting mechanism 119 to the controller 100 is shifted to the hyper-slow running mode. As a result, a hyper-slow running mode judging function 104 of the controller 100 determines that the current mode is the hyper-slow running mode and then executes the control similar to that in the step 213 and the following steps in FIG. 16.

Therefore, if the speed mode setting mechanism 119 is provided, input of the accelerator pedal angle signal â, the speed stage position signal TS and the output side revolution signal N2 to the controller 100 is unnecessary for judging the hyper-slow running mode. However, the output side revolution signal N2 is required for calculating the actual vehicle speed VA to be controlled to the target speed VL.

Advantages of the Second Embodiment

According to this embodiment described above, the following advantages can be obtained.

Advantage 2-1

In this embodiment, when performing the operation in the hyper-slow running mode, the accelerator pedal angle signal â, the speed stage position signal TS and the output side revolution signal N2 of the transmission 30 are used to check the vehicle speed V and an intent of the operator (the position of the shift lever 111 and the standby mode or any other mode of the accelerator pedal 107); the hyper-slow running mode judging function 104 of the controller 100 makes a judgment upon whether it is the hyper-slow running mode; and a predetermined direction switching clutch mechanism 35 is controlled via the connection force control mechanism 120 in case of the hyper-slow running mode, thereby controlling the hyper-slow running mode suitable for the situation.

In particular, the constant running state can be always obtained with respect to the required hyper-slow running mode irrespective of the load state in the work or the state of the up and down grades.

In such a case, when the actual vehicle speed VA becomes larger than the target speed VL required in the hyper-slow running mode even if the hydraulic oil pressure of the driven direction switching clutch mechanism 35 is set to not more than the initial pressure, it is possible to flow the current to the proportional solenoid 122 of the clutch mechanism 35 on the opposite side of the driven clutch mechanism 35 to generate the braking force, which results in the wider application range of the hyper-slow running mode.

Further, this embodiment can obtain (Advantage 1-1) to (Advantage 1-7) of the first embodiment. However, they are considered to be the advantages of this embodiment, and it is determined that "hyper-slow mode" substitutes for "an operation amount of the inching pedal 114" in (Advantage 1-4) and "speed mode setting mechanism 119" substitutes for "characteristic change mechanism 118" in (Advantage 1-7).

In the second embodiment, the above-described electronic control regulating valve 121 of FIG. 6 can be also used to similarly obtain (Advantage 1-8) and (Advantage 1-9). However, when they are applied to this embodiment, "accelerator pedal 107" substitutes for "inching pedal 114" in the above description.

Third Embodiment

A third embodiment according to the present invention will now be described. Although this embodiment is basically similar to the second embodiment, its control method is different.

Figure 18:
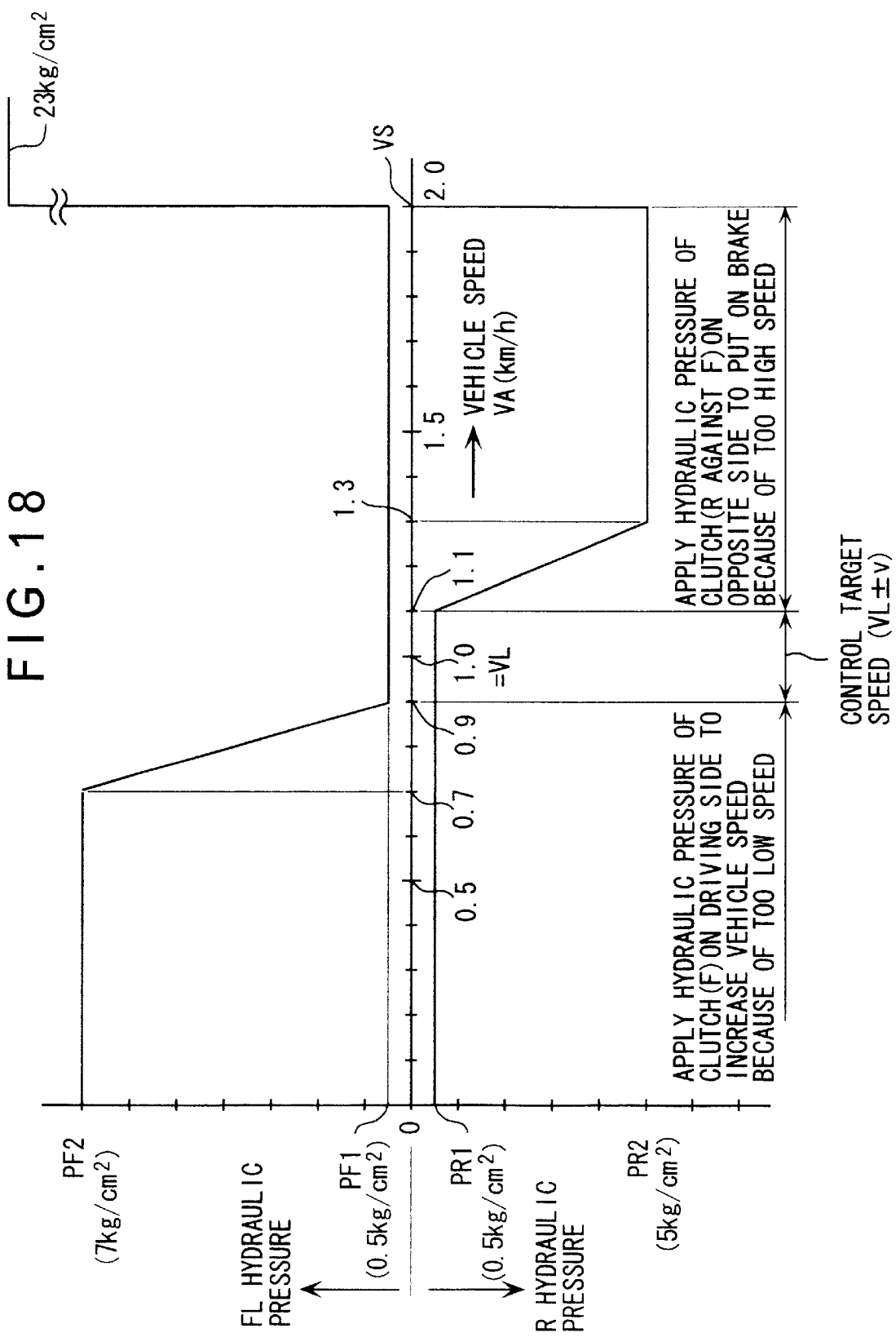
FIG. 18 is a graph showing the relationship between the vehicle speed and a clutch mechanism supply oil pressure in another embodiment according to the present invention.

FIG. 18 is a graph showing a different control method with respect to the direction switching clutch mechanism 35 and illustrates an example where the forward low speed clutch mechanism FL (35A) is driven.

In FIG. 18, the horizontal axis represents an actual vehicle speed VA (km/h) of a working vehicle, and an upper half portion of the vertical axis shows a hydraulic pressure (kg/cm2) supplied to the forward low speed clutch mechanism FL of the direction switching clutch mechanism 35 whilst a lower half of the same shows a hydraulic pressure (kg/cm2) supplied to the reverse clutch mechanism R.

A characteristic of the control according to this embodiment lies in that the hydraulic pressure is constantly applied to the direction switching clutch mechanism 35 on the driving side as well as that on the opposite side in the control area in the hyper-slow running mode, as shown in FIG. 18.

When the speed VA of the working vehicle is larger (faster) than a predetermined speed VS (2.0 km/h in this embodiment) greater than a target speed VLF (1.0 km/h in this embodiment) during the usual work and the like, the full hydraulic pressure, or more specifically, a hydraulic pressure of 23 kg/cm2 is applied to the forward low speed clutch mechanism FL. At this time, no hydraulic pressure (0 kg/cm2) is applied to the reverse clutch mechanism R (35C).

The target speed VLF may be simply referred to as VL hereinafter.

Then, when the operator intends to set the hyper-slow running mode, he/she sets the shift lever 111 to the forward first speed, enters the standby mode in which a foot is taken off from the accelerator pedal 107 or simply put on the pedal 107 and appropriately operates the brake so that the vehicle speed of the working vehicle VA becomes lower than a predetermined speed VS (2.0 km/h), the controller 100 judges the hyper-slow running mode.

This causes a low operating current of the first stage to be supplied to the proportional solenoid 122 so that a low hydraulic oil pressure of the first stage PF1 (0.5 kg/cm2 in this embodiment) acts on the forward low speed clutch mechanism FL. With the operating current of the first stage, the connection force is hardly generated in the forward low speed clutch mechanism FL and the forward driving force is rarely produced in the wheel 85.

On the other hand, an operating current of the second stage is supplied to the proportional solenoid 122 in such a manner that a hydraulic oil pressure of the second stage PR2 (5.0 kg/cm2 in this embodiment) higher than the hydraulic oil pressure PR1 of the first stage (0.5 kg/cm2 in this embodiment) which will be described later acts on the reverse clutch mechanism R.

As a result, a certain degree of the connection force is generated in the reverse clutch mechanism R, and to the wheel 85 is given the reverse driving force which acts on the working vehicle as the braking force, thereby decreasing the vehicle speed VA.

In this manner, when the vehicle speed VA is reduced to be not more than a given value which is 1.3 km/h in this embodiment, the hydraulic pressure applied to the proportional solenoid 122 is controlled so as to be gradually decreased in accordance with reduction in the vehicle speed VA.

Then, when the vehicle speed VA becomes not more than a range obtained by adding a fixed difference in value v=0.1 km/h to the target speed for control VLF=1.0 km/h, i.e., not more than (VL+v)=1.1 km/h, the reverse clutch mechanism R does not have to act as the brake, and the first-stage hydraulic pressure PR1 (=0.5 kg/cm2) lower than the above-described second-stage hydraulic pressure PR2 is applied to the reverse clutch mechanism R. Therefore, the connection force is substantially eliminated, and the operation as the braking force is also lost.

On the other hand, the low first-stage hydraulic pressure PR1 is applied to the forward low speed clutch mechanism FL as described above. Accordingly, when the vehicle speed VA is within a range obtained by adding a fixed difference in value ±v=±0.1 km/h to the target speed for control VL=1.0 km/h, i.e., (VL±v)=0.9 to 1.1 km/h, the low first stage hydraulic pressures PR1 and PR1 (=0.5 kg/cm2) which are equal to each other are applied to the both forward and reverse clutch mechanisms FL and R.

In other words, in this embodiment as mentioned above, the hydraulic pressure is constantly applied to the direction switching clutch mechanism 35 on the driving side as well as that in the opposite side in the control area in the hyper-slow running mode.

When the vehicle speed VA becomes lower than a lower limit of the target speed difference for control (VL±v)=0.9 to 1.1 km/h (VA=0.9 km/h or below), acceleration is required, and hence the hydraulic pressure applied to the forward low speed clutch mechanism FL is gradually increased. When the vehicle speed VA becomes not more than 0.7 km/h, the operating current of the second stage is supplied to the proportional solenoid 122 so that the hydraulic oil pressure of the second stage PF2 (7.0 kg/cm2 in this embodiment) higher than the low first stage hydraulic oil pressure PF1 (=0.5 kg/cm2) acts.

This can enables acceleration of the working vehicle.

Thereafter, in the hyper-slow running mode, a predetermined hydraulic pressure is applied to the forward low speed clutch mechanism FL or the reverse clutch mechanism R as shown in the diagram in a range where the vehicle speed in FIG. 18 is 0 km/h to 2.0 km/h, and the control is effected in such a manner that the vehicle speed is within the control target range (VL±v).

Incidentally, when the reverse clutch mechanism R is driven, the forward low speed clutch mechanism FL side functions as the brake as opposed to the above, and the basic control method is unchanged.

Further, the forward side second stage hydraulic pressure PLF is set to be larger than the reverse side second stage hydraulic pressure PLR for the same reason as described in connection with FIG. 15 that the change gear ratio of the transmission 30 is different between the forward movement and the reverse movement.

According to this embodiment, in the hyper-slow running mode, when the vehicle speed is lowered from a high speed, since a predetermined pressure is applied to the direction switching clutch mechanism 35 on the opposite side of the driving side so as to act as the braking force, the vehicle speed can be controlled to be within the target control range.

In particular, the sufficient adaptation to a downhill slope can be also obtained.

Additionally, in the hyper-slow running mode, since a hydraulic pressure is constantly applied to the forward low speed clutch mechanism FL and the reverse clutch mechanism R in some degree, the startup of the forward low speed clutch mechanism FL and the reverse clutch mechanism R is rapid when a new hydraulic pressure is applied to them, thereby providing further smooth control.

That is, if the hydraulic pressure to the direction switching clutch mechanism 35 is reduced to be completely zero, a time delay is generated until the oil is filled in the direction switching clutch mechanism 35, but this can be eliminated in this embodiment.

It is to be noted that the control method according to this embodiment is a so-called open control method.

Fourth Embodiment

The control method according to a fourth embodiment of the present invention will now be described with reference to FIGS. 19 and 20. Although this embodiment is basically the same as the second embodiment, its control method is different.

This embodiment also exemplifies a case in which the forward low speed clutch mechanism FL (35A) is driven. That is, the forward low speed clutch mechanism FL is coupled with the speed switching clutch mechanism 36 of the first speed in order to control the vehicle speed to a target value of 1.0 km/h.

Figure 19:
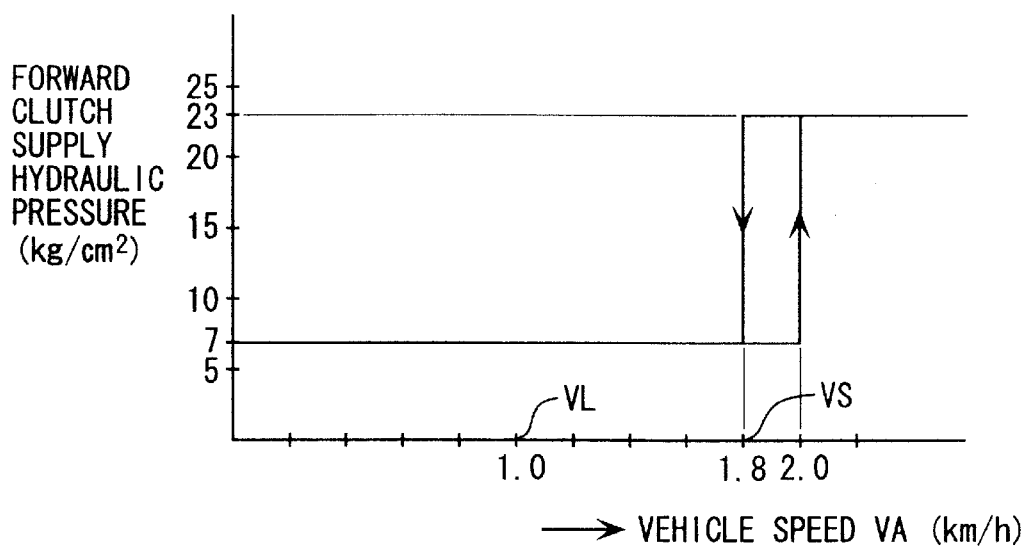
FIG. 19 is a graph showing the relationship between the vehicle speed and a driving side clutch mechanism supply oil pressure in still another embodiment according to the present invention.

FIG. 19 is a view showing the relationship between the hydraulic pressure supplied to the forward low speed clutch mechanism FL and the vehicle speed VA in both the normal running mode and the hyper-slow running mode, in which the vertical axis represents the supply hydraulic pressure while the horizontal axis represents the vehicle speed.

Figure 20:
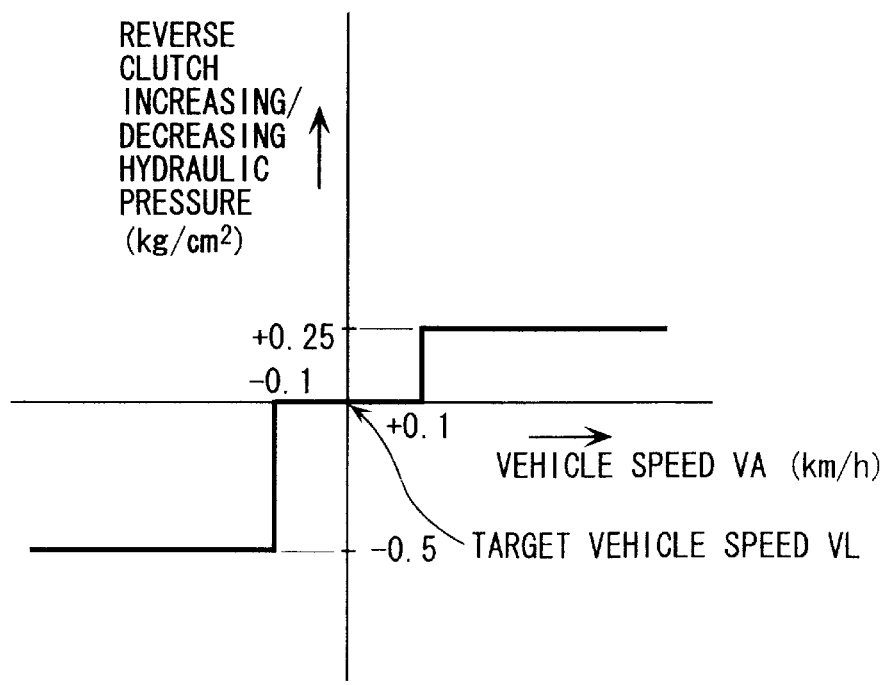
FIG. 20 is a graph showing the relationship between a supply hydraulic pressure to a clutch mechanism on a side opposed to the driving side in each fixed cycle and the vehicle speed in the embodiment of FIG. 19.

FIG. 20 is a graph showing a hydraulic pressure amount obtained by increasing or decreasing the hydraulic pressure supplied to the reverse clutch mechanism R at fixed time intervals (in accordance with each cycle), in which the vertical axis represents the hydraulic pressure to be increased/decreased while the horizontal axis represents the vehicle speed.

In this embodiment, the working vehicle travels in the full or partial clutch connection (coupling) state of the forward first speed. At this time, the forward low speed clutch mechanism FL and the speed switching clutch mechanism 36 of the first speed are coupled by the hydraulic pressure of approximately 23 kg/cm2. On the other hand, no hydraulic pressure is applied to the reverse clutch mechanism R in this state.

In this embodiment, when the vehicle speed VA becomes lower than a predetermined speed VS (1.8 km/h in this embodiment) larger than the target speed VL (1.0 km/h in this embodiment) at the forward first speed or second speed or the reverse first speed and the accelerator pedal 107 is in the standby mode, the control in the hyper-slow running mode is started.

It is to be noted that the vehicle speed VA exiting the hyper-slow running mode is set to 2.0 km/h and hysteresis is provided to prevent hunching.

When the control in the hyper-slow running mode is started, the hydraulic pressure supplied to the forward low speed clutch mechanism FL is constantly set to 7.0 kg/cm2. This enables some slip in the forward low speed clutch mechanism FL.

When the hyper-slow running mode is started, comparison between the actual vehicle speed VA and the target vehicle speed VL by the controller 100 is simultaneously carried out. If the actual vehicle speed VA is larger than the target vehicle speed VL (VA>VL), a fixed hydraulic pressure applied to the reverse clutch mechanism R is increased in accordance with each one cycle. In this embodiment, one cycle is 0.5 second, and the fixed hydraulic pressure is increased by +0.25 kg/cm2 when the vehicle speed VA is larger than the target vehicle speed VL by +0.1 km/h or more, as shown in FIG. 20.

On the other hand, if the actual vehicle speed VA is smaller than the target vehicle speed VL (if VA<VL), a fixed hydraulic pressure to the reverse clutch mechanism R is decreased in accordance with each one cycle. In this embodiment, as similar to the above, one cycle is 0.5 second, and the fixed hydraulic pressure is decreased by −0.5 kg/cm2 when the vehicle speed VA is smaller than the target vehicle speed VL by −0.1 km/h or more, as shown in FIG. 20.

Here, a range of increase in the hydraulic pressure to the reverse clutch mechanism R is set smaller than a range of decrease in the same in order not to stall by rapidly increasing the braking force.

Thereafter, the actual vehicle speed VA is compared with the target vehicle speed VL in accordance with each one cycle (0.5 second), and the hydraulic pressure to the reverse clutch mechanism R is increased or decreased depending on a deviation of these speeds (VA−VL) which is larger (+) or smaller (−) than 0.1 km/h, thereby controlling the vehicle speed VA so as to be within a fixed range (VL±v) relative to the target vehicle speed VL.

According to this embodiment, the controller 100 compares the actual vehicle speed VA with the target vehicle speed VL, and the hydraulic pressure supplied to the reverse clutch mechanism R is increased or decreased in accordance with the deviation of these speeds (VA−VL) to control the vehicle speed VA to be within the target vehicle speed range (VL±v), thus realizing the appropriate control.

In addition, since the hydraulic pressure is also supplied to the direction switching clutch mechanism 35 on the opposite side of the driving side, the vehicle speed can be rapidly controlled so as to be within the control target range, and the sufficient adaptation relative to the down grade is possible.

Further, in this embodiment, since the hydraulic pressure is also constantly applied to the forward low speed clutch mechanism FL and the reverse clutch mechanism R in the hyper-slow running mode, the startup of the direction switching clutch mechanism 35 is fast as similar to the FIG. 18 embodiment, thereby realizing the smooth control.

Fifth Embodiment

A fifth embodiment according to the present invention will now be described with reference to FIG. 21. This embodiment is an example such that the hydraulic pressure supplied to the reverse clutch mechanism R has a degree corresponding to a deviation (VA−VL) of the target vehicle speed VL and the actual vehicle speed VA in the hyper-slow running mode, as different from the embodiment illustrated in FIGS. 19 and 20 wherein the hydraulic pressure supplied to the reverse clutch mechanism R has a fixed value.

Figure 21:
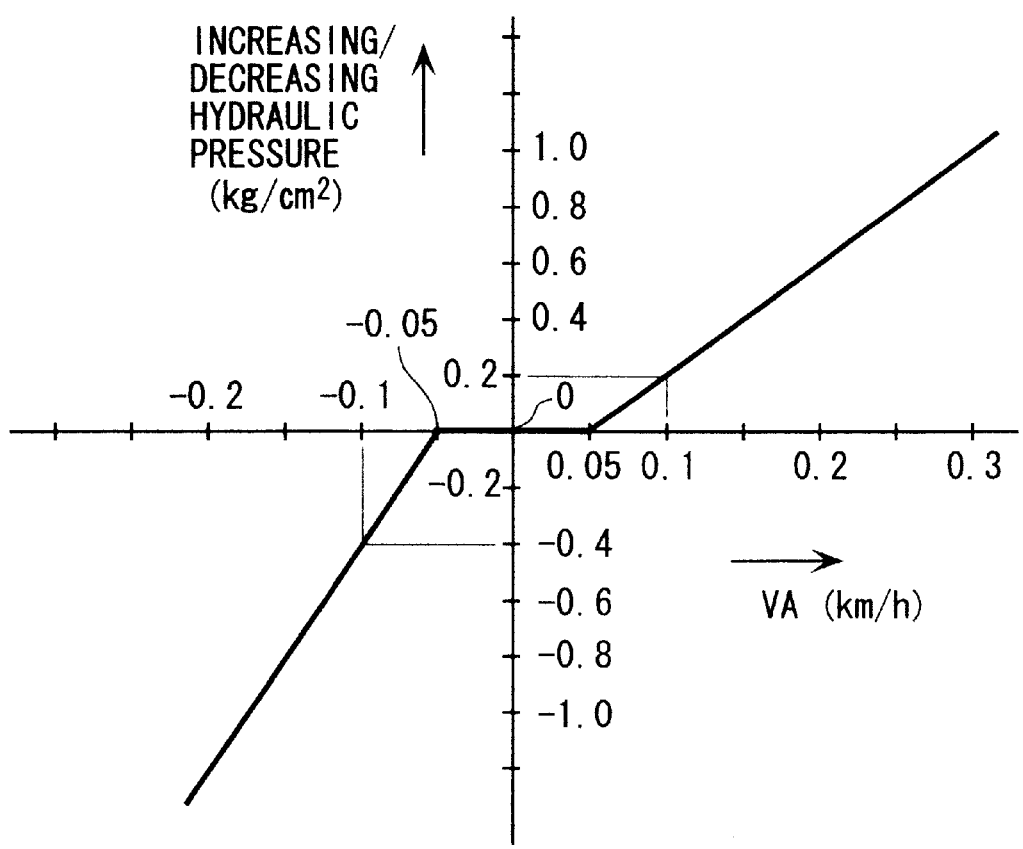
FIG. 21 is a graph showing the relationship between a supply hydraulic pressure supplied to the clutch mechanism on a side opposed to the driving side in accordance with a deviation (VA−VL) and the vehicle speed in yet another embodiment according to the present invention.

FIG. 21 is a graph showing the relationship between a quantity of the hydraulic pressure supplied to the reverse clutch mechanism R and the vehicle speed VA, in which the vertical axis represents the hydraulic pressure to be increased or decreased and the horizontal axis represents the vehicle speed.

In this embodiment, when the actual vehicle speed VA deviates from the target vehicle speed VL beyond a predetermined range, which is 0.5 km/h or more in this embodiment and which is ½ of the value in the embodiment illustrated in FIGS. 19 and 20, the hydraulic pressure supplied to the reverse clutch mechanism R on the opposite side of the driving side is increased or decreased in accordance with the deviation (VA−VL).

Specifically, as to increase/decrease of the hydraulic pressure applied to the reverse clutch mechanism R, when the vehicle speed VA is higher than the target vehicle speed VL, the hydraulic pressure is linearly increased by 0.2 kg/cm2 every time the vehicle speed VA is increased by 0.5 km/h.

On the other hand, when the vehicle speed VA is lower than the target vehicle speed VL, the hydraulic pressure is linearly decreased by 0.4 kg/cm2 every time the vehicle speed VA is decreased by 0.5 km/h.

Here, the inclination in case of the low vehicle speed VA is sharp as compared with that in case of the high vehicle speed VA, namely the increasing ratio is high in order to prevent stall of the working vehicle, as similar to the embodiment shown in FIGS. 19 and 20.

In this manner, according to the present embodiment, the advantages similar to the respective embodiments in FIGS. 18, 19 and 20 can be obtained, and the control can be further precisely performed.

Modification of the Second to Fifth Embodiment

It is to be noted that the present invention is not restricted to the foregoing respective embodiments, and modifications and improvements in a range of attaining the objects of the invention are included in the present invention.

For example, the connection force control mechanism 120 is not necessarily the electronic control regulating valve 121, and a different type of control valve may be used. However, use of the electronic control regulating valve 121 can readily obtain the connection force according to the stepping angle of the accelerator pedal 107 with a simple structure.

Here, although the electronic control regulating valve 121 having the structure of FIG. 6 does not have to be used, the small and inexpensive apparatus can be provided if used.

Furthermore, although the clutch mechanism whose connection force is controlled in accordance with the stepping angle of the accelerator pedal 107 may be the direction switching clutch mechanism 35 as well as the speed change clutch mechanism 36 or both of them, all the speed stage positions can be advantageously controlled with a small number of control targets.

Moreover, a number of revolutions on the output side in the transmission 30 does not have to be controlled so as to be within a predetermined deviation range, hunching can be prevented from occurring if controlled in this manner.

Additionally, the speed mode setting mechanism 119 may not be necessarily provided, the hyper-slow running mode can be readily set if provided.

Sixth Embodiment

A sixth embodiment will now be described with reference to FIGS. 22 and 23.

This embodiment relates to a variable power type engine which can be used in the vehicle of the foregoing respective embodiments and the power setting method thereof.

In this embodiment, a portion surrounding the engine is similar to that in the first embodiment, and like reference numerals denote like or corresponding part in order to omit the tautological explanation. Different portions will be described hereunder.

Figure 22:
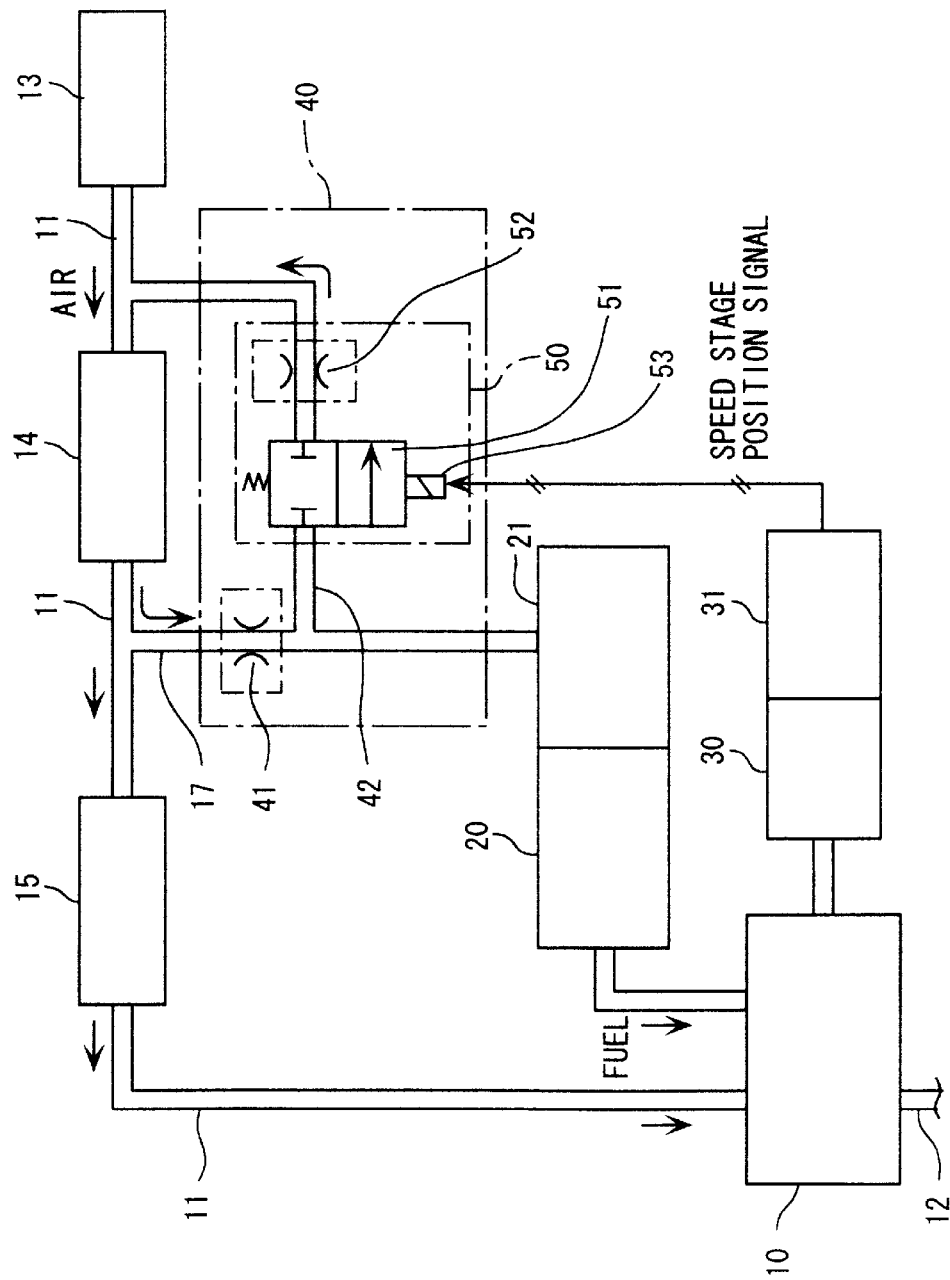
FIG. 22 is a block diagram showing a schematic structure of the first embodiment according to the present invention.
Figure 23:
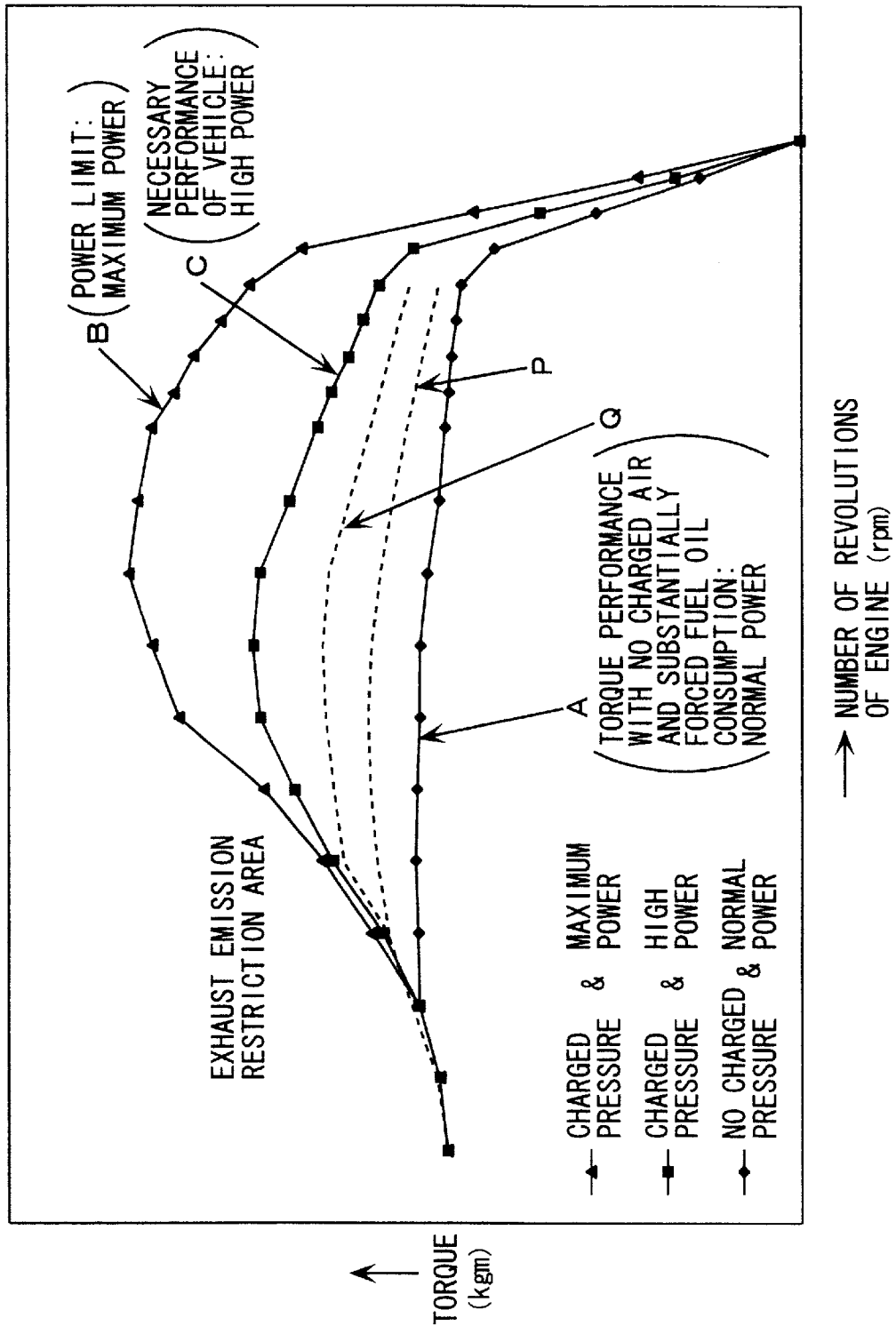
FIG. 23 is a graph for explaining a power characteristic in a sixth embodiment.

FIG. 22 shows a schematic structure of this embodiment, and FIG. 23 is a power characteristic diagram showing the relationship between a number of revolutions of the engine (rpm: horizontal axis) and an engine torque (kg/m: vertical axis) in a variable power engine of this embodiment.

In FIG. 23, description will be first given on the power characteristic required for the variable power engine having a fuel injector with a boost compensator.

In FIG. 23, a line A connecting diamond-shaped dots shown in the lowermost portion in the drawing by a solid line represents a characteristic obtained when no charged pressure (boost pressure) is supplied to the boost compensator and a fuel oil consumption is substantially fixed, and a line B connecting triangular dots shown in the uppermost portion in the drawing by a solid line represents a maximum power characteristic brought under control by various limits when the fuel oil consumption is increased to give rise to the engine power with the charged pressure being applied to the boost compensator. The limit of the maximum power is brought under control by an exhaust temperature, the durability of the engine and the like in a high revolution region, whilst the fuel oil consumption is brought under control by the exhaust gas characteristic in a low revolution area.

In case of the variable power engine, the fuel oil consumption is set so as to obtain a high power required for the vehicle between the lines A and B, and is has a characteristic such as represented by a line C connecting square dots by a solid line in the drawing.

In the variable power engine whose power characteristic is set, for example, the engine controlled by the above-described boost compensator, the characteristic of the line A or C is demonstrated in accordance with the running state of the vehicle, the working state and others. That is, when the high power is not required in the low speed area, since the high power may cause the slip in the wheels and the like, the engine is driven in the state represented by the line A in which no charged pressure is supplied to the boost compensator. On the other hand, when the high power is required in the high speed area, the charged pressure is supplied to the boost compensator, and the engine is driven in the state represented by the line C.

However, there may be a case that an intermediate power characteristic between the line A and the line B. e.g., a line P or a line Q represented by broken lines in FIG. 23 is desired.

The present invention can obtained such an intermediate power characteristic.

In FIG. 22, the specific structure of the sixth embodiment will be described.

To the engine 10 are connected an intake pipe 11 and an exhaust pipe 12. An air cleaner 13 is connected to the uppermost stream side of the intake pipe 11, and a turbocharger 14 and an intercooler 15 are provided between the air cleaner 13 of the intake pipe 11 and the engine 10 from the upstream side to the downstream side. With this arrangement, the cleaned air passed through the air cleaner 13 is subjected to pressure application by the turbocharger 14 and then cooled down by the intercooler 15 to be supplied to the engine 10 in order to increase a pressure charging ratio.

The fuel injector 20 and the transmission 30 are connected to the engine 10.

The boost compensator 21 is attached to the fuel injector 20, and a manifold 17 branched off from the intermediate portion between the turbocharger 14 of the intake pipe 11 and the intercooler 15 is connected to the boost compensator 21 so that the charged pressure (outlet side boost pressure) of the turbocharger 14 can be supplied. The boost compensator 21 adjusts and controls a fuel oil consumption relative to the engine 10 of the fuel injector 20 in accordance with the charged pressure of the turbocharger 14.

The transmission 30 converts output revolutions of the engine 10 into a plurality of speed stages, for example, six stages from a first speed to a sixth speed to be transmitted to wheels and the like, and the speed stage position detection mechanism (speed stage position signal generation mechanism) 31 is attached to the transmission 30. This speed stage position detection mechanism 31 detects which speed stage the transmission 30 is selected to based on, e.g., the a position of the shift lever of the transmission 30 and outputs the speed stage position signal to the later-described pressure state switching mechanism 40.

The pressure state switching mechanism 40 includes: a fixed throttle 41 which is provided to the manifold 17 and serves as a hydraulic circuit device having the resistive influence on the manifold 17; an auxiliary manifold 42 which is branched off from the middle portion between the throttle 41 in the manifold 17 and the boost compensator 21 and whose downstream side is connected between the intake pipe 11 and the air cleaner 13 and between the intake pipe 11 and the turbocharger 14, i.e., connected to the upstream side duct (intake pipe 11) of the turbocharger 14; and switching means 50 which is provided to the auxiliary manifold 42 and which can switch between a state of blocking the auxiliary manifold 42 and another state in which the pressure of the auxiliary manifold 42 is partially released and decreased by a pressure applied from the turbocharger 14 to the manifold 17 and the obtained pressure is higher than an atmospheric pressure.

The switching means 50 is constituted by a two-position electromagnetic switching valve 51 which blocks or communicates the middle part of the auxiliary manifold 42; and a fixed throttle 52 which is provided to the auxiliary manifold 42 on a slip stream side of the two-position electromagnetic switching valve 50 in the communication state of the two-position electromagnetic switching valve 51.

It is to be noted that the speed stage position signal is inputted from the above-mentioned speed stage position detection mechanism 31 to the solenoid 53 of the two-position electromagnetic switching valve 51.

This speed stage position signal is outputted so as to block the auxiliary manifold 42 without operating the solenoid 53 of the two-position electromagnetic switching valve 51 when the speed stage of the transmission is the high speed stage of, e.g., the third speed or above, whilst it is outputted so as to operate the solenoid 53 to communicate the auxiliary manifold 42 when the speed stage is the low speed stage of, e.g., the first or second speed. When the auxiliary manifold 42 is communicated, use of the throttle 42 to cause the charged pressure of the turbocharger 14 to partially flow to the upstream side of the turbocharger 14, and the pressure supplied to the boost compensator 21 is hence decreased, thereby reducing the fuel oil consumption of the fuel injector 20.

Results of the Sixth Embodiment

Results of this embodiment having the above arrangement will now be described.

The air cleaned by the air cleaner 13 passes through the intake pipe 11 and is charged by the turbocharger 14 and the intercooler 15 to be supplied to the engine 10.

On the other hand, although the fuel is supplied to the engine 10 by the fuel injector 20, a supply amount of this fuel is controlled by the boost compensator 21 so that the power characteristic of the engine 10 is determined.

The pressure (charged pressure, boost pressure) on the outlet side of the turbocharger 14 via the manifold 17 is applied to the boost compensator 21 through the throttle 41, and this pressure is changed by the switching mode of the pressure state switching mechanism 40.

That is, when the speed stage is shifted to the low speed stage of, e.g., the second speed or a lower speed in the transmission 30 for transmitting the power of the engine 10 to the wheels and the like, an operation signal is sent from the speed stage position detection mechanism 31 to the solenoid 53 of the two-position electromagnetic switching valve 51. As a result, the two-position electromagnetic switching valve 51 is switched from the state illustrated in FIG. 22 to the upper part in the drawing to communicate the auxiliary manifold 42. Therefore, the charged pressure of the turbocharger 14 supplied to the manifold 17 partially flows out toward the upstream side of the turbocharger 14 through the throttle 52, and the pressure applied to the boost compensator 21 is decreased to a predetermined pressure.

Here, a degree of pressure reduction can be set in accordance with the throttling state of the throttle 41 provided to the manifold 17 and the throttle 52 provided to the auxiliary manifold 42. Further, since the throttle 41 of the manifold 17 can throttle the charged pressure to be applied to the boost compensator 21, the partial outflow of the charged pressure from the auxiliary manifold 42 generates a difference in pressure between the upstream and downstream sides of the throttle 41, and a predetermined reduced pressure is applied to the boost compensator 21.

When the charged pressure reduced as described above is applied to the boost compensator 21, the consumption of the fuel oil supplied from the fuel injector 20 to the engine 10 can have a small value, and the engine power also becomes a small value. This state is the power represented by the line P or the line Q in FIG. 23. Here, selection of the power represented by the line P or the power represented by the line Q is previously set.

When the speed stage of the transmission 30 is set to a high speed area, e.g., the third speed or above, the ON signal outputted from the speed stage position detection mechanism 31 to the solenoid 53 of the two-position electromagnetic switching valve 51 in connection with this setting is turned off, and the two-position electromagnetic switching valve 51 returns to the state shown in FIG. 22 by the spring force. This causes the auxiliary manifold 42 to be blocked and the charged pressure from the auxiliary manifold 42 no longer flows out. Therefore, the charged pressure of the turbocharger 14 acts on the boost compensator 21 without being reduced and enters the high pressure state, and the consumption of the fuel oil injected from the fuel injector 20 to the engine 10 is also increased, which leads to the high power state of the engine 10. This state corresponds to the power characteristic represented by the line C in FIG. 23.

Accordingly, the engine 10 has the high power in the high speed area, and hence the work is processed with the high efficiency.

Advantages of the Sixth Embodiment

According to the above-described embodiment, the following advantages can be obtained.

Advantage 6-1

In this embodiment, since the supply pressure to the boost compensator 21 can be changed to a predetermined set pressure to be supplied by the pressure state switching mechanism 40 in accordance with the speed stage of the transmission 30, the engine power suitable for the content of the work can be obtained, thereby improving the work efficiency.

Specifically, the auxiliary manifold 42 is provided to the manifold 17 which supplies the charged pressure of the turbocharger 14 to the boost compensator 21, and the charged pressure is caused to partially flow out (to be discharged) or not to flow out via the auxiliary manifold 42. Therefore, a pressure which is lower than the charged pressure set by the throttles 41 and 52 and higher than the atmospheric pressure or a pressure equal to the charged pressure can be supplied to the boost compensator 21.

Accordingly, the two-stage pressure, i.e., the charged pressure of the turbo charger 14 and a predetermined pressure which is reduced to be lower than the charged pressure and higher than the atmospheric pressure can be supplied to the boost compensator 21, and a fuel oil consumption of the fuel injector 20, namely, the power of the engine 10 can be changed and adjusted in two stages. Since the power can be automatically changed in accordance with the speed stage of the transmission 30, the appropriate running can be always enabled, thus obtaining the working power. In particular, since a low power can be obtained in the low speed stage and a high power can be obtained in the high speed stage, the efficient work can be carried out in the high speed stage without concerning the slip of the wheel in the low speed stage.

Advantage 6-2

Since the pressure applied to the boost compensator 21 can be switched by the pressure state switching mechanism 40 constituted by the simple hydraulic circuit device having the two-position electromagnetic switching valve 51 and the throttles 41 and 52, thereby inexpensively providing the apparatus.

Advantage 6-3

Since the pressure state switching mechanism 40 can be attached to the engine 10 by adding the slight modification to the manifold 17 without adding the modification to the engine 10, the boost compensator 21 and the like, this mechanism can be readily attached to the construction machine, the vehicle and the like loaded with the variable power engine system in the field.

Advantage 6-4

Further, its maintenance is simple and no specialist is required. Also, replacing the throttle 52 with a counterpart having a different value can easily obtain the necessary engine power characteristic.

Advantage 6-5

Since the hydraulic circuit device provided to the manifold 17 is the throttle 41, a pressure lower than the charged pressure can be generated in the manifold 17 in the simple structure when the charged pressure partially flows out from the auxiliary manifold 42.

Advantage 6-6

The slip stream side of the auxiliary manifold 42 is connected to the intake pipe 11 on the upstream side of the turbocharger 14, and hence the charged pressure flowing out through the auxiliary manifold 42 can flow back to the intake pipe 11 when the two-position electromagnetic switching valve 51 causes the auxiliary manifold 42 to enter the communicating state, thereby wasting no charged pressure by the turbocharger 14.

Modification of the Sixth Embodiment

Various modifications of the switching means 50 in the sixth embodiment will now be described with reference to FIGS. 24 and 25.

Figure 24:
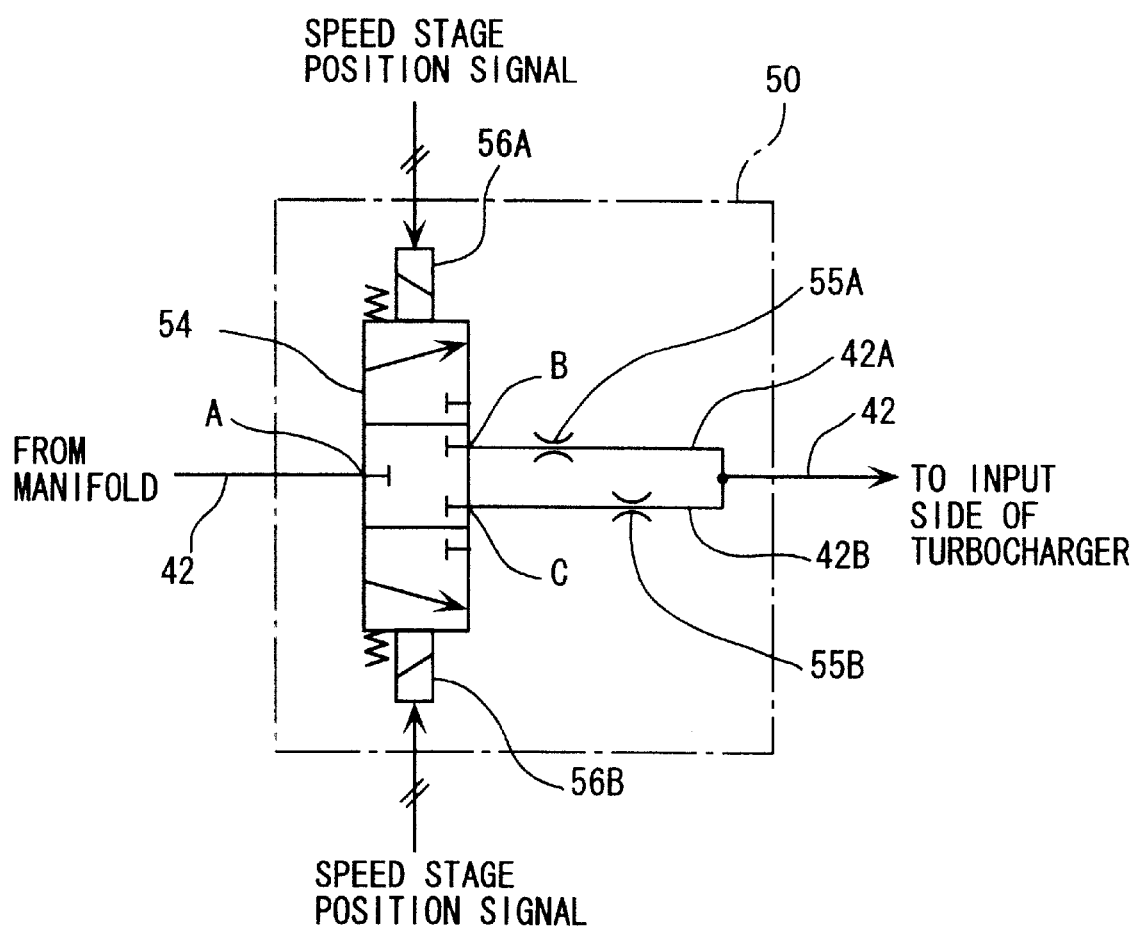
FIG. 24 is a block diagram showing another embodiment of switching means in the sixth embodiment.

The embodiment shown in FIG. 24 switches the pressure supplied to the boost compensator 21 to three different pressure states.

That is, the switching means 50 shown in FIG. 24 is provided with a three-port three-position electromagnetic selector valve 54 and, among the three ports of the three-port three-position electromagnetic selector valve 54, an A port on the upstream side is connected to the upstream side of the auxiliary manifold 42 while B and C ports on the downstream side are connected to ducts 42A and 42B branched off from the auxiliary manifold 42 on the slip stream side, respectively. Throttles 55A and 55B having different throttling conditions are provided to these ducts 42A and 42B. As to the throttling conditions of the throttles 55A and 55B, for example, the throttle 55A has a larger amount of throttling, in other words, a flow rate toward the slip stream side of the auxiliary manifold 42 is set smaller.

The three-port three-position electromagnetic selector valve 54 has three positions for blocking the auxiliary manifold 42 situated in the central position in the drawing, for connecting the A port and the B port in the upper position to each other and for connecting the A port and the C port in the lower position to each other, and as similar to the first embodiment, it caused to perform the switching operation by the solenoid 56A and the solenoid 56B activated by the speed stage position signal from the speed stage position detection mechanism 31.

In such a structure, as shown in the drawing, when the auxiliary manifold 42 is being connected to the central position of the three-port three-position electromagnetic selector valve 54, since the auxiliary manifold 42 is blocked, the charged pressure does not flow out from the auxiliary manifold 42, and the charged pressure is directly applied to the boost compensator 21, thereby obtaining the high power of the engine 10. At this time, in case of the six-stage transmission 30, the transmission is shifted to, e.g., the fifth or sixth speed, and the switching signal from the speed stage position detection mechanism 31 is not applied to the both solenoids 56A and 56B.

When the speed stage of the transmission 30 is, for example, the third or fourth speed, the solenoid 56A is operated, and the three-port three-position electromagnetic selector valve 54 is switched to the lower position in the drawing, thus connecting the auxiliary manifold 42 on the upstream side to the auxiliary manifold 42A with the throttle 55A which greatly throttles. Consequently, the charged pressure partially flows out and a pressure decreased to be lower than the charged pressure is applied to the boost compensator 21, which results in the engine power smaller than that described above that can be the power suitable for the third or fourth speed.

When the speed stage of the transmission 30 is, for example the first or second speed, the solenoid 56B is operated, and the three-port three-position electromagnetic selector valve 54 is switched to the upper position in the drawing, thereby connecting the auxiliary manifold 42 on the upstream side to the auxiliary manifold 42B with the throttle 55B which slightly throttles. This causes the charged pressure which is larger than that described above to partially flow out, and a pressure further decreased to be lower than the charged pressure is applied to the boost compensator 21, thereby obtaining the further smaller engine power which is suitable for the first and second speed.

According to the embodiment shown in FIG. 24, the following advantages can be obtained.

Advantage 6-7

The three-port three-position electromagnetic selector valve 54 can change the pressure applied to the boost compensator 21 to a total of three stages, i.e., a pressure equivalent to the charged pressure and pressures of two stages lower than the former pressure and higher than the atmospheric pressure, thus achieving matching of the working speed and the power state in the improved manner.

It is to be noted that the relationship between the pressure switching by the three-port three-position electromagnetic selector valve 54 and the speed stage of the boost compensator 21 is not restricted to the above-described relationship in this embodiment. That is, the present invention is not restricted such a setting as that the lowest power is obtained at the first and second speeds; the medium power, the third and fourth speeds; and the highest power, the fifth and sixth speeds, and this setting can be appropriately changed in accordance with the content of the work, such that lowest power is obtained at the first speed; the medium power, the second to fourth speeds; and the highest power, the fifth and sixth outputs. This is also true to any other embodiment.

Further, in this embodiment, since the charged pressure all flows out from the auxiliary manifold 42 unless the throttle 55B is provided in the duct 42B, it is possible to set the state in such a manner the charged pressure does not act on the boost compensator 21, namely, the atmospheric pressure acts on the same.

Figure 25:
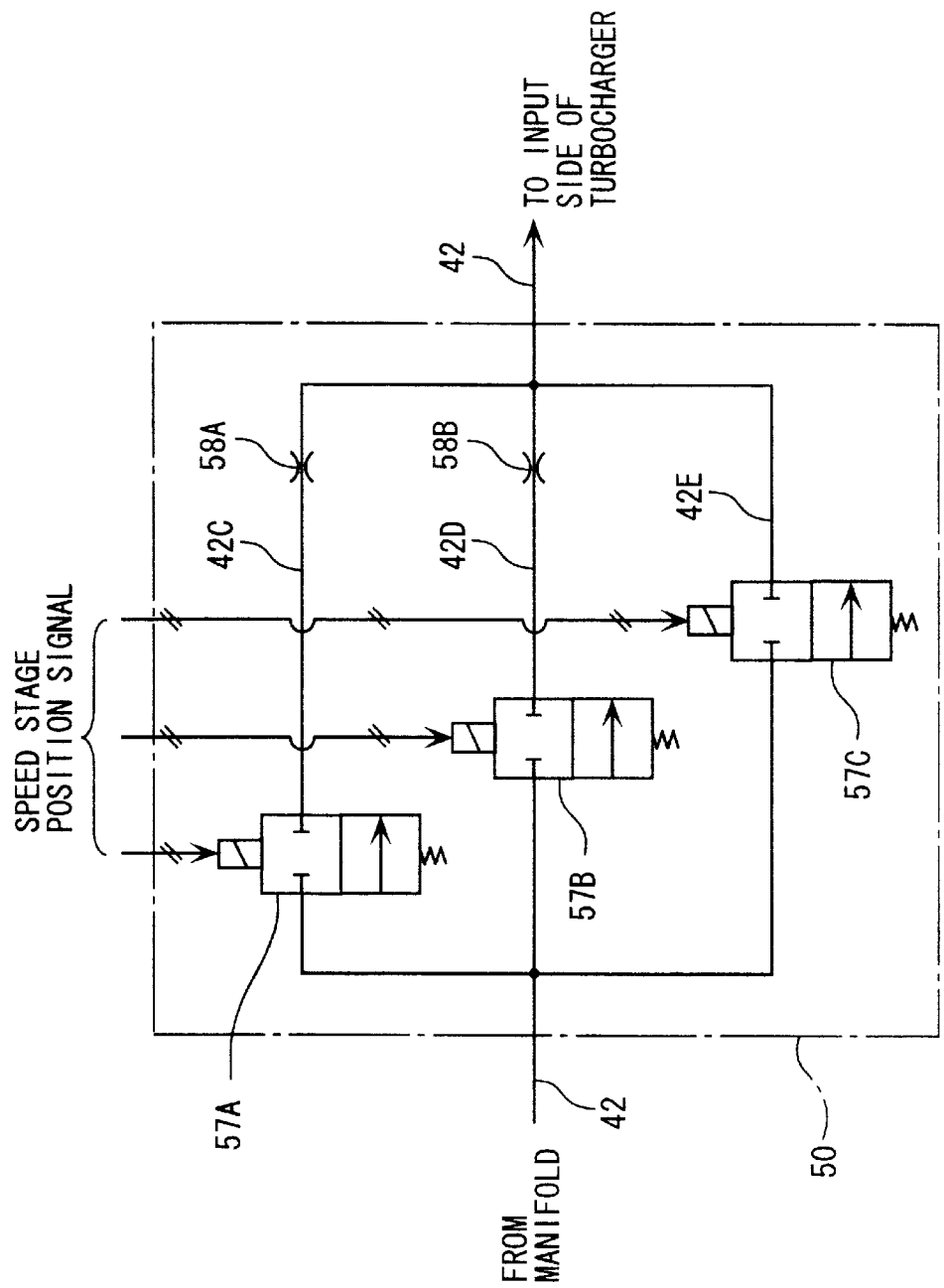
FIG. 25 is a block diagram showing still another embodiment of the switching means in the sixth embodiment.

The embodiment shown in FIG. 25 switches the pressure supplied to the boost compensator 21 to at least four different pressures.

That is, three ducts 42C, 42D and 42E are branched off from the middle of the auxiliary manifold 42 shown in FIG. 25, and two-position selector valves 57A, 57B and 57C for switching between the duct blocking state and the communication state are provided to the respective ducts 42C, 42D and 42E. Further, throttles 58A and 58B having different throttling states are provided to the duct 42C and 42D.

According to such a structure, the following advantage can be obtained.

Advantage 6-8

When the predetermined two-position selector valves 57A to 57C are opened/closed in response to a signal from the speed stage position detection mechanism 31, at least four pressure states can be generated, and the operation status of the boost compensator 21 can be changed in accordance with the pressure states.

Here, the phrase "at least four pressure states" is cited herein because (1) the state where all the ducts 42C, 42D and 42E are closed as shown in the drawing and (2) to (4) the states where any one of the ducts 42C, 42D and 42E is communicated as well as (5) the state where the ducts 42C and 42D are simultaneously communicated are considered, and multiple types of the pressure states are not usually required in the actual case.

Seventh Embodiment

Figure 26:
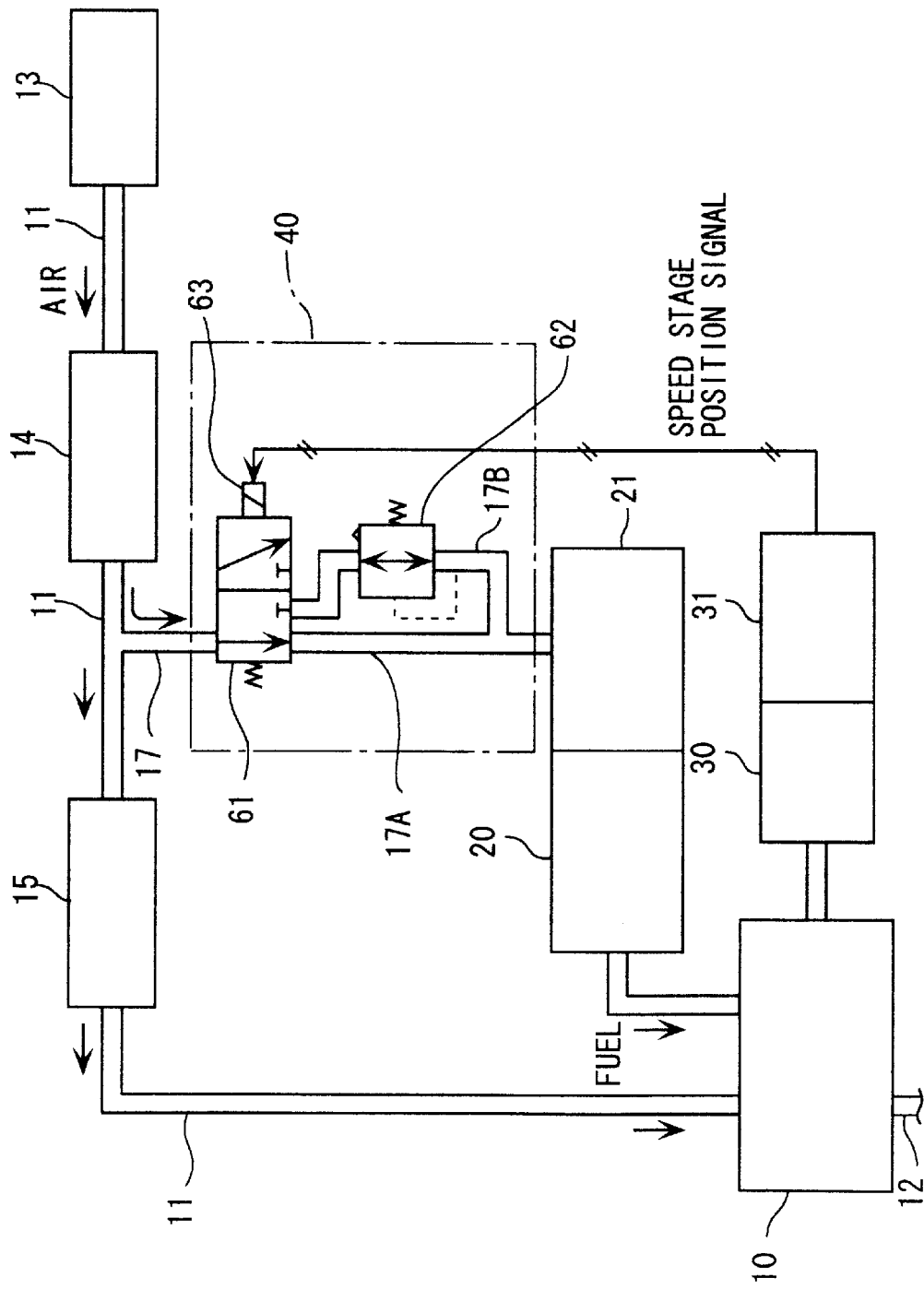
FIG. 26 is a block diagram showing a schematic structure of a seventh embodiment according to the present invention.

FIG. 26 shows a seventh embodiment according to the present invention.

According to this embodiment, the pressure state switching mechanism 40 provided to the manifold 17 is constituted by a selector valve and a pressure reducing valve. Here, a difference between this embodiment and the sixth embodiment is only the structure of the pressure state switching mechanism 40, and any other construction is the same, thereby omitting its explanation.

That is, a three-port two-position electromagnetic switching valve 61 is provided in the middle of the manifold 17, and two ducts 17A and 17B are branched off from the manifold 17 on the slip stream side of the two-position electromagnetic switching valve 61. One duct 17A directly communicates with the boost compensator 21 without providing any hydraulic circuit device in the middle thereof, and the other duct 17B is coupled with the boost compensator 21 via an internal pilot type pressure reducing valve 62 with a relief in the middle thereof.

The two-position electromagnetic switching valve 61 is provided with a solenoid 63 and a speed stage position signal is inputted from the speed stage position detection mechanism 31 to the solenoid 63. The two-position electromagnetic switching valve 61 can switch the duct 17A or the duct 17B to be connected to the manifold 17 by the speed stage position signal. In this case, when the speed stage signal indicates, e.g., a high speed stage of the third speed or above, the manifold 17 is caused to communicate with the duct 17A as shown in the drawing, and the charged pressure of the turbocharger 14 is directly supplied to the boost compensator 21 (without decreasing the pressure). On the other hand, when the speed stage signal indicates a low speed stage of the second speed or below, the solenoid 63 is operated to switch the two-position electromagnetic switching valve 61 against the spring, and the manifold 17 is caused to communicate with the duct 17B. Further, the behavior of the pressure reducing valve 62 is used to reduce the charged pressure to a predetermined pressure to be supplied to the boost compensator 21.

Therefore, in this embodiment, since the charged pressure reduced by the pressure reducing valve 62 is supplied to the boost compensator 21 in the low speed stage of the second speed or below, the engine 10 is driven with the low power. On the other hand, at the high speed stage of the third speed or above, the charged pressure can be directly supplied, thereby enabling the efficient work with the high power.

Even in the seventh embodiment having the above-described structure, the advantages 6-1 to 6-7 similar to those in the sixth embodiment can be obtained.

That is, the pressure to be supplied to the boost compensator 31 is switched to the multiple stages by the pressure state switching mechanism 40, and the engine power suitable for the content of a work can be obtained, thereby improving the work efficiency. Since this power can be automatically changed in accordance with the speed stages of the transmission 30, the appropriate running and operation power can be constantly obtained. In addition, the efficient work is enabled at the high speed stage without concerning the slip of the wheels and the like at the low speed stage and the mechanism can be readily attached to the construction machine or vehicle loaded with the variable engine system in the field. Moreover, the maintenance is easy and any special operator is not required. Also, when the pressure reducing valve 62 is replaced with a pressure reducing valve having a different value, the necessary engine power characteristic can be easily obtained. Further, such an advantage as that the simple and inexpensive pressure state switching mechanism 40 can be provided can be added.

Modifications of the Seventh Embodiment

Figure 27:
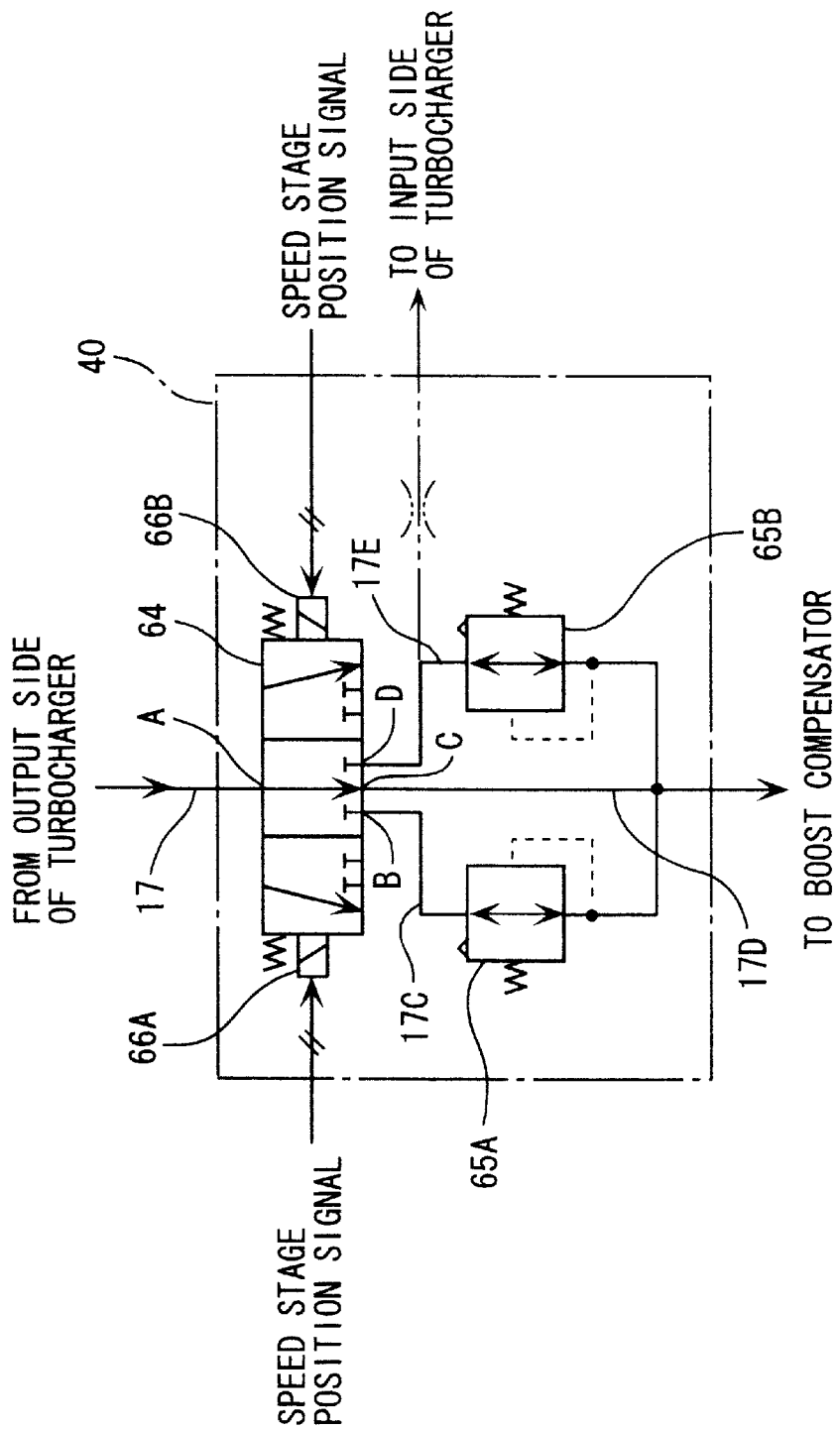
FIG. 27 is a block diagram showing another embodiment of a pressure state switching mechanism in the seventh embodiment.
Figure 28:
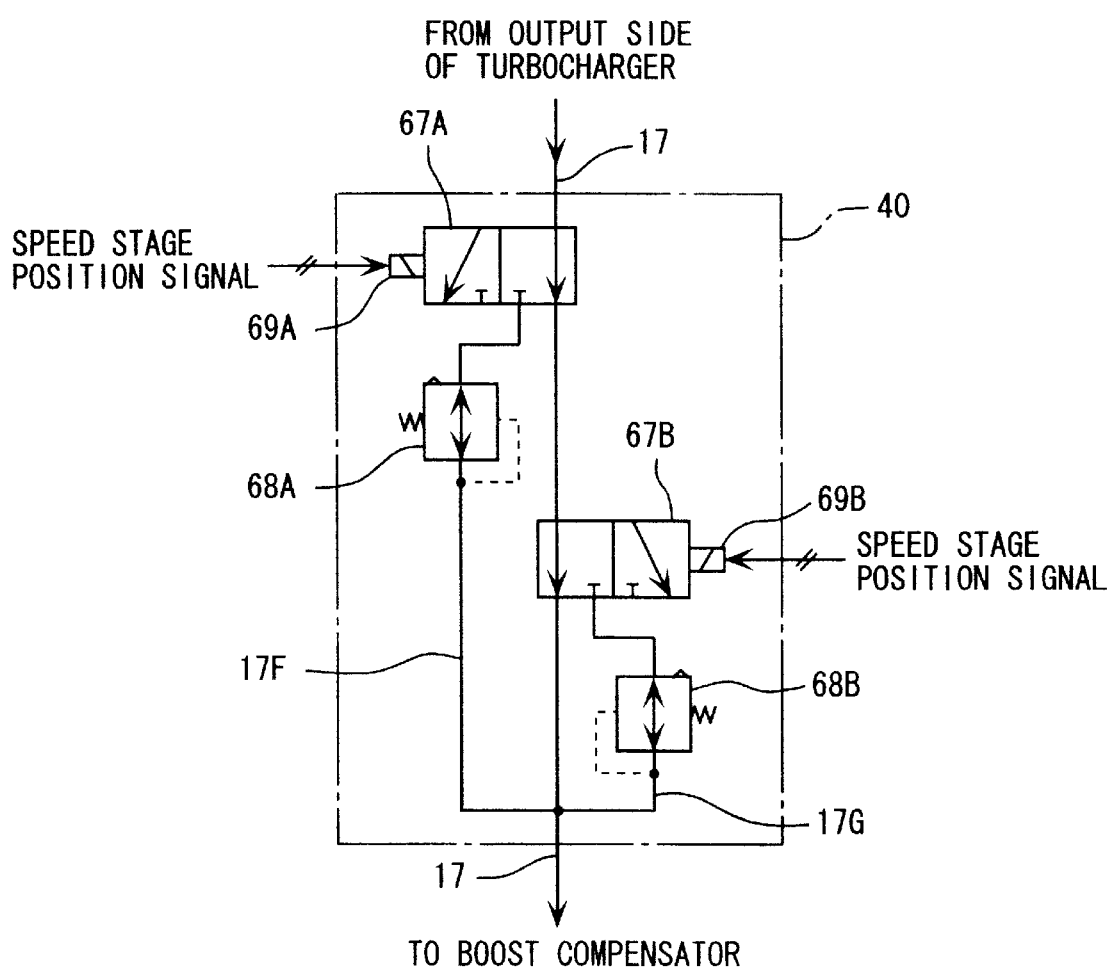
FIG. 28 is a block diagram showing still another embodiment of the pressure state switching mechanism in the seventh embodiment.

FIGS. 27 and 28 shows different modifications of the pressure state switching mechanism 40 in the seventh embodiment.

The embodiment illustrated in FIG. 27 switches the pressure to be supplied to the boost compensator 21 to three different pressure states.

That is, the pressure state switching mechanism 40 of FIG. 27 is provided with a four-port three-position electromagnetic selector valve 64. Among the four ports of the four-port three-position electromagnetic selector valve 64, the A port on the upstream side is connected to the upstream side of the manifold 17, and the B, C and D ports on the downstream side are connected to the ducts 17C, 17D and 17E branched off from the manifold 17 on the slip stream side, respectively. Of these ducts 17C, 17D and 17E, to the ducts 17C and 17E, except the central 17D, are disposed pressure reducing valves 65A and 65B set to different pressure decreasing states. Here, in regard to the pressure reduction of the pressure reducing valves 65A and 65B, for example, the pressure reducing valve 65B has a larger amount of pressure reduction. In other words, it is set in such a manner that a pressure toward the slip stream side of the manifold 17, i.e., the supply pressure to the boost compensator 21 becomes small.

In the drawing, the four-port three-position electromagnetic selector valve 64 has a central position at which the A port and the C port are connected to each other to communicate the duct 17D; a left position at which the A port and the B port are connected to each other to communicate the duct 17C; and a right position at which the A port and the C port are connected to each other to communicate the duct 17E. As similar to the second embodiment, the valve is caused to perform switching operation by the solenoids 66A and 66B activated by the speed stage position signal from the speed stage position detection mechanism 31.

In such a structure, as shown in the drawing, when the manifold 17 is connected to the central position of the four-port three-position electromagnetic selector valve 64, since no pressure reducing valve exists in the duct 17D, the charged pressure is directly applied to the boost compensator 21, thereby obtaining the high power of the engine 10. At this time, in case of the six-stage transmission 30, the transmission 30 is shifted to, for example, the fifth or sixth speed.

When the speed stage of the transmission 30 is, for example, the third or fourth speed, the solenoid 66A is activated so that the four-port three-position electromagnetic selector valve 64 is switched to the right direction in the drawing, and the manifold 17 on the upstream side is connected to the duct 17C having the pressure reducing valve 65A having a relatively small degree of pressure reduction. This ensures reduction in the charged pressure, and a pressure decreased to be lower than the charged pressure is applied to the boost compensator, thus obtaining the engine power suitable for the third or fourth speed smaller than that in the above description.

Further, when the speed stage of the transmission 30 is, for example, the first or second speed, the solenoid 66B is operated and the four-port three-position electromagnetic selector valve 64 is switched to the left direction in the drawing so that the manifold 17 on the upstream side is connected to the duct 17E with the pressure reducing valve 65B having a large degree of pressure reduction. As a result, the charged pressure is further reduced as compared with the above, and a pressure obtained by further reducing the charge pressure is applied to the boost compensator 21, thereby obtaining the smaller engine power suitable for the first or second speed.

According to the embodiment of FIG. 27, the state of pressure applied to the boost compensator 21 can be changed to three stages by using the four-port three-position electromagnetic selector valve 64, and the working speed and the power state can be matched with each other in the improved manner.

It is to be noted that the relationship between the pressure state switching using the four-port three-position electromagnetic valve 64 and the speed stage of the boost compensator 21 is not restricted to that described above in this embodiment.

Since connecting the duct 17E to the upstream side of the turbocharger 14 without providing the pressure reducing valve 65B in the middle part of the duct 17E can cause the charged pressure to all flow out from the duct 17E, and it is possible to set the state in which no charged pressure acts on the boost compensator 21, i.e., the state in which the atmospheric pressure acts. At this time, an appropriate throttle or a duct resistor is provided to the duct 17E in order to prevent the entire charged pressure from flowing out from the manifold 17 to the upstream side of the turbocharger 14.

The embodiment shown in FIG. 28 substitutes a pair of two-position selector valves for the four-port three-position electromagnetic selector valve 64 in the embodiment illustrated in FIG. 27 so that the pressure to be supplied to the boost compensator 21 is switched to three different pressure states.

That is, a pair of two-position electromagnetic switching valves 67A and 67B are provided at the middle of the manifold 17 in FIG. 28, and the two-position electromagnetic switching valves 67A and 67B switch the ducts 17F and 17G provided to the manifold 17, and the manifold 17. Further, internal pilot type pressure reducing valves each having a relief 68A and 68B which are set to different pressure reduction states are provided to the ducts 17F and 17G, respectively.

Furthermore, solenoids 69A and 69B are provided to the two-position electromagnetic switching valves 67A and 67B, and the speed stage position signal is inputted from the speed stage position detection mechanism 31 to the solenoids 69A and 69B.

According to this structure, when the predetermined two-position electromagnetic switching valves 67A and 67B are operated in response to the signal from the speed stage position detection mechanism 31, three pressure states can be generated, and the operation status of the boost compensator 21 can be changed in accordance with the pressure states. This can be understood from the description of the foregoing embodiments.

Additionally, in the embodiment shown in FIG. 28, when any of the ducts 17A and 17B is connected to the upstream side of the turbocharger 14 without providing the pressure reducing valve at the middle thereof, it is possible to apply no charged pressure to the boost compensator 21 at all. At this time, an appropriate throttle or a duct resistor is provided to the ducts 17F and 17G connected to the upstream side of the turbocharger 14 in order to prevent the entire charged pressure from flowing out from the manifold 17 to the upstream side of the turbocharger 14, as similar to the embodiment depicted in FIG. 27.

Another Modification of the Sixth and Seventh Embodiment

It is to be noted that the present invention is not restricted to the foregoing embodiments and any modification or improvement within a range for attaining the object of the invention is included in the present invention.

For example, in the sixth embodiment shown in FIG. 22, the throttle 41 which serves as a resistor provided to the manifold 17 may have an appropriate pipe line resistor by narrowing the duct diameter of the manifold 17.

Further, a relief valve capable of setting the discharging pressure to a predetermined pressure may be used in place of the throttle 52 provided to the auxiliary manifold 42. Although the downstream side of the auxiliary manifold 42 may be opened to the air, this structure partially wastes the charged pressure, and the reflow to the intake pipe 11 on the upstream side of the turbocharger 14 is preferable.

Furthermore, in the present invention, the pressure state switching mechanism 40 can be manufactured into various structures by combining the commercially available various hydraulic circuit devices as well as the foregoing modifications. In brief, it is sufficient that the pressure state switching mechanism 40 can switch the pressure to be supplied to the boost compensator 21 to predetermined pressures of at least two stages which are equal to or lower than the charged pressure of the turbocharger 14 and higher than the atmospheric pressure. Here, switching to the pressure equal to the atmospheric pressure as well as the predetermined pressures of at least two stages can be allowed.

In addition, the expression "predetermined pressures of at least two stages equal to or lower than said charged pressure of said turbocharger and higher than a atmospheric pressure" in claim 20 according to the present invention intends to include one or more stages at which the pressure is equal to or lower than the charged pressure and higher than the atmospheric pressure and two or more stages at which the pressure is lower than the charged pressure and higher than the atmospheric pressure. Further, the phrase "one stage" in the expression "state in which a pressure of said auxiliary manifold is released and a pressure to be applied from said turbocharger to said manifold is decreased to be a predetermined pressure of at least one stage lower than said pressure and higher than an atmospheric pressure" in claim 21 according to the present invention means that the pressure state of two or more stages in total can be obtained if at least one stage can be acquired by pressure reduction because the boost compensator 21 has the state of one stage at which the charged pressure is applied by the "state for closing the auxiliary manifold".

Eighth Embodiment

An eighth embodiment will now be described with reference to FIGS. 29 and 30.

Figure 29:
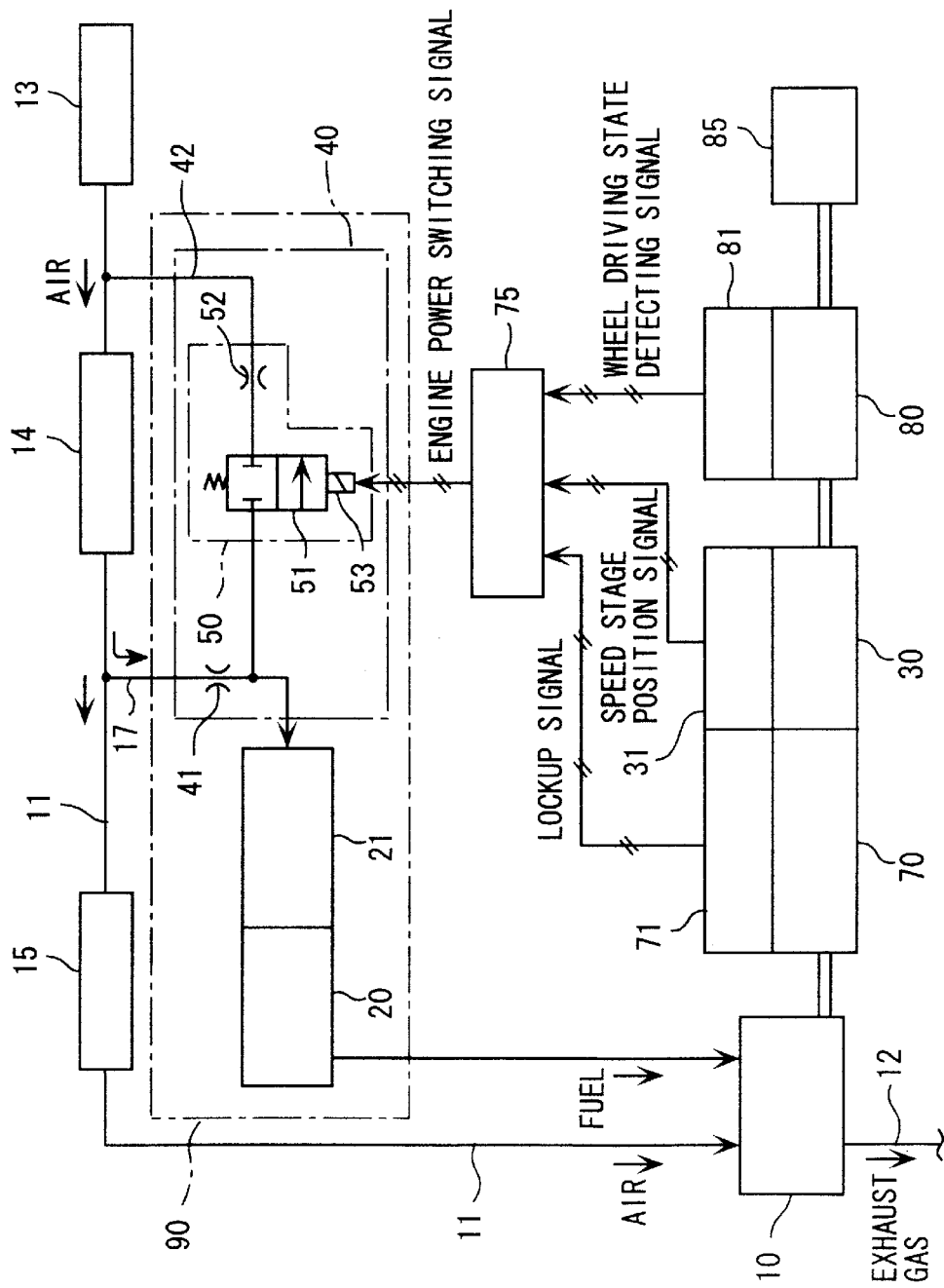
FIG. 29 is a block diagram showing a schematic structure of one embodiment according to the present invention.

Incidentally, FIG. 29 shows a schematic structure of this embodiment, and FIG. 30 is a graph showing the relationship between a vehicle speed (V: horizontal axis) and a rim pull (vertical axis) in a vehicle with a variable power engine such as in this embodiment.

The basic structure of this embodiment is similar to that of the sixth embodiment, and like reference numerals denote like or corresponding parts to omit the tautological explanation. Description will be given on different parts.

Although not explained in the sixth embodiment, a torque converter 70 with a lockup is provided between the engine 10 and the transmission 30, and the power from the engine 10 can be transmitted to the transmission 30 through the torque converter 70.

In FIG. 29, an intake pipe 11 and an exhaust pipe 12 are connected to the engine 10. An air cleaner 13 is connected to the uppermost stream side of the intake pipe 11, and a turbocharger 14 and an intercooler 15 are provided to the intermediate portion between the air cleaner 13 of the intake pipe 11 and the engine 10 from the upstream side to the downstream side. With such an arrangement, the air cleaned by passing through the air cleaner 13 is subjected to the pressure application in the turbocharger 14 and then cooled down in the intercooler 15 to be supplied to the engine 10 so as to increase the supercharging ratio.

The fuel injector 20 and the torque converter 70 with the lockup mechanism are connected to the engine 10.

The boost compensator 21 is provided to the fuel injector 20, and the manifold 17 branched off between the turbocharger 14 of the intake pipe 11 and the intercooler 15 is connected to the boost compensator 21 so that the charged pressure (outlet side boost pressure) of the turbocharger 14 can be supplied. The boost compensator 21 adjusts and controls a fuel oil consumption of the fuel injector 20 relative to the engine 10 in accordance with the charged pressure of the turbocharger 14.

The torque converter 70 with the lockup mechanism has a structure equivalent to that of a counterpart commercially available, and the multi-stage speed change transmission 30 is connected to the output side of the torque converter 70. As a result, the power from the engine 10 is transmitted to the transmission 30 side while involving a slip in accordance with a load from the transmission 30 side when the lockup mechanism of the torque converter 70 is not operated. On the other hand, when the lockup mechanism is operated, such power is directly transmitted to the transmission 30 side without generating a slip.

Further, the torque converter 70 is provided with the lockup detection mechanism 71 for detecting whether the lockup mechanism is operated. The lockup detection mechanism 71 detects whether the lockup mechanism is operated based on, for example, a position of a movable plate of the clutch constituting the lockup mechanism or a fluid pressure applied to the clutch and outputs a lockup enabled/disabled signal to the engine power controller 75.

The transmission 30 transmits output revolutions of the engine 10 to a plurality of speed stages, e.g., eight stages from the forward first to eighth speeds and four stages of the reverse first to fourth speeds to be transmitted to wheels and the like, and the speed stage position detection mechanism (speed stage position signal generation mechanism) 31 is provided to the transmission 30. This speed stage position detection mechanism 31 detects which speed stage the transmission is selected to based on, for example, a position of the shift lever of the transmission 30 and outputs the speed stage position signal to the engine power controller 75.

A plurality of driving wheels 85 are coupled to the output side of the transmission 30 via the wheel driving state switching mechanism 80. The wheel driving state switching mechanism 80 is a mechanism for switching a wheel 85 to be driven among a plurality of the wheels 85 which can be driven. For example, this mechanism switches drive of only the rear wheels or the front wheels or drive of all of the front and rear wheels, i.e., all wheel drive (AWD) and this wheel driving state switching mechanism 80 also has a structure equivalent to that of a commercially available counterpart. The wheel driving state detection mechanism 81 is provided to the wheel driving state switching mechanism 80. The wheel driving state detection mechanism 81 detects which is the wheel 85 to be driven based on, for example, a position of the switching lever (or switch) of the wheel driving state switching mechanism 80 or an engagement position of the gear of the wheel driving state switching mechanism 80 and outputs the wheel driving state detection signal to the engine power controller 75.

The pressure state switching mechanism 40 provided to the manifold 17 includes: the fixed throttle 41 as a hydraulic circuit device which serves as a resistor to the manifold 17; the auxiliary manifold 42 which is branched off between the throttle 41 and the boost compensator 21 in the manifold 17 and whose downstream side is connected between the air cleaner 13 of the intake pipe 11 and the turbocharger 14, i.e., connected to the upstream side duct (intake pipe 11) of the turbocharger 14; and switching means 50 which is provided to the auxiliary manifold 42 and capable of switching between the state in which the auxiliary manifold 42 is blocked and the state in which the pressure of the auxiliary manifold 42 is partially discharged in order to obtain a predetermined pressure which is reduced to be lower than a pressure applied from the turbocharger 14 to the manifold 17 and higher than an atmospheric pressure.

The switching means 50 is constituted by the two-position electromagnetic switching valve 51 for blocking or communicating the middle of the auxiliary manifold 42 and the fixed throttle 52 provided to the auxiliary manifold 42 in the slip stream side of the two-position electromagnetic switching valve in the communicating state of the two-position electromagnetic switching valve 51.

It is to be noted that the engine power switching device 90 includes the fuel injector 20 with the boost compensator 21 and the pressure state switching mechanism 40 and the engine power switching device 90 switches the power of the engine 10 between the normal power (the normal power side, the normal power mode) and another normal power (the normal power side, the normal power mode, the economy mode).

The engine power controller 75 receives the lockup enabled/disabled signal from the lockup detection mechanism 71, the speed stage position signal from the speed stage position detection mechanism 31 and the wheel driving state detection signal from the wheel driving state detection mechanism 81 and outputs an engine power switching signal, which is specifically an ON/OFF signal for the solenoid 53, to the solenoid 53 of the two-position electromagnetic switching valve 51 provided to the engine power switching device 90.

Although the engine power switching signal changes the engine power in response to the aforesaid respective signals (the lockup enabled/disabled signal, the speed stage position signal, the wheel driving state detection signal), it is outputted so as to block the auxiliary manifold 42 without operating the solenoid 53 of the two-position electromagnetic switching valve 51 when the high power is required. On the other hand, when the normal power which is a power lower than the aforementioned high power is needed, the engine power switching signal is outputted so as to communicate the auxiliary manifold 42 by operating the solenoid 53. When the auxiliary manifold 42 is communicated, partial outflow of the charged pressure of the turbocharger 14 to the upstream side of the turbocharger 14 by the throttle 52 lowers the pressure to be supplied to the boost compensator 21, and the fuel oil consumption of the fuel injector 20 is decreased to reduce the engine power, thereby obtaining the normal power.

Results of the Eighth Embodiment

Results of this embodiment having the above-described structure will now be described.

The air cleaned by the air cleaner 13 passes through the intake pipe 11 and is supercharged and cooled down by the turbocharger 14 and the intercooler 15 to be supplied to the engine 10.

Meanwhile, although the fuel is supplied to the engine 10 by the fuel injector 20, a supply amount of this fuel is controlled by the boost compensator 21 and the power characteristic of the engine 10 is determined.

The pressure (charged pressure, boost pressure) of the turbocharger 14 on the output side supplied via the manifold 17 is applied to the boost compensator 21 through the throttle 41, but this pressure varies depending on the switching state of the pressure state switching mechanism 40.

The switching of the pressure by the pressure state switching mechanism 40 is carried out by switching the engine power switching signal supplied from the engine power controller 75 to the solenoid 53 of the two-position electromagnetic switching valve 51. At this time, the two-position electromagnetic switching valve 51 constitutes a part of the switching means 50; the switching means 50, a part of the pressure state switching mechanism 40; and the pressure state switching mechanism 40, a part of the engine power switching device 90, as described above.

Therefore, it can be said that the engine power switching signal from the engine power controller 75 is roughly outputted to the engine power switching device 90, or specifically, it is outputted to the solenoid 53 of the two-position electromagnetic switching valve 51.

In case of control, when the high power state (high output side) of the power from the engine 10 is desired, the engine power controller 75 transmits the high power actuation signal, which is a solenoid OFF signal that does not actuate the solenoid 53 in this embodiment, to the solenoid 53 of the two-position electromagnetic switching valve 51 (actually, a solenoid ON signal is not transmitted). This causes the two-position electromagnetic switching valve 51 enters the state illustrated in FIG. 29 by the spring force and the auxiliary manifold 42 is blocked. Therefore, since the charged pressure does not flow out from the auxiliary manifold 42, the charged pressure of the turbocharger 14 directly acts on the boost compensator 21 without being reduced, and the high pressure state is obtained. A consumption of the fuel oil injected from the fuel injector 20 to the engine 10 is also increased so that the power of the engine 10 becomes high.

On the other hand, when the normal power state (normal power side) of the power from the engine 10 is desired, the engine power controller 75 transmits the normal power actuation signal, which is a solenoid ON signal for actuating the solenoid 53 in this embodiment, to the solenoid 53 of the two-position electromagnetic switching valve 51. Consequently, the two-position electromagnetic switching valve 51 is switched from the state illustrated in FIG. 29 to the upper position in the same drawing so that the auxiliary manifold 42 is communicated. Accordingly, the charged pressure of the turbocharger 14 supplied to the manifold 17 partially flows out toward the upstream side of the turbocharger 14 through the throttle 52, and the pressure applied to the boost compensator 21 is reduced to a predetermined pressure so that the fuel supplied from the fuel injector 20 to the engine 10 is decreased, obtaining the normal power state.

In this point, a degree of pressure reduction is set in accordance with the throttling state of the throttle 41 provided to the manifold 17 and the throttle 52 provided to the auxiliary manifold 42. Further, since disposing the throttle 41 to the manifold 17 causes the charged pressure to be throttled by the throttle 41 and applied to the boost compensator 21, when the charged pressure partially flows out from the auxiliary manifold 42, a difference in pressure is generated between the upstream and downstream sides of the throttle 41, and a predetermined decreased pressure is applied to the boost compensator 21.

In the control described above, switching carried out by the pressure state switching mechanism 40 is controlled by the engine power switching signal from the engine power controller 75, and this control is executed in accordance with a predetermined table stored in non-illustrated storage means such as a ROM provided in the engine power controller 75. An example of the table is shown in Table 1.

TABLE 1

| | | High Power Mode on | | | | | | | | | | | | |
|---|---|---|---|---|---|---|---|---|---|---|---|---|---|---|
| | | Neut- | Forward | | | | | | | | Reverse | | | |
| | | ral | 1 | 2 | 3 | 4 | 5 | 6 | 7 | 8 | 1 | 2 | 3 | 4 |
| AWD off or no AWD | Lockup on | x | x | x | x | o | o | o | o | o | x | x | o | o |
| | Lockup off (Torque Conv.) | x | x | x | o | o | o | o | o | o | x | o | o | o |
| AWD on | Lockup on | x | x | x | o | o | o | o | o | o | x | o | o | o |
| | Lockup off (Torque Conv.) | x | x | o | o | o | o | o | o | o | x | o | o | o |

That is, in Table 1, a symbol "O" represents a high power mode and a symbol "x" represents a normal mode. Table 1 is used for switching between the high power mode (high power state) and the normal power mode (normal power state) based on ON/OFF of the all wheel drive (AWD) in the wheel driving state detection signal from the wheel driving state detection mechanism 81, ON/OFF of the lockup enabled/disabled signal from the lockup detection mechanism 71 in ON or OFF state of the wheel driving state detection signal, and the speed stage position signal from the speed stage position detection mechanism 31.

In this example, when the AWD is OFF, there is included a case of a vehicle provided with no wheel driving state switching mechanism 80, i.e., a vehicle which can not switch the wheel driving state. Further, ON of the lockup enabled/disabled signal supplied from the lockup detection mechanism 71 corresponds to a lockup enabled signal and OFF of the same corresponds to a lockup disabled signal which is a so-called torque converter mode.

Specifically, the respective state can be controlled in the following manner.

(1) In case of the wheel driving state detection signal fed from the wheel driving state detection mechanism 81 being set to OFF of the AWD or the vehicle provided with no wheel driving state switching mechanism 80, if the lockup enabled/disabled signal from the lockup detection mechanism 71 is ON, the high power state can be obtained when the speed stage position signal of the speed state position detection mechanism 31 indicates the high speed stage position equal to or above the forward fourth speed or the reverse third speed (F4 to F8 or R3, R4) and the normal power state is obtained when the aforementioned signal indicates the lower speed stage position (F1 to F3 or R1, R2).

The control is executed in this manner because, when the high power is obtained at the low speed stage position (F1 to F3 or R1, R2) with a part of the wheels 85 being driven and the torque converter 70 with the lockup mechanism being locked up, the power is too large, and the wheels 85 may generate a slip to lower the operability or wear the wheels 85.

(2) In case of the wheel driving state detection signal from the wheel driving state detection mechanism 81 being set to OFF of the AWD or the vehicle provided with no wheel driving state switching mechanism 80, if the lockup enabled/disabled signal from the lockup detection mechanism 71 is OFF (no lockup), i.e., the current mode is the torque converter mode in which the torque converter 70 is operated as a torque converter, the high power state can be obtained when the speed stage position signal of the speed stage position detection mechanism 31 indicates the high speed stage position equal to or above the forward third speed or the reverse second speed (F3 to F8 or R2 to R4) and the basic normal state can be obtained when it indicates the lower speed stage position (F1, F2 or R1).

The reason for executing such a control is similar to that of (1), and the respective controls of (3) and (4) in the following description have the same reason. In addition, the speed stage position for obtaining the high power state is lowered partly because the power loss is generated by occurrence of some slips in the torque converter 70 in the torque converter mode and this power loss should be compensated and partly because the wheels 85 hardly generate slips in the torque converter mode even if the high power is realized at the lower speed stage.

(3) In case of the wheel driving state detecting signal from the wheel driving state detection mechanism 81 being set to ON of the AWD, if the lockup enabled/disabled signal of the lockup detection mechanism 71 is ON, the high power state can be obtained when speed stage position signal of the speed stage position detection mechanism 31 indicates the higher stage position than the forward second speed or the reverse second speed (F3 to F8 or R2 to R4), and the normal power state can be obtained when the signal indicates the lower speed stage position (F1, F2 or R1).

(4) In case of the wheel driving state detection signal from the wheel driving state detection mechanism 81 being set to ON of the AWD, if the lockup enabled/disabled signal from the lockup detection mechanism 71 is OFF, i.e., the current mode is the torque converter mode, the high power state is obtained when the speed stage position signal from the speed stage position detection mechanism 31 indicates the high speed stage position equal to or above the forward second speed or the reverse second sped (F2 to F8 or R2 to R4), and the normal power state is obtained when it indicates the lower speed stage position (F1 or R1).

Incidentally, in the forward first speed or the reverse first speed, the normal power is realized irrespective of the state of the torque converter 70 with the lockup mechanism and the wheel driving state switching mechanism 80 because the high power at the start can facilitate generation of slips in the wheels 85 regardless of the forward or reverse movement. Further, in the neutral state (N) of the transmission basically requiring no high power, the normal power can be constantly obtained.

Description will now be given on the running (vehicle speed) and the rim pull performance in the forward movement of the vehicle with the variable power engine according to this embodiment illustrated in FIG. 30.

FIG. 30 shows the relationship between the vehicle speed (horizontal axis) and the rim pull (vertical axis) in a vehicle having the forward eight-speed change gear, and a characteristic indicated by a solid line represents the characteristic of all the speed stages from the first to eighth speeds in the regular power (normal power) state while a characteristic indicated by a broken line represents the characteristic of the second to eighth speeds in the high power state.

In such a vehicle, the regular work is carried out at the second speed; the light load work such as scattering a material, e.g., gravel, leveling a graveled path or snow removal, at the third to sixth speeds; and running or the lighter load work, at the seventh or eighth speed.

Here, since the high power does not lead to a problem of a slip of the wheels and the like in a light load work or running at the second speed or above, the engine power is set to the high power characteristic indicated by a broken line to perform the highly efficient work.

Referring to FIG. 30, at the second speed, in a case where the AWD is ON and the lockup enabled/disabled signal is OFF, i.e., in the torque converter mode in the all wheel drive, the high power mode is activated, otherwise the normal power mode is activated.

At the third speed, (1) in a case where the AWD is ON and the lockup enabled/disabled signal is ON, i.e., in the lockup mode in the all wheel drive, or (2) in the torque converter mode irrespective of ON and OFF of the AWD, the high power mode is used, otherwise the normal power mode is used.

Expressing the third-speed state associated with Table 1, (1) in cases where the AWD is OFF and the lockup is OFF (torque converter mode), or (2) in cases where the AWD is ON irrespective of ON and OFF of the lockup, the high power mode is used.

At the fourth speed or higher speed, the high power mode is obtained irrespective of ON and OFF of the AWD and ON and OFF of the lockup.

Advantages of the Eighth Embodiment

According to this embodiment having the above-described structure, the following advantages can be obtained.

Advantage 8-1

In this embodiment, since the multi-stage speed change transmission 30 is coupled to the engine 10 via the torque converter 70 with the lockup mechanism and there is provided the engine power controller 75 which receives the lockup enabled/disabled signal from the lockup detection mechanism 71 of the torque converter 70 with the lockup mechanism and the speed stage position signal from the speed stage position detection mechanism 31 of the transmission 30 and outputs the engine power switching signal, the torque converter 70 enables the smooth driving, and the lockup mechanism can improve the driving efficiency at the high speed. Further, the optimum engine power suitable for the content of a work can be obtained in accordance with the speed stage position of the transmission 30 and ON and OFF of the lockup of the torque converter 70, thus improving the working efficiency.

Advantage 8-2

The engine power switching device 90 for switching the power from the engine 10 in accordance with the engine power switching signal from the engine power controller 75 is provided with the fuel injector 20 with the boost compensator 21 for adjusting the fuel oil consumption in accordance with the charged pressure of the turbocharger 14 and the pressure state switching mechanism 40 for switching the supply pressure to the boost compensator 21, and hence the charged pressure of the turbocharger 14 can be utilized to readily switch the power from the variable power engine 10. Here, switching of the charged pressure can be facilitated by the pressure state switching mechanism 40.

Advantage 8-3

The wheel driving state detection signal is also inputted from the wheel driving state detection mechanism 81 of the wheel driving state switching mechanism 80 to the engine power controller 75, and the optimum engine power control can be thus effected in accordance with the driving state of the wheels 85.

Advantage 8-4

Specifically, since the auxiliary manifold 42 is provided to the manifold 17 for supplying the charged pressure of the turbocharger 14 to the boost compensator 21 and the charged pressure is partially flowed out (discharged) or not flowed out through the auxiliary manifold 42, a predetermined pressure which is lower then the charged pressure and higher than the atmospheric pressure and which is set by the throttles 41 and 52 or a pressure equivalent to the charged pressure can be supplied to the boost compensator 21.

Advantage 8-5

Therefore, the pressures of two stages, i.e., the charged pressure of the turbo charger 14 and the predetermined pressure which is reduced to be lower than the charged pressure and higher than the atmospheric pressure can be supplied to the boost compensator 21, and the fuel oil consumption of the fuel injector 20 which can be the power of the engine 10 can be changed and adjusted in two stages. Since the power can be automatically changed by the engine power switching signal from the engine power controller 75 in accordance with the speed stage of the transmission 30, ON and OFF of the lockup of the torque converter 70 with the lockup mechanism and the wheel driving state of the wheel driving state switching mechanism 80, and hence the appropriate running can be always enabled, thus obtaining the working power. In particular, since the low power is obtained at the low speed stage and the high power can be obtained at the high speed stage, the efficient work can be carried out at the high speed stage without a concern over a slip of the wheels and the like at the low speed stage.

Advantage 8-6

Since the pressure to be supplied to the boost compensator 21 can be switched by the pressure state switching mechanism 40 constituted by the simple hydraulic circuit device which is the two-position electromagnetic switching valve 51 and the throttles 41 and 52, thereby inexpensively providing the apparatus.

Advantage 8-7

Since the pressure state switching mechanism 40 can be attached to the engine 10 by slightly adapting the manifold 17 without altering the engine 10 or the boost compensator 21 and the like, it can be readily attached to the construction machine or vehicle loaded with the variable power engine system.

Advantage 8-8

Further, its maintenance is simple and a special operator is not required. Also, replacing the throttle 52 with a counterpart having a different value can easily obtain the necessary engine power characteristic.

Advantage 8-9

Since the hydraulic circuit device provided to the manifold 17 is the throttle 41, a pressure lower than the charged pressure can be generated in the manifold 17 with a simple structure when the charged pressure partially flows out from the auxiliary manifold 42.

Advantage 8-10

Since the slip stream side of the auxiliary manifold 42 is connected to the intake pipe 11 on the upstream side of the turbocharger 14, the charged pressure flowing out through the auxiliary manifold 42 can flow back to the intake pipe 11 when communicating the auxiliary manifold 42 by the two-position electromagnetic switching valve 51, and the charged pressure produced by the turbocharger 14 is not wasted.

Modification of the Eight Embodiment

It is to be noted that the present invention is not restricted to the foregoing embodiments and any modification and improvement can be included in the present invention as far as the object of the invention can be attained.

For example, the engine power switching device 90 is not restricted to the structure of the above-described embodiments, and it may be an apparatus realized by an electronic governor described in the background art, an apparatus disclosed in U.S. Pat. No. 4,785,778, an apparatus which can easily turn on/off the charged pressure of the turbocharger supplied to the boost compensator by the electromagnetic valve or any other apparatus. In brief, an apparatus capable of switching the engine power to multiple stages can suffice.

Further, in the present invention, the wheel driving state switching mechanism 80 does not have to be provided, and the present invention can be also applied to a vehicle in which only a predetermined wheel 85 is constantly driven. In such a case, the control by the engine power controller 75 is the same as the control when the AWD is OFF. In this case, the present invention can be applied to a vehicle using a crawler in place of the wheels 85.

When providing the wheel driving state switching mechanism 80, it is not restricted to a mechanism using all the wheels 85 as driving wheels, and a mechanism capable of increasing/decreasing a number of driving wheels may be used. In this case, the control by the engine power controller 75 can be considered to be equal to the control when the AWD is ON.

Moreover, the speed stage position for switching the high power state and the normal power state is not restricted to those in Table 1, and it can be appropriately changed in accordance with the engine power characteristic, usage of the vehicle or any other situation. However, when the high power mode is used at the higher speed stage than a predetermined speed stage and the lockup is ON in this state, the speed stage to be switched is set to a higher speed stage. Further, even if a number of driving wheels is increased, the speed stage to be switched is set to a higher speed stage.

Additionally, a number of speed stage positions of the multi-stage speed change transmission 30 is not restricted to the forward eight stages and the reverse four stages in the foregoing embodiments, it may be appropriately determined.

Further, the pressure state switching mechanism 40 is not limited to the above-mentioned embodiments, and any other configuration may be adopted. For example, a plurality of the auxiliary manifolds 42 of the switching means 50 may be provided, and the two-position selector valve and the throttle may be provided to each of these ducts. When a value of these throttles is changed, different pressures of three or more stages rather than two stages can be supplied to the boost compensator 21, and the engine power can be changed to the multiple-stage power suitable for these pressures.

Furthermore, the selector valve of the switching means 50 may be a three-position selector valve, and a plurality of ducts are provided on the slip stream side of the three-position selector valve. Throttles having different values may be provided to a plurality of the ducts to obtain pressures of the multiple stages as similar to the above. Also, various kinds of known hydraulic circuit devices may be used to constitute the pressure state switching mechanism 40. For example, the two-position selector valve and the pressure reducing valve may be used to configure the pressure state switching mechanism 40, and a so-called general fluid pressure circuit technique can be applied.

What is claimed is:

1. A vehicle with a variable power engine comprising:
   an engine;
   an engine power switching device for changing a power of said engine to a plurality of stages;
   a torque converter with a lockup mechanism coupled with an output side of said engine;
   a multi-stage speed change transmission coupled to an output side of said torque converter;
   a lockup detection mechanism for detecting on/off of an operation of said lockup mechanism to output a lockup enabled/disabled signal;
   a speed stage position detection mechanism for detecting a speed stage position of said transmission to output a speed stage position signal; and
   an engine power controller to which said speed stage position signal from said speed stage position detection mechanism and said lockup enabled/disabled signal from said lockup detection mechanism are inputted and which outputs an engine power switching signal to said engine power switching device.

2. A vehicle with a variable power engine comprising:
   an engine;
   an engine power switching device for changing a power of said engine to a plurality of stages;
   a torque converter with a lockup mechanism coupled with an output side of said engine;
   a multi-stage speed change transmission coupled to an output side of said torque converter;
   a lockup detection mechanism for detecting on/off of an operation of said lockup mechanism to output a lockup enabled/disabled signal;
   a speed stage position detection mechanism for detecting a speed stage position of said transmission to output a speed stage position signal; and
   an engine power controller to which said speed stage position signal from said speed stage position detection mechanism and said lockup enabled/disabled signal from said lockup detection mechanism are inputted and which outputs an engine power switching signal to said engine power switching device, wherein
   a turbocharger for supplying a charged pressure to said engine is connected to said engine, and said engine power switching device includes:
      a fuel injector having a boost compensator for adjusting a fuel oil consumption to said engine in accordance with said charged pressure of said turbocharger; and
      a pressure state switching mechanism for switching a pressure to be supplied to said boost compensator to predetermined pressures of at least two stages.

3. A vehicle with a variable power engine comprising:
   an engine;
   an engine power switching device for changing a power of said engine to a plurality of stages;
   a torque converter with a lockup mechanism coupled with an output side of said engine;
   a multi-stage speed change transmission coupled to an output side of said torque converter;
   a lockup detection mechanism for detecting on/off of an operation of said lockup mechanism to output a lockup enabled/disabled signal;
   a speed stage position detection mechanism for detecting a speed stage position of said transmission to output a speed stage position signal; and
   an engine power controller to which said speed stage position signal from said speed stage position detection mechanism and said lockup enabled/disabled signal from said lockup detection mechanism are inputted and which outputs an engine power switching signal to said engine power switching device, wherein a wheel driving state switching mechanism for switching which wheel among wheels of said vehicle is driven is coupled to said transmission, and said wheel driving state switching mechanism is provided with a wheel driving state detection mechanism for detecting a switching state of said wheel driving state switching mechanism to output a wheel driving state detection signal to said engine power controller.

4. A power control method of a vehicle with a variable power engine, said vehicle comprising:
   an engine;
   an engine power switching device for changing power of said engine to a plurality of stages;
   a torque converter with a lockup mechanism coupled to an output side of said engine;
   a multi-stage speed change transmission coupled to an output side of said torque converter;
   a lockup detection mechanism for detecting on/off of an operation of said lockup mechanism to output a lockup enabled/disabled signal;
   a speed stage position detection mechanism for detecting a speed stage position of said transmission to output a speed stage position signal; and an engine power controller to which said speed stage position signal from said speed stage position detection mechanism and a lockup enabled/disabled signal from said lockup detection mechanism are inputted and which outputs an engine power switching signal to said engine power switching device, wherein said engine power controller controls said engine power switching device in such a manner that engine power is obtained on a high power side when said speed stage position signal from said speed stage position detection mechanism indicates a higher speed stage position than a predetermined speed stage and controls said engine output switching device in such a manner that said engine power is obtained on said high power side at a higher speed stage position than said speed stage position switched to said high power side when said lockup enabled/disabled signal from said lockup detection mechanism is a lockup enabled signal.

5. A power control method of a vehicle with a variable power engine, said vehicle comprising:

an engine;

an engine power switching device for changing power of said engine to a plurality of stages;

a torque converter with a lockup mechanism coupled to an output side of said engine;

a multi-stage speed change transmission coupled to said output side of said torque converter;

a lockup detection mechanism for detecting on/off of an operation of said lockup mechanism to output a lockup enabled/disabled signal;

a speed stage position detection mechanism for detecting a speed stage position of said transmission to output a speed stage position signal;

a wheel driving state switching mechanism which is coupled to an output side of said transmission and switches which wheel among wheels of said vehicle is driven;

a wheel driving state detection mechanism for detecting a switching state of said wheel driving state switching mechanism to output a wheel driving state detection signal; and an engine power controller to which said wheel driving state detection signal from said wheel driving state detection mechanism, said speed stage position signal from said speed stage position detection mechanism and said lockup enabled/disabled signal from said lockup detection mechanism are inputted and which outputs an engine power switching signal to said engine power switching device, wherein said engine power controller controls said engine power switching device in such a manner that engine power is obtained on a high power side when said speed stage position signal from said speed stage position detection mechanism indicates a higher speed stage position than a predetermined speed stage, controls said engine power switching device in such a manner that said engine power is obtained on said high power side at a higher speed stage position than said speed stage position switched to said high power side when said lockup enabled/disabled signal from said lockup detection mechanism is a lockup enabled signal, and controls said engine power switching device so as to switch to said high power state at a lower speed stage position than a speed stage position switched to at said high power side before a number of driven wheels is increased when said wheel driving state switching mechanism performs switching in a direction for increasing a number of driven wheels.

* * * * *